United States Patent [19]

Sussman

[11] Patent Number: 5,586,196
[45] Date of Patent: Dec. 17, 1996

[54] DIGITAL DOCUMENT MAGNIFIER

[76] Inventor: Michael Sussman, 51 Myrtle Ter., Winchester, Mass. 01890

[21] Appl. No.: 190,236

[22] Filed: Jan. 31, 1994

Related U.S. Application Data

[63] Continuation of Ser. No. 691,631, Apr. 24, 1991, abandoned.

[51] Int. Cl.⁶ ..................................................... G06K 9/00
[52] U.S. Cl. ............................................. 382/114; 348/63
[58] Field of Search ................................. 382/114, 298, 382/282; 348/62, 63, 240; 345/123, 121, 130, 118

[56] References Cited

U.S. PATENT DOCUMENTS

| | | | |
|---|---|---|---|
| 3,848,234 | 11/1974 | MacDonald | 364/200 |
| 3,924,244 | 12/1975 | Seitz | 364/900 |
| 3,959,778 | 5/1976 | Brette | 364/200 |
| 3,976,980 | 8/1976 | Hertz | 340/172.5 |
| 4,549,275 | 10/1985 | Sukonick | 395/121 |
| 4,774,581 | 9/1988 | Shirtsuchi | 382/47 |
| 4,821,086 | 4/1989 | McNeely et al. | 358/22 |
| 4,829,453 | 5/1989 | Katsuta et al. | 382/47 |
| 4,841,454 | 6/1989 | Awazu | 345/123 |
| 4,918,526 | 4/1990 | Lewis | 358/22 |
| 4,941,195 | 7/1990 | Tanaka et al. | 382/47 |
| 5,010,324 | 4/1991 | Yamamoto | 345/123 |
| 5,021,772 | 6/1991 | King et al. | 345/123 |
| 5,029,228 | 7/1991 | Nonoyama et al. | 382/47 |
| 5,038,138 | 8/1991 | Akiyama et al. | 345/123 |
| 5,053,761 | 10/1991 | Webster, III | 345/123 |
| 5,075,673 | 12/1991 | Yanker | 345/123 |
| 5,130,794 | 7/1992 | Ritchey | 358/87 |
| 5,179,648 | 1/1993 | Hauck | 345/123 |
| 5,289,569 | 2/1994 | Taniguchi | 345/121 |

FOREIGN PATENT DOCUMENTS

| | | |
|---|---|---|
| 410771A2 | 1/1991 | European Pat. Off. . |
| 55-132981 | 4/1982 | Japan . |
| 61-10675 | 7/1987 | Japan . |
| 2070399 | 9/1981 | United Kingdom . |
| 2240688 | 8/1991 | United Kingdom . |

OTHER PUBLICATIONS

J. C. DeWitt, E. M. Schreier, J. Leventhal, Journal of Visual Impairment & Blindness, pp. 151–199 (Apr. 1988).

Venture, pp. 11, 51 (Mar. 1989).

G. E. Legge, G. S. Rubin, D. G. Pelli, M. M. Schleske, A. Luebker, J. A. Ross, Journal of Visual Impairment & Blindness, pp. 54–59 (Feb. 1988).

J. C. DeWitt, E. M. Schreier, J. D. Leventhal, and A. M. Meyers, Journal of Visual Impairment & Blindness, pp. 402–440, (Dec. 1988).

RDC Newsletter, pp. 11–13 (Dec. 1986).

(List continued on next page.)

*Primary Examiner*—Yon J. Couso
*Attorney, Agent, or Firm*—Fish & Neave; Richard A. Inz; G. Victor Treyz

[57] ABSTRACT

A digital document magnifier for scanning and digitizing printed information, processing the information, and displaying the processed information on a display screen is provided. The digital document magnifier software analyzes the contents of a document and then automates presentation of the document to a viewer. The system includes a microprocessor for processing the scanned information, and displayable video memory for storing information to be displayed. The video memory is organized as a two-dimensional circular display buffer. The two-dimensional buffer is used to zoom incrementally an image to the display screen as necessary. The magnifier can provide either one data bit per pixel for a monochrome display, or four data bits per pixel for a color or greyscale display. Methods for scaling coordinates between a source image bitmap buffer and a two-dimensional circular display buffer also are provided. The methods include dynamically re-mapping page geometry to obtain continuous line effects and continuous column effects.

23 Claims, 22 Drawing Sheets

Microfiche Appendix Included
(707 Microfiche, 11 Pages)

OTHER PUBLICATIONS

Gerald E. Fonda, M.D., *Management of Low Vision* (Thieme–Stratton, Inc., New York, 1981), Table of Contents, pp. 80–85, 160–165, 234–235.

*Clinical Low Vision* (Eleanor E. Fay, M.D., F.A.C.S., ed., Little, Brown and Company, Boston, 1984), Table of Contents, pp. 70, 96–98, 138–141.

Randy Stern, Advanced Imaging, pp. 32, 34, 59 (Jun. 1989).

Xerox/Kurzweil, Cambridge, Massachusetts (Personal Reader brochure, 1988).

Ian L. Baily, Lawrence H. Boyd, Wesley L. Boyd, and Marleen Clark, American Journal of Optometry and Physiological Optics, vol. 64, pp. 678–685 (1987).

J. E. Lovie–Kitchin, George C. Woo, Effect of Magnification and Field of View on Reading Speed Using a CCTV, pp. 308–322, in *Low Vision Principles and Applications* (George C. Woo, ed., Springer–Verlag, New York, 1986).

Robert A. Ulichney, Digital Scaling of Binary Images, (1979) (unpublished M.S. thesis, Massachusetts Institute of Technology).

Journal of Visual Impairment & Blindness, pp. 113–114, (Mar. 1988).

DIGITAL DOCUMENT MAGNIFIER

This invention was made with government support under SBIR R44 EY-07816 awarded by the National Institutes of Health. The government has certain rights in the invention.

This is a continuation of application Ser. No. 07/691,631, filed Apr. 24, 1991, entitled DIGITAL DOCUMENT MAGNIFIER, now abandoned.

Microfiche Appendix containing 707 microfiche and 11 pages is enclosed as a part of the specification.

BACKGROUND OF THE INVENTION

This invention relates to a system for magnifying printed materials. More particularly, this invention relates to a system in which printed material for documents is digitized and processed by a microprocessor, and then displayed for viewing.

Persons with poor eyesight often have difficulty reading printed material such as books and magazines. Other types of printed material such as labels from food products also present difficulties to low vision patients.

Devices which can be used to magnify printed material would be useful to assist low vision patients in reading printed documents. Devices presently existing for magnifying printed materials include optical magnifiers, closed-circuit television (CCTV) magnifiers, and computer magnifiers used together with optical character recognition devices. However, these devices may have several disadvantages. For example, optical magnifiers induce postural tension and fatigue due to short viewing distances. CCTV magnifiers require extensive, accurate and constant manipulation of a document being viewed. Optical character recognition devices are very slow and error-prone, and do not provide adequate processing capability to present graphics symbols.

In addition, the software also provides such factors as "visors" to conceal all but the line presently in view. In view of the foregoing, it is an objective of this invention to provide a system which magnifies printed material with improved ergonomics.

It is another objective of this invention to provide a system which can present text and graphics, and can recognize page format.

SUMMARY OF THE INVENTION

These and other objects of the invention are accomplished in accordance with the principles of the invention by providing a system which scans and digitizes printed information, processes the information, and outputs the processed information to a display screen. The digital document magnifier of the present invention uses a format analyzer to determine the contents of a document, and then automates presentation of the document to the viewer.

The digital document magnifier uses a unique system (hardware and software) architecture to produce smooth panning and scrolling of very large digitized images, with smoothed (interpolated) magnification, in an economical manner. The system includes a microprocessor which receives information from an optical scanner and outputs a processed image to video memory. The contents of the video memory are then displayed on a monitor for viewing.

Central to this architecture is the use of a two-dimensional circular display buffer. This buffer may be described as "toroidal," because the top and bottom, as well as left and right edges of the display surface are joined to form a continuous surface. The two-dimensional circular display buffer is referred to herein as a "toroidal buffer" or "toroidal display surface."

The software includes a layered architecture enabling the user to review more simply and efficiently magnified documents on the display screen. The processed information can be presented as a continuous line of material, stitching lines together without carriage returns. In addition, the software also provides such features as "visors" to conceal all but the line presently in view.

The preferred embodiment of the digital document magnifier of this invention is a stand-alone reading appliance which is particularly economical to produce.

BRIEF DESCRIPTION OF THE DRAWINGS

Further features of the invention, its nature and various advantages will be more apparent from the accompanying drawings and the following detailed description of the invention, in which like reference numbers refer to like parts, and in which.

DETAILED DESCRIPTION OF THE INVENTION

The system of this invention can be used to process and magnify printed information for various purposes. For example, the system may be used to scan reading materials or packaging from common household items (e.g., vision impaired persons may view food packages). Alternatively, the system may be used as a teleprompter for television newscasters. The system may also be used as an "intelligent" photocopy machine which can digitize printed information, separate text from graphics, and then clean up and correct the printed text before producing a copy.

Figure 1:
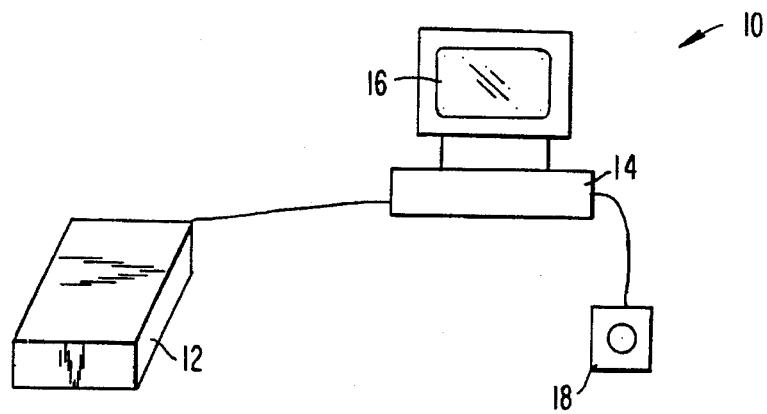
FIG. 1 is a schematic diagram of a system constructed in accordance with the principles of this invention.

Referring now to FIG. 1, the system of the present invention, designated generally by reference number 10, includes a digital image scanner 12, a DDM processor 14, a monitor or display device 16, and a user control device 18.

Display monitor 16 preferably has a display resolution of 640 pixels wide (horizontal) by 480 lines (vertical). This permits Video Graphics Array (VGA) standard computer displays, broadcast-type monitors, and television sets to be used as display devices. The organization of Video Random Access Memory (VRAM) 30 and microprocessor 20 requires that the display buffers be exactly a binary power in pitch (i.e., in extent in the horizontal dimension). The methods used to obtain vertical circularity of the toroidal buffer also require the use of a binary power. Thus, the optimum size (i.e., extent) for the display buffers is 1024 pixels wide by 512 lines (next larger binary powers from 640×480 display resolution) for both one bit per pixel ("1BPP") and four bits per pixel ("4BPP") display modes. Examples of commercially available display monitors suitable for use as monitor 16 include Zenith model ZCM1492 (VGA color), Zenith model ZMM149 (VGA monochrome), and Princeton Graphics model MAX-15 (VGA monochrome). Also, any television set, coupled with a modulator such as Radio Shack model 15-1273, may be used as monitor 16.

When used as a system for visually impaired users, the digital display magnifier utilizes a monochrome display. Monochrome displays provide the high contrast image needed by a majority of visually impaired users. Monochrome displays require a single data bit per pixel to produce an image. Greyscale and color display capability typically may be provided by the digital document magnifier processor hardware, using a single toroidal display buffer, to support special user needs which may arise. Greyscale and color displays require four data bits per pixel to produce an image. The data requirements of monochrome, greyscale, and color displays are discussed in greater detail below.

Digital image scanners suitable for use with the digital document magnifier of the present invention are commercially available, for example, from TEC (model S-3401-ST) and from Ricoh (model IS11). Image scanner 12 preferably is a monochrome image scanner having a resolution of at least 300 spots per inch (SPI). Image scanner 12 also includes a means for interfacing with DDM processor 14 (e.g., the Small Computer System Interface (SCSI) interface discussed below). Image scanner 12 typically may include an 8.5 inch×11 inch platen, to scan conveniently standard-sized documents. However, one skilled in the art will appreciate that other image scanners, such as hand-held scanners, could be used as image scanner 12.

User control device 18 provides the viewer with a means for selecting viewing options from a menu presented on display on monitor 16 and for controlling the position of a cursor on the viewed document. User control device 18 preferably is a commercially available trackball device, such as model FASTTRAP from Microspeed. Alternatively, user control device 18 could be a standard joystick or mouse pointing device. The user control device is coupled to DDM processor 14 via the RS-232 port of a commercially available UART device. A UART device suitable for use in the present invention is the Signetics 2681 DUART, which provides a second RS-232 port for future expansion. However, any UART may be used.

SYSTEM ARCHITECTURE

Two linked technical innovations enable the digital document magnifier to function efficiently: a toroidal display buffer, and very fast incremental zoom. The document image is zoomed "on the fly" to the display buffer. The image is zoomed only as needed to accomplish the pan or scroll motion, rather than zooming the whole document image. The toroidal display surface makes it necessary to update only the newly revealed portion of the display for both pan and scroll motions.

Previous methods used to achieve computer logic-based zoom effects include hardware pixel replication and software conversion of whole images. The former method is limited to whole-number magnification steps, requires additional computing hardware, and cannot be used to obtain high quality (smoothed), enlarged displays. The latter method requires sufficient memory space to contain the enlarged image (for 50 power magnification of an 8.5 inch by 11 inch page image scanned at 300 SPI, 64 million bytes of image storage would be required).

The architecture of the present invention achieves the desired display effects while minimizing memory and computing requirements through a combined hardware/software strategy based on a specific organization of computer memory. The image memory is divided into two areas: the page buffer, and the display buffer.

The page buffer contains the scanned image as a binary bit map. This buffer cannot be displayed directly. This constraint permits "packing" of image data, conserving about 500 Kbytes of storage as compared to a directly displayable image, which requires binary-power line length. The page buffer is formed in DRAM 28, rather than displayable VRAM 30.

The contents of the display buffer appear on the screen. The display buffer is updated from the page buffer during pan or scroll in 60 increments per second, to provide the appearance of smooth motion. This update is performed using a very fast software zoom algorithm, referred to below as "incremental template zoom". Thus, the size transformation of the page image is performed dynamically, as required, during pan or scroll. The display buffer is organized as a continuous surface (toroid) so that only a small strip of the source page buffer must be moved (zoomed) to the display buffer per increment of pan or scroll motion. This greatly reduces computing time.

An update of the entire display screen in buffer memory could take up to one second using the template zoom methods, 60 times slower than the rate required to create the appearance of smooth motion. The toroidal buffer permits the continuous and incremental update of the display in both x and y dimensions, without the need to update the entire display buffer when the extents of display memory are reached.

The physical display buffer memory is very different from the logically toroidal display buffer. The physical display buffer memory has a fixed starting point (origin) and fixed size (extents). The toroidal buffer that is constructed from the physical display memory has a continuous surface. The toroidal buffer has an origin which moves with respect to the origin of the physical display memory, and which corresponds to the display screen upper left corner.

Figure 2:
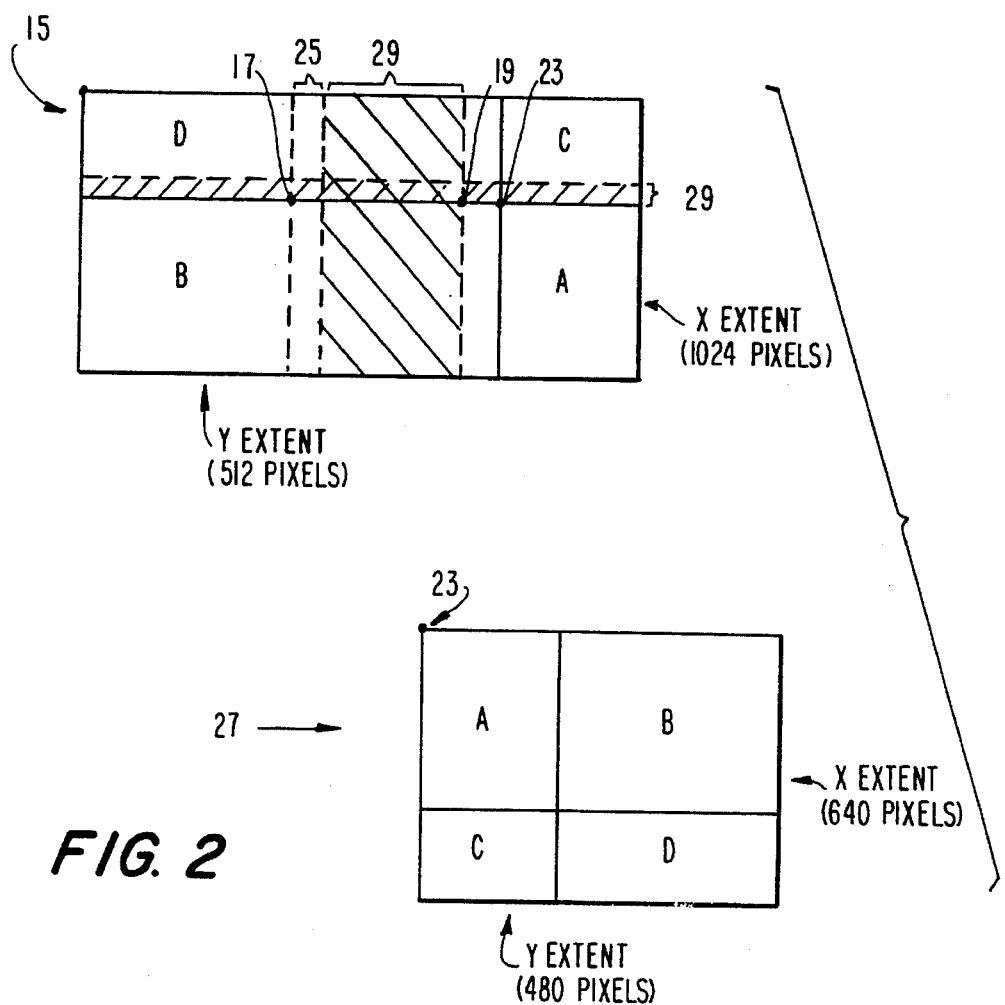
FIG. 2 is a schematic diagram of the display buffer of the present invention.

FIG. 2 shows the toroidal buffer of the present invention. The physical display buffer memory 15 has an origin 13 which is shown in relation to origin 23 of the logically-toroidal display buffer that is constructed from it. Toroidal buffer origin 23 always corresponds to the upper left corner of display screen 27. Toroidal buffer origin 23 may lie anywhere within display buffer memory 15, and is shown offset from display buffer memory origin 13 in both the x and y dimensions.

Incremental update of the logically-toroidal display buffer is managed by software, while reconstruction of the buffer to the display screen during display refresh is accomplished by hardware means. FIG. 2 shows image segments "A" through "D" corresponding to the physical memory locations of a coherent image contained in the logically-toroidal buffer. The image segments wrap around the physical buffer memory extents in both x and y dimensions. To reconstruct this image to the screen, the display monitor refresh starting point is set to toroidal buffer origin 23. Segments B through D must be mapped to the correct positions on display screen 27. The preferred embodiment of mapping segments by display memory address transformation is described below. (An alternative embodiment using the hardware windowing capability of an Intel 82786 graphics controller is also described below.)

The toroidal display buffer is created expressly to support incremental and continuous update of the screen as follows. The toroidal display buffer is made larger than the screen extents to provide for hidden update 25 of the buffer just beyond the screen edges. To produce a continuous leftward-moving panning motion, for example, a strip of display memory 25 with extent equal to the increment of motion is written from the page buffer to the display buffer just beyond the right edge of screen 17, using the incremental template zoom. The toroidal buffer origin is then moved by the increment of motion from 19 to 23, moving the display refresh update starting point accordingly. Hatched area 29 corresponds to "stale" image data. In the example of FIG. 2, the display buffer memory extents are binary powers, but this need not be the case.

Note that it is possible for the update increment to straddle one or both extents of the display buffer memory. The incremental template zoom software routines support such an update using clipping operations described below.

DDM Processor Overview

Figure 3:
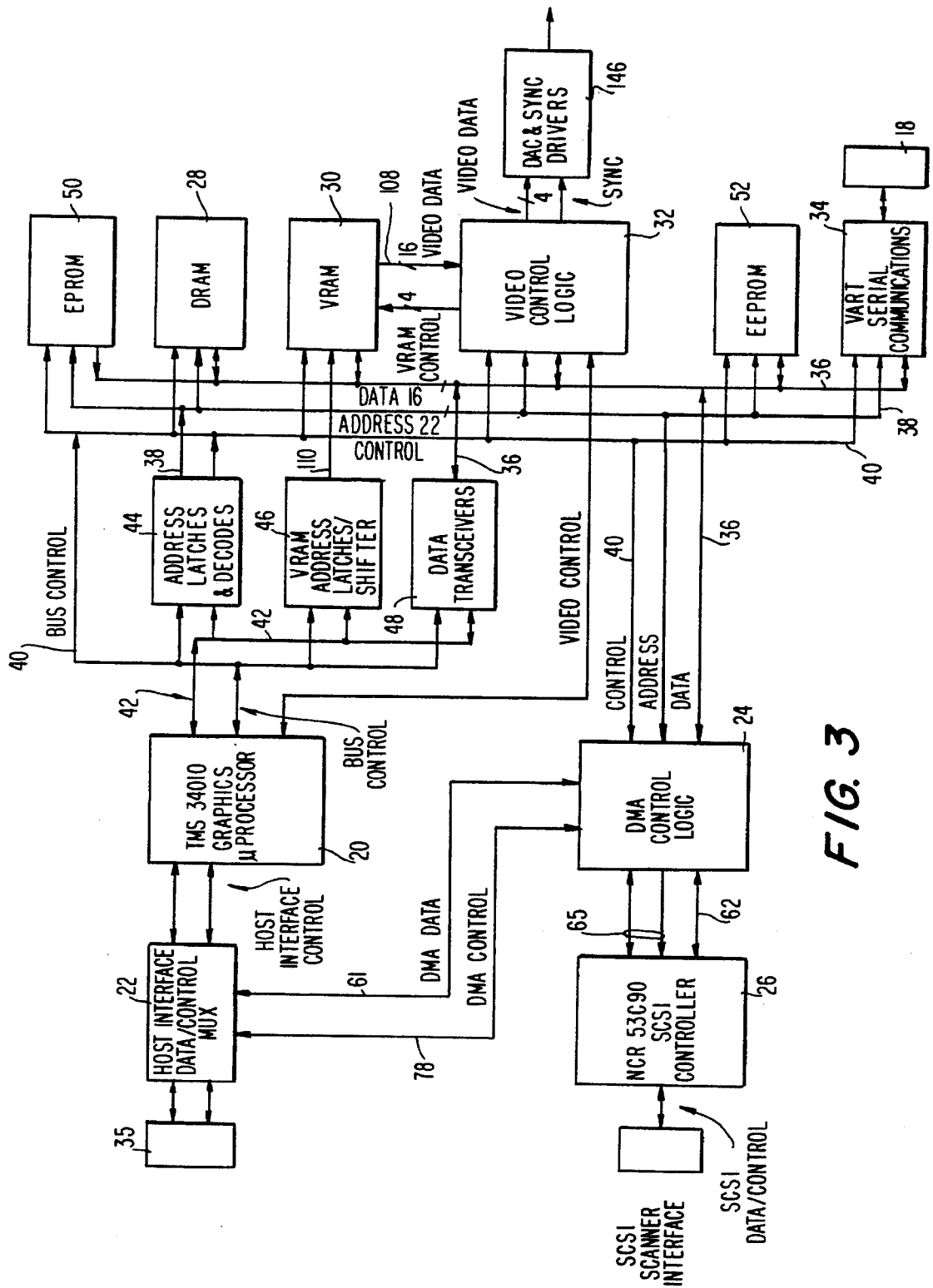
FIG. 3 is a schematic diagram of the digital document magnifier (DDM) processor of FIG. 1.

Referring now to FIG. 3, DDM processor 14 includes a microprocessor 20, a host interface multiplexer 22, direct memory access (DMA) control logic 24, a Small Computer Systems Interface (SCSI) controller 26, dynamic RAM (DRAM) 28, video RAM (VRAM) 30, video control logic 32, and serial communications circuitry 34 (for connecting user control device 18). DDM processor 14 may also include an internal, commercially available, fixed disk drive (not shown) for storing digital data from digital image scanner 12. The fixed disk drive typically may be coupled to the SCSI interface.

Figure 4:
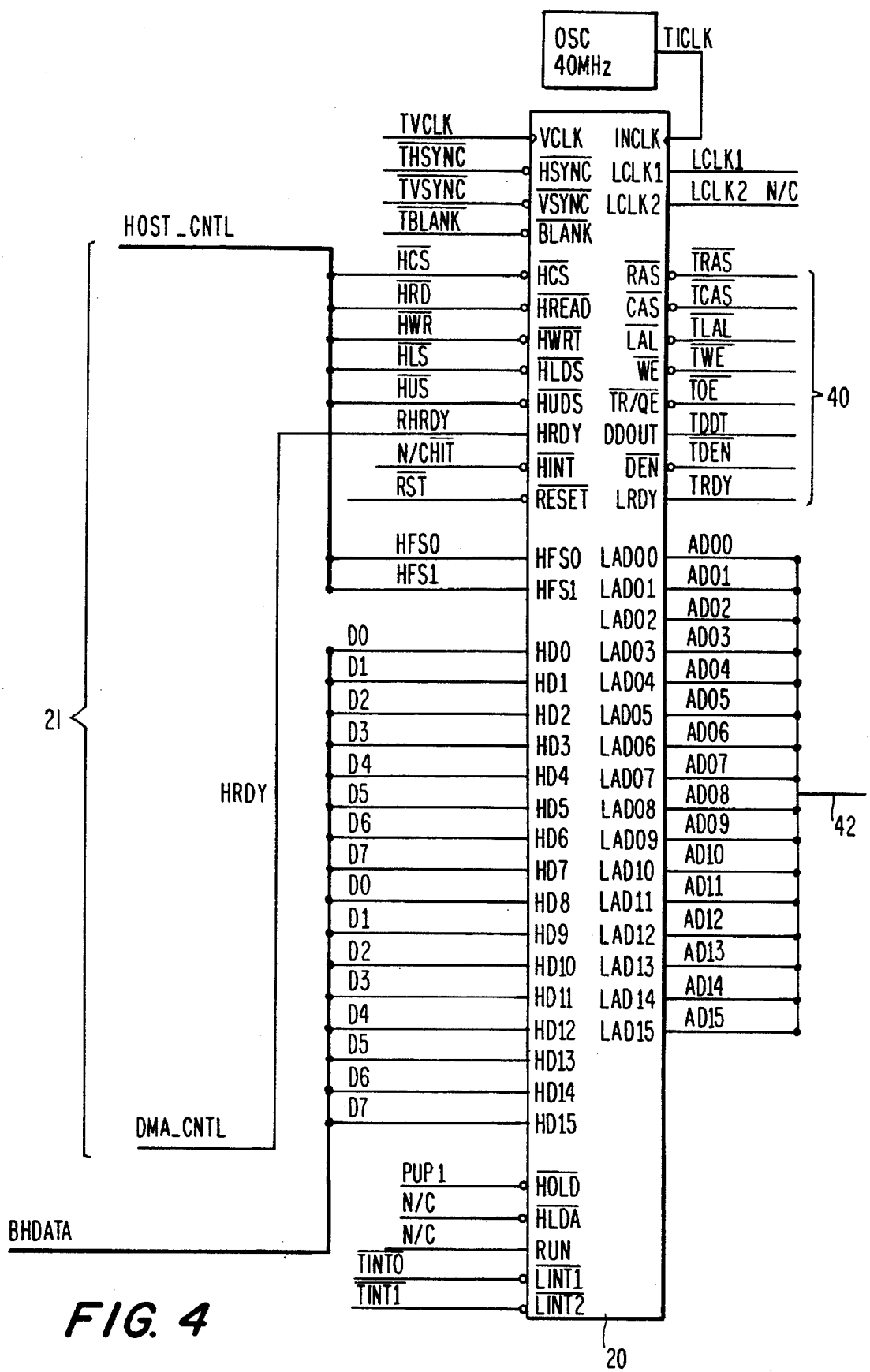
FIG. 4 is a block diagram of the microprocessor of FIG. 3.

Microprocessor 20 includes three main interface groups (shown in greater detail in FIG. 4). The microprocessor includes busses 21 (for interfacing with a host ("the host interface")), a local address and data bus (the "LAD bus") 42, and a video interface bus 40. Preferably, a single graphics microprocessor is used for all computational and display control functions, thereby reducing costs. The microprocessor described herein as microprocessor 20 is a Texas Instruments graphics processor, model TMS34010. However, one skilled in the art will appreciate that this invention could be practiced using a general purpose microprocessor in conjunction with a graphics controller chip or application-specific video control logic circuit.

In the preferred embodiment, control logic 24 is coupled to host interface 21 of processor 20 via host interface multiplexer 22. Processor 20 uses the host interface bus as an interconnect to a personal computer for software development (engineering) purposes, through a cable and special PC interface card 35. This permits standard "debugger" software to be used (e.g., Pixelab GSPOT). The debugger views the digital document magnifier hardware as a PC "add-on" graphics card. Host interface multiplexer 22 multiplexes control logic 24 and PC interface card 35 to processor 20.

Scanner Interface and DMA Channel

DDM processor 14 receives digitized information from optical scanner 12 via a SCSI interface. Although reference is made herein to a SCSI interface, it will be understood that any suitable interface may be used. For simplicity, only a SCSI interface and related hardware will be discussed.

The scanner SCSI interface is coupled to SCSI controller 26, which, in turn, is coupled to DMA control logic 24. SCSI controller 26 implements SCSI interface protocol. A controller suitable for use in this invention is commercially available from NCR (model NCR 53C90A). DMA control logic 24 is coupled to microprocessor 20. DMA control logic 24 typically may also be connected to data, address, and control busses 36, 38, and 40.

Host interface 21 of processor 20 provides a low-cost direct memory interface path for the image scanner. Host interface bus 21 provided by processor 20 is used to move scanned image data efficiently into DRAM 28 using the DMA technique. An 8.5 inch×11 inch scan area, at 300 spots per inch (SPI) resolution, produces over one million bytes of data per scan. During scanning, processor 20 performs document format analysis. Thus, efficient data transfer is important to free Central Processing Unit (CPU) time for computation.

DMA controllers typically provide address generation with auto-increment capability, a bus arbitration handshake mechanism, a transfer controller, and a transfer counter. The host port of processor 20 provides address generation with auto-increment capability, and a bus arbitration handshake mechanism. SCSI controller 26 provides DMA request/ acknowledge handshaking (via bus 65) and a transfer counter.

Figure 5:
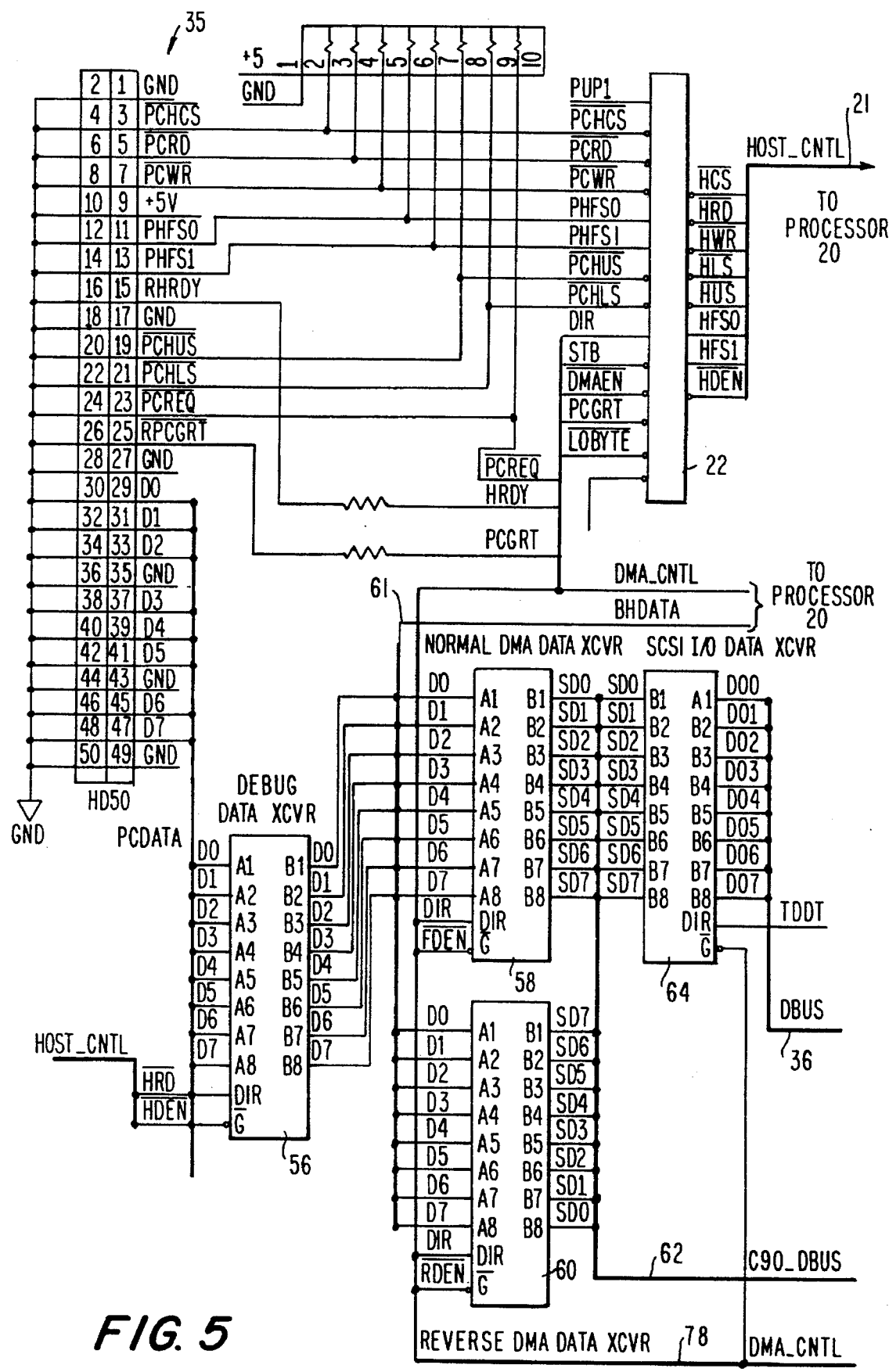
FIG. 5 is a schematic diagram of a direct memory access data path of FIG. 3.
Figure 6A:
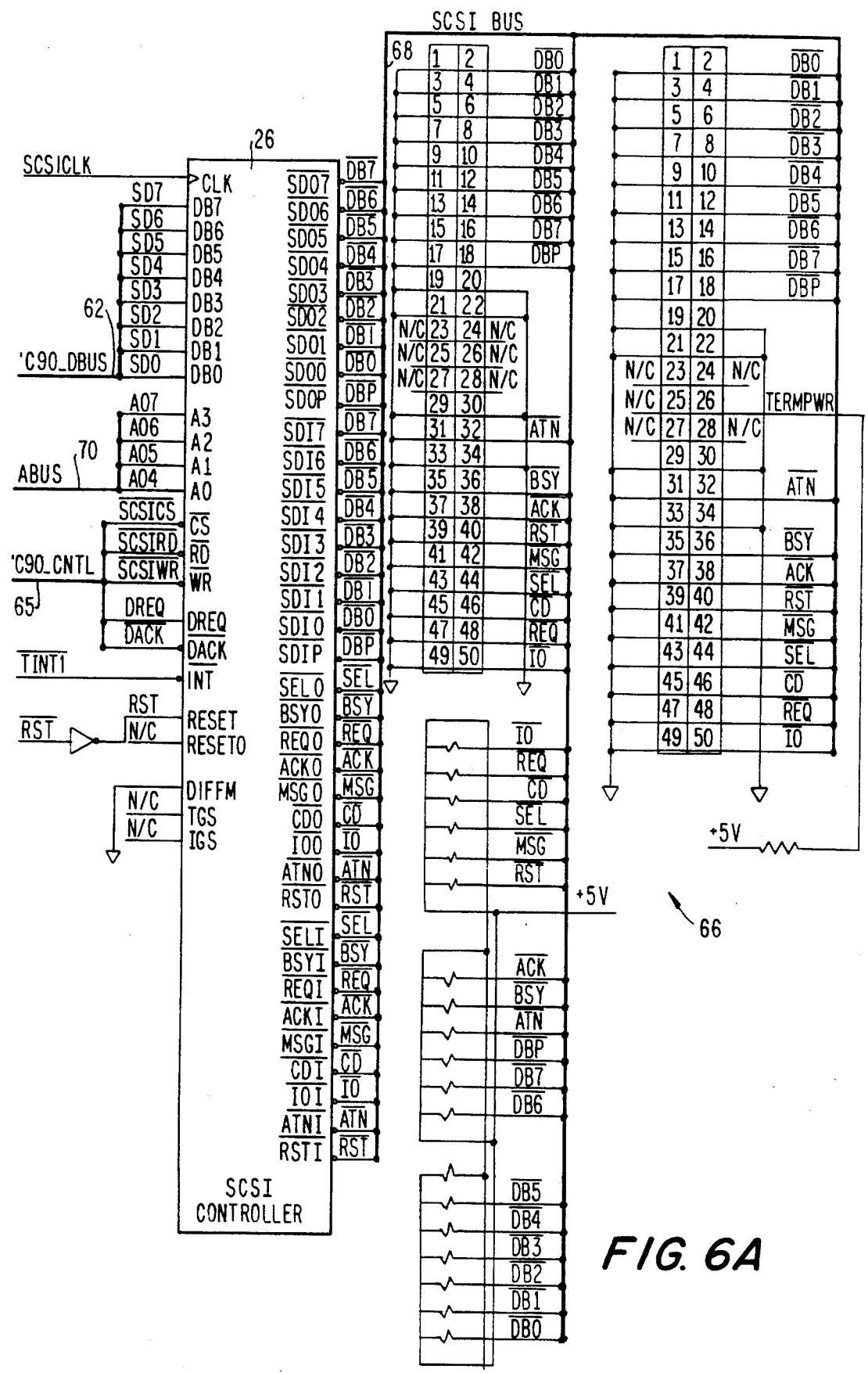
FIG. 6A is a schematic diagram of the SCSI control circuitry of FIG. 3.
Figure 6B:
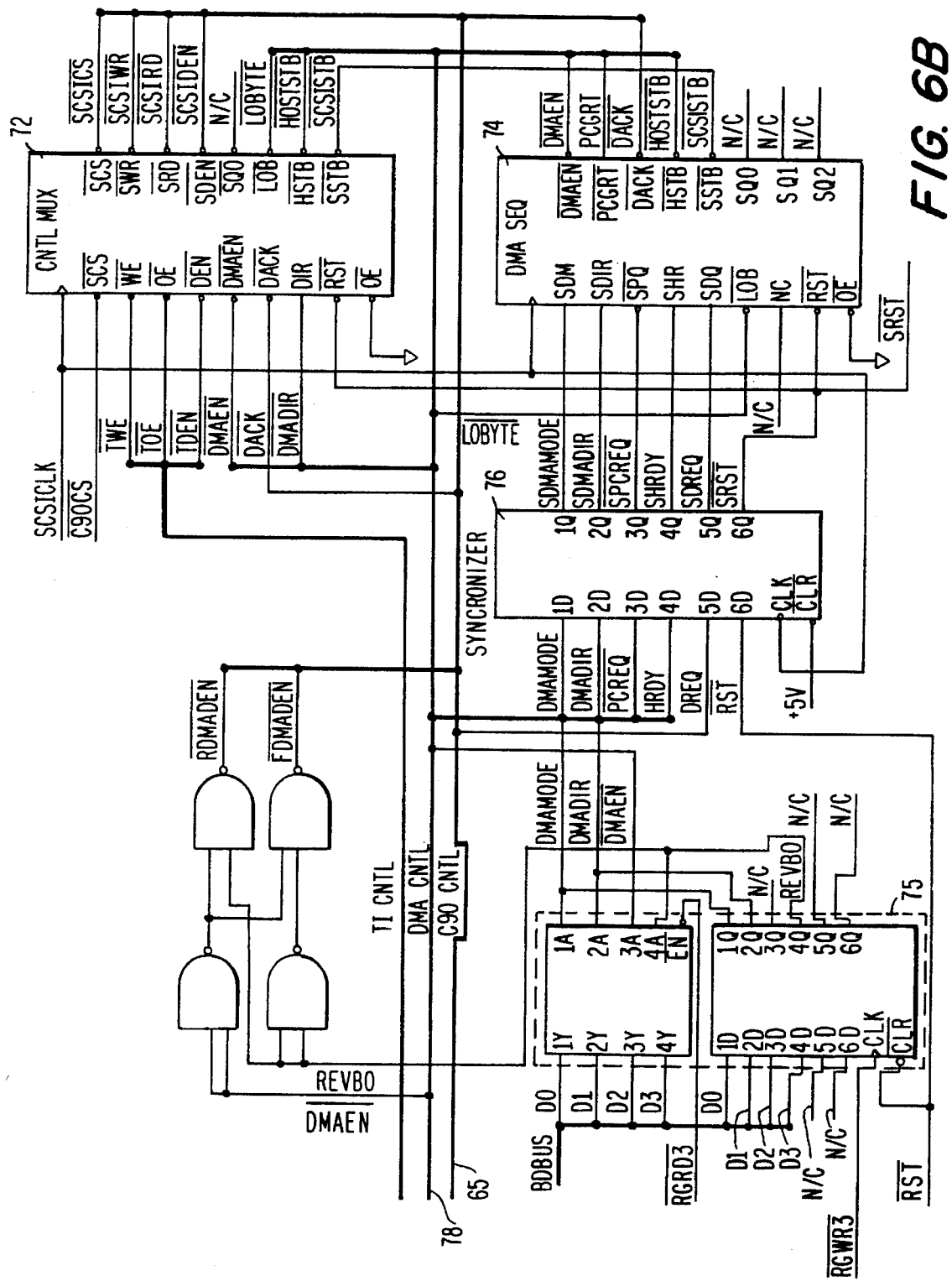
FIG. 6B is a schematic diagram of the direct memory access control logic of FIG. 3.

The DMA circuitry of the present invention is shown in greater detail in FIGS. 5 and 6B. A data transceiver 56 passes data between PC connector 35 and processor 20. Data transceivers 58 and 60 enable the DMA data transfer between image scanner 12 (via SCSI controller 26) and host interface 21 of processor 20 on bus 61. Data pass from scanner 12, through SCSI controller 26, onto bus 62. Data pass to host port 21 of processor 20, and then into DRAM memory through either transceiver 58 or 60. Data transceiver 58 transmits commands and receives responses from the scanner. Transceiver 60 receives image data, because the preferred scanner 12 (TEC) uses the image data bit-ordering convention of Personal Computers (Intel 8086 convention), which is the reverse of the Texas Instrument (34010) convention. Data on bus 36 may also pass to/from local memory bus 42 via transceiver 64. SCSI controller 26 must be coupled to processor 20 so that the processor can program registers internal to the SCSI controller, to set up transfers from optical scanner 12. All data paths typically may be eight bits wide for economy.

Host interface 21 of processor 20 provides an internal address register with auto-increment capability. The CPU section of processor 20 sets the internal register to a starting address. Data may then be transferred continuously to or from memory on bus 36 via the host interface data lines, without CPU intervention. Host interface bus 21 provides access to memory on LAD bus 42 with arbitration and address and control signal generation. The data may be read or written as single bytes. Byte assembly into words is performed automatically by the host interface logic, again without CPU intervention.

FIG. 6A shows SCSI controller 26 coupled to the SCSI connectors 66 via SCSI bus 68. SCSI bus 68 preferably provides sufficient data and control lines for coupling simultaneously up to eight devices to SCSI connectors 66. SCSI controller 26 receives eight bidirectional data bits via bus 62, four address bits via bus 70, and control and DMA handshaking bits via bus 65.

The remaining element required for a complete DMA control scheme is a transfer controller. The circuitry of FIG. 6B provides this function. Control information from bus 65 is input to a "control" multiplexer 72, a DMA sequencer 74, a DMA control register 75, and a synchronizer 76. Sequenced control signals are output via bus 78 to control data transceivers 58, 60, and 64, and host interface multiplexer 22.

Processor 20 accesses control register 75 via the LAD bus to enable DMA operation, set the direction of the DMA transfer (to or from the selected SCSI device), and set the bit ordering convention to be used for the DMA data transfer (see above). DMA sequencer 74 is a synchronous state machine implemented by programming a standard PAL device.

The state machine receives a DMA transfer request from SCSI controller 26, and responds with the DMA acknowledge signal if the host bus is available. The state machine then generates the data path enables and data strobes needed to accomplish the transfer of a data byte between SCSI controller 26 and host interface 21. Synchronizer 76 ensures that all state machine inputs are clock synchronous. Multiplexer 72 switches access to the SCSI controller's control signals between processor 20 and DMA sequencer 74.

Graphics Processor Address and Data Paths

Microprocessor 20 is coupled to LAD bus 42 (see FIG. 4). LAD bus 42 is a triple-multiplexed bus. LAD bus 42 is time multiplexed to provide high address, low address and data on 16 pins. Control bus 40 provides signals to control external de-multiplexing of bus 42. LAD bus 42 couples microprocessor 20 to address latches and decoders 44, video memory address latches 46, and data transceivers 48.

Figure 7:
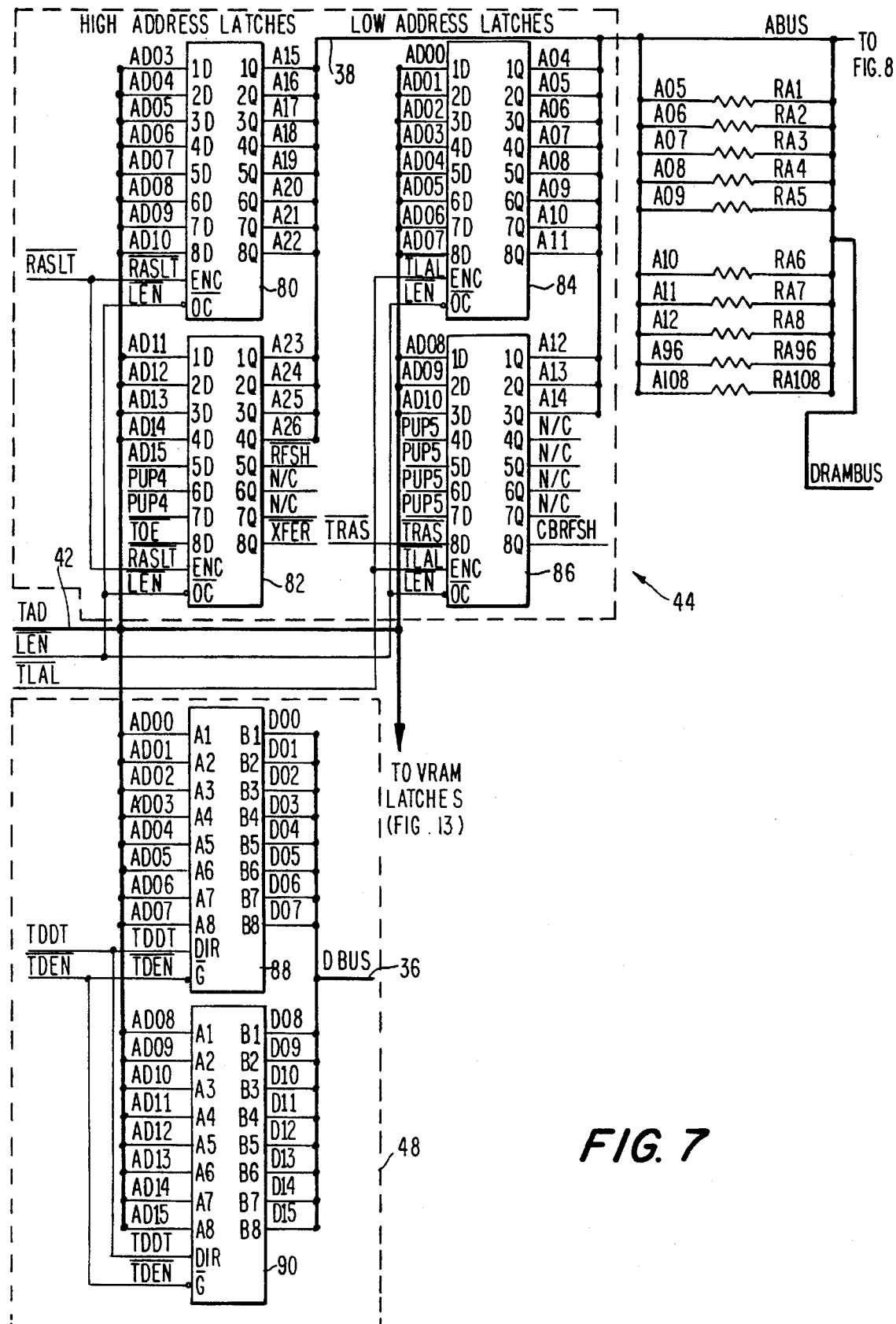
FIG. 7 is a schematic diagram of the data path and dynamic RAM address circuitry of FIG. 3.
Figure 8:
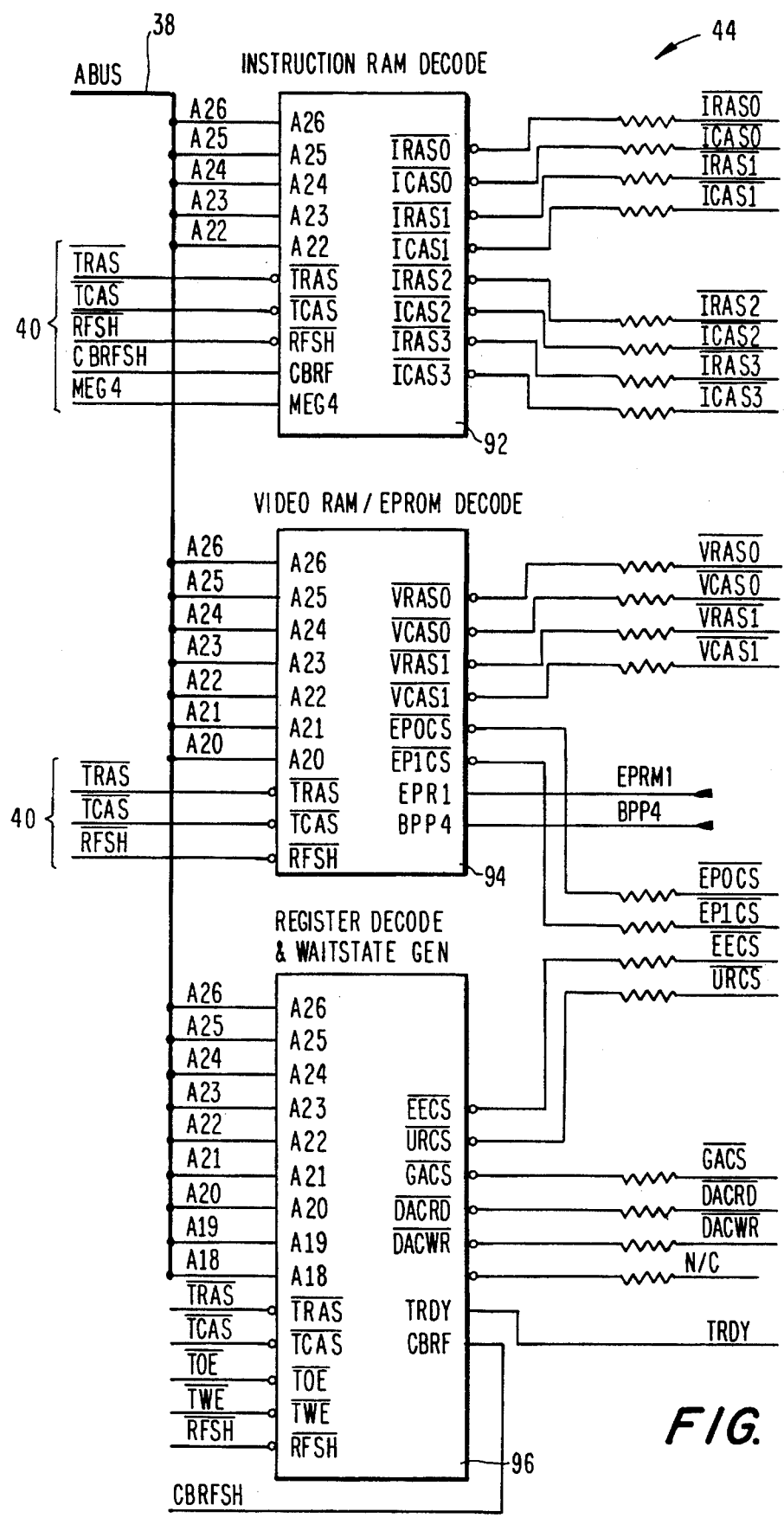
FIG. 8 is a schematic diagram of the address decoder circuitry of the present invention.

Referring now to FIG. 7, octal address latches (80, 82, 84, and 86) and data transceivers (88 and 90) de-multiplex bus 42 for interface with memories and memory-mapped input/output (I/O) devices. Specific memory addresses are assigned to the various memories and I/O devices via chip select signals, as decoded by programmable logic arrays (PALs) 92, 94, and 96 (FIG. 8). The LAD bus is de-multiplexed and address decoded using conventional techniques, with the exception of de-multiplexing and decoding for the Video RAM (VRAM), from which the toroidal display buffer is constructed (discussed below).

Bus 42 is input to high address latches 80 and 82. The output of latches 80 and 82 is input to Instruction RAM Decode PAL 92, Video random access memory and EPROM Decode PAL 94, and Register Decode and Waitstate Generator PAL 96, via address bus 38. The output of low address latches 84 and 86 is transferred via address bus 38 to SCSI controller 26, and to DRAM 28 (as well as to UART, D/A converter circuitry, and video control logic discussed below). The output of high and low address registers 80, 82, 84, and 86 is also coupled to EPROM 50.

Data passes between LAD bus 42 and data bus 36 through transceivers 88 and 90. As shown in FIG. 3, data bus 36 provides a data path between processor 20 (via data transceivers 48) and EPROM 50, DRAM 28, VRAM 30, Video control logic 32, electrically erasable programmable read-only memory (EEPROM) 52, UART 34, and DMA control logic 24. In a similar manner, bus control signals are transmitted from processor 20 to these devices via control bus 40.

LAD bus 42 also inputs to VRAM address latches 46. Processor 20 addresses VRAM 30 via bus 42, VRAM address latches 46, and VRAM address bus 110.

The video control signals of processor 20 permit synchronization and blanking of typical raster-scanned display devices using only minimal external hardware. The video control signals, and the internal registers of processor 20 which configure them, are used in a conventional manner. The video control and data path external to processor 20 are novel, and are described in detail below.

Memory and I/O Devices

Figure 9A:
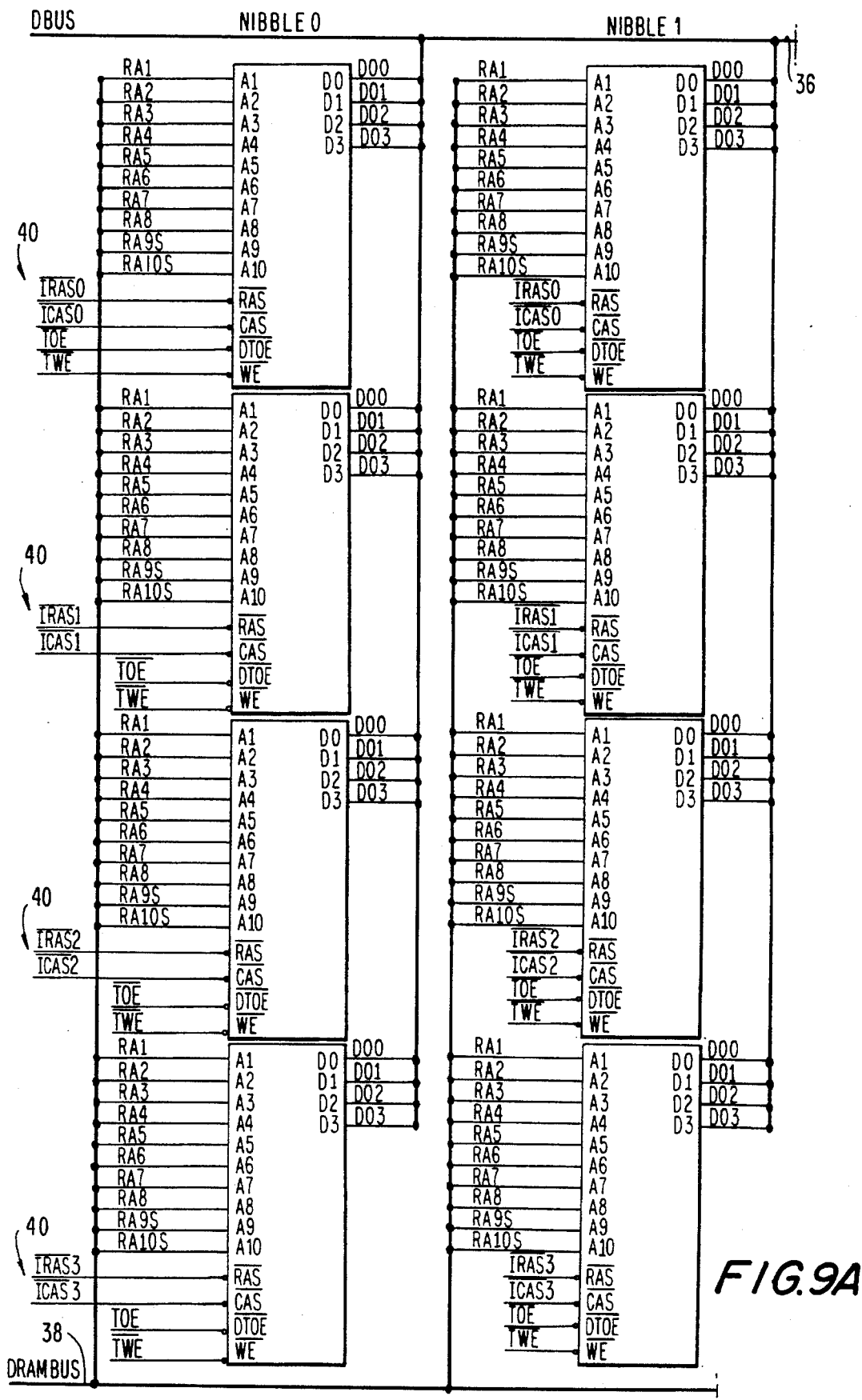
FIG. 9A and 9B are schematic diagram of the dynamic random access memory (DRAM) of FIG. 3.
Figure 9B:
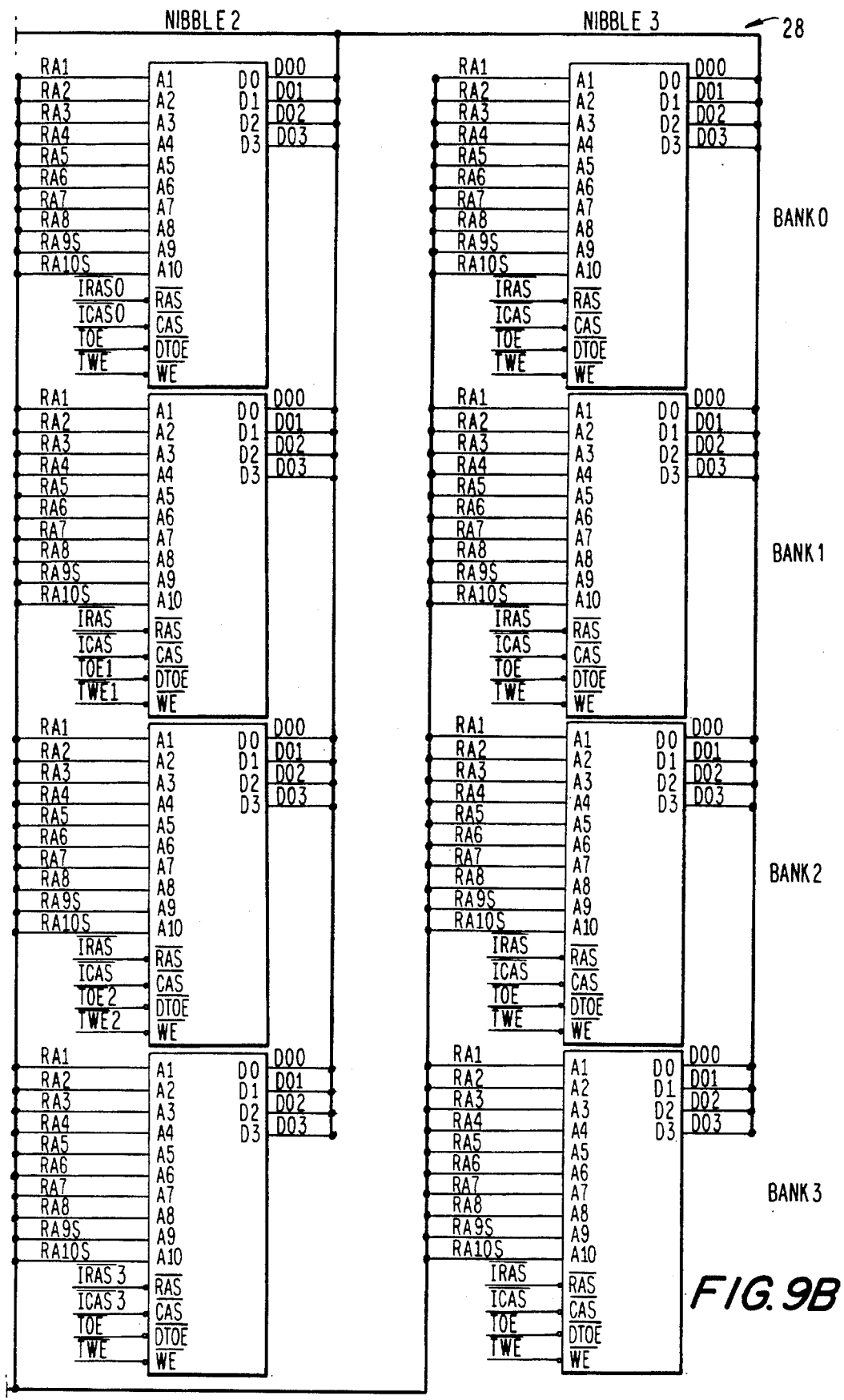

DDM processor 14 includes DRAM 28 (FIG. 9) for storing page images and for fixed and dynamic allocation of software variables. DRAM 28 may be organized in any of several formats. Preferably, DRAM 28 includes 1.5 to 2 Mbytes of memory, consisting of twelve to sixteen 256-Kbyte×4 devices, or includes 2 to 8 Mbytes of memory consisting of four to sixteen 1-Mbyte×4 devices. The larger memory configurations provide storage of up to 50 page images, using CCITT (facsimile transmission type) data compression. Memory devices suitable for implementing DRAM 28 include models TC514256AZ-10 (256K×4) and TC514400Z-10 (1M×4), which are commercially available from Toshiba.

Figure 10:
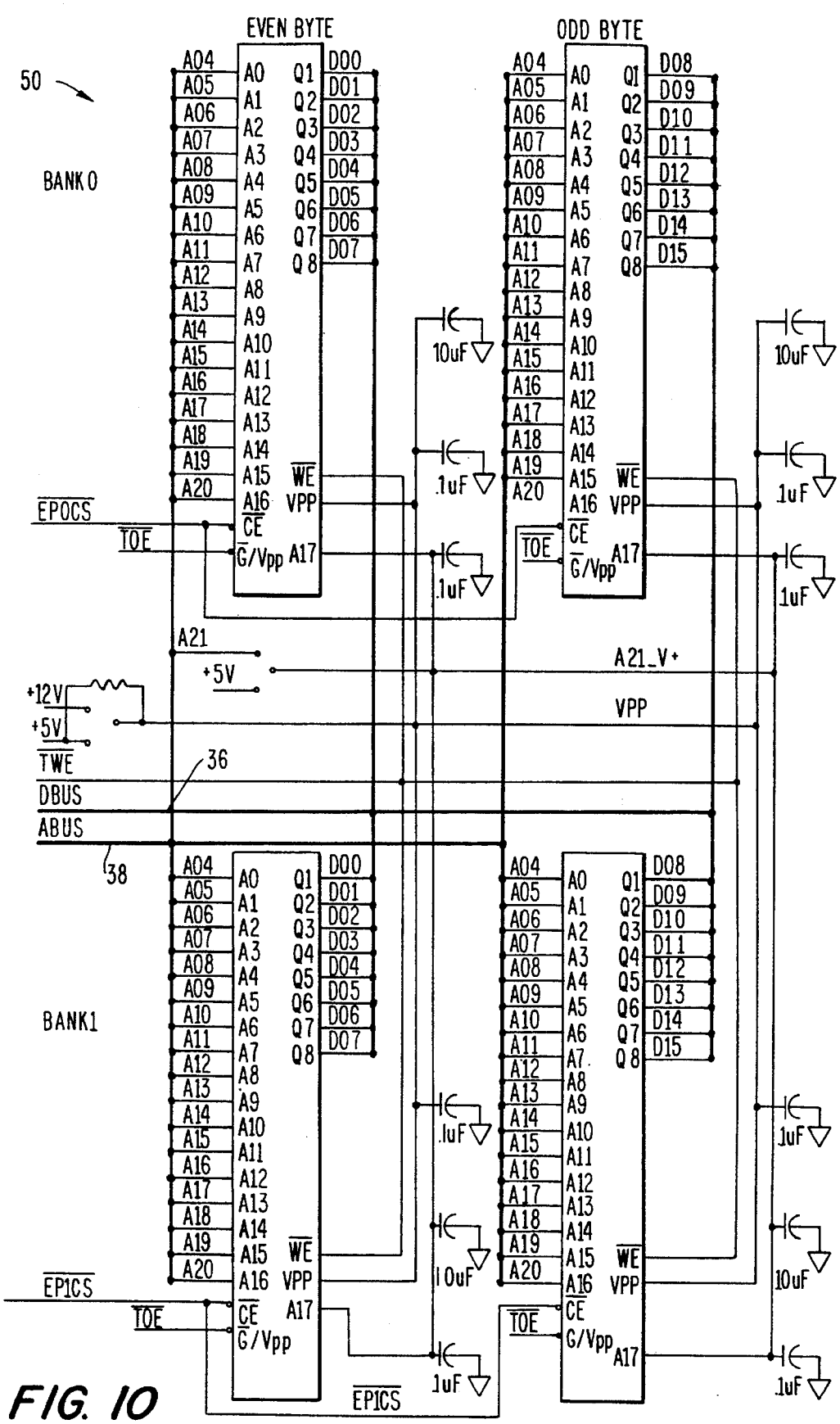
FIG. 10 is a schematic diagram of the erasable programmable read-only memory (EPROM) of FIG. 3.

DDM processor 14 also includes memory for performing other functions. DDM processor 14 includes EPROM 50, which is shown in greater detail in FIG. 10. EPROM 50 includes 256 Kbytes to 1 Mbyte of erasable programmable read only memory for storing all software programs required by DDM processor 14, and for storing fixed data. EPROM 50 may be implemented, for example, using two to four 512-Kbit×8 EPROMs, or a 2-Mbit×8 EPROM. Memory devices suitable for implementing EPROM 50 include models 27C512, 27C1024, and 27C2048, which are commercially available from Intel Corporation and Advanced Micro Devices, Inc. Any generic EPROM of 512K bits or larger can be used.

DDM processor 14 also includes EEPROM 52. EEPROM 52 is used for non-volatile storage of user-alterable and menu-selected control data. EEPROM 52 permits the digital document magnifier to restore a viewer's preferred settings at power-up. EEPROM 52 is implemented as a single 2-Kbyte×8 device using model 28C16, commercially available from Atmel and Seeq.

Video Display Memory and Toroidal Buffer

DDM processor 14 provides doubly-circular (toroidal) display buffers in hardware. This display memory configuration permits page images to be stored as packed bitmaps which are incrementally written at the hidden edge of the display buffer at the user selected scale factor, for incremental update 25 (see FIG. 2) of the screen image as the user-controlled panning or scrolling motion requires.

Figure 11:
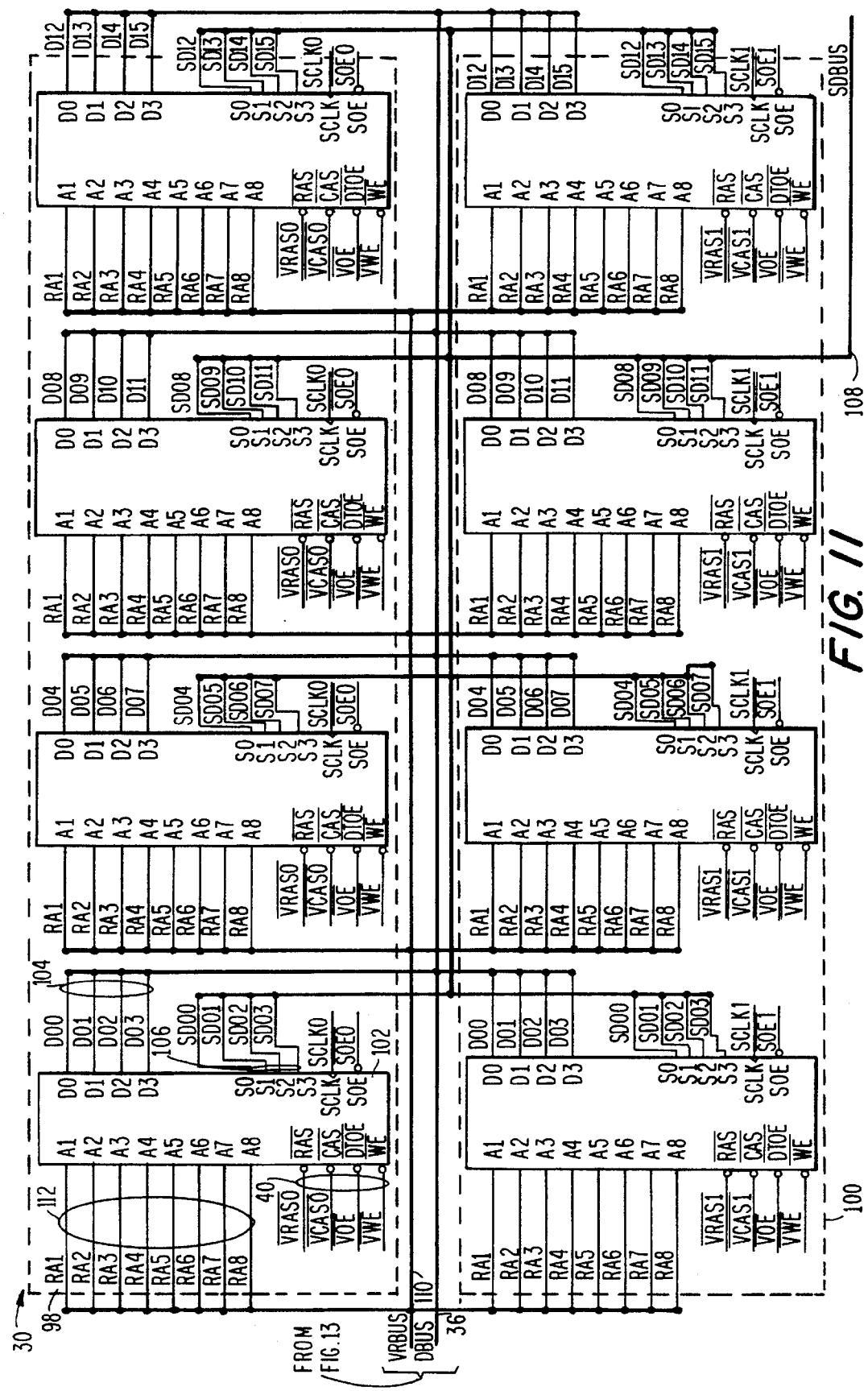
FIG. 11 is a schematic diagram of the video memory of FIG. 3.

Referring now to FIG. 11, VRAM 30 is used to construct the toroidal display buffer. VRAM 30 produces either two or four toroidal buffers at one bit per pixel (1BPP) (for monochrome displays), or one toroidal buffer at four bits per pixel (4BPP) (for greyscale or color displays). Multiple display buffers are provided to permit the display to be switched rapidly between displays (e.g., for switching from a page image to a menu display). VRAM 30 includes 128 to 256 Kbytes of video RAM, and may be implemented using four or eight 64-Kbit×4 devices. Memory devices suitable for implementing VRAM 30 are commercially available and include Texas Instruments model TMS4461 and Vitelic model V53C261.

The digital document magnifier toroidal buffers are constructed by transforming memory addresses to and from VRAM 30. The techniques used to obtain buffer circularity are specific to the internal organization of VRAMs. VRAM 30 increases computing efficiency by freeing the microprocessor bus from the memory cycles continually needed to write the buffered image to the raster-scanned display (display refresh).

Referring to FIG. 11, VRAM 30 preferably includes two banks of VRAM 98 and 100. VRAM bank 98 stores data for 1BPP display mode. VRAM bank 100 is used together with bank 98 to implement the 4BPP display mode. VRAM 30 uses a "dual-port" design as illustrated by VRAM chip 102. One port is a conventional DRAM memory interface 104 to processor 20, and the second port 106 comprises shift registers. Data enter VRAM 30 via DRAM interface 104. The shift registers are loaded with display data to be clocked out at video rates on data bus 108. VRAM 30 receives address information via address lines 112 on VRAM address bus 110.

Each VRAM chip of VRAM 30 includes four memory sections, each with 256 rows and 256 columns of storage. Any memory row in each section can be loaded into a 256-bit shift register (there are four shift registers per chip) in a single operation. The starting point (column) within the loaded row is specified by its column address during the load cycle. The shift registers recirculate. Processor 20 automatically controls the loading of the VRAM shift registers from the memory arrays.

Four 4-bit wide VRAMs are required to connect to the 16-bit wide de-multiplexed data bus of processor 20. Thus, there are sixteen outputs (four VRAMs with four shifters per VRAM) on the video shifter port from the 256-bit shift registers. The sixteen outputs form the video data bus 54. At four bits per pixel, each clock to the shift registers produces four 4-bit pixels. These must be multiplexed off the video data bus, into a 4-bit wide stream, at a rate of four times the shift clock rate. At one bit per pixel (1BPP display mode), each shift clock produces sixteen pixels. These bits must be multiplexed down to a data stream a single pixel wide, at 16 times the shift rate.

The sixteen 256-bit wide VRAM video shift registers provide a total of 4096 bits of storage per display scan-line. At 4BPP, the scan-line is 1024 pixels wide. Two banks of VRAMs (i.e., banks 98 and 100 of FIG. 10) are required to provide 512 rows (scan-lines) of storage. Because the VRAM shift registers recirculate, the horizontal starting coordinate for the display can be positioned anywhere in the display buffer. The display will automatically wrap around the horizontal buffer extents. Thus, the horizontal component of buffer circularity is provided solely from the internal organization VRAM chips 102 for the 4BPP format.

At 1BPP, the 4096 bits of shift register storage provide 4096 pixels per display scan-line, four times that which is required. Because the display buffer must be updated by the processor constantly during panning, the extra storage would be wasted. To increase system efficiency, an address translation is performed to alter the memory organization. The address translation provides two 1024-bit wide, horizontally-circular buffers at 1BPP with a single bank (bank 98) of four VRAMs. Four toroidal buffers are provided using two banks (banks 98 and 100) of four VRAMs each. Thus memory reorganization increases the usable display memory by a factor of four, by using just a single extra latch 126 (FIG. 12).

Figure 12:
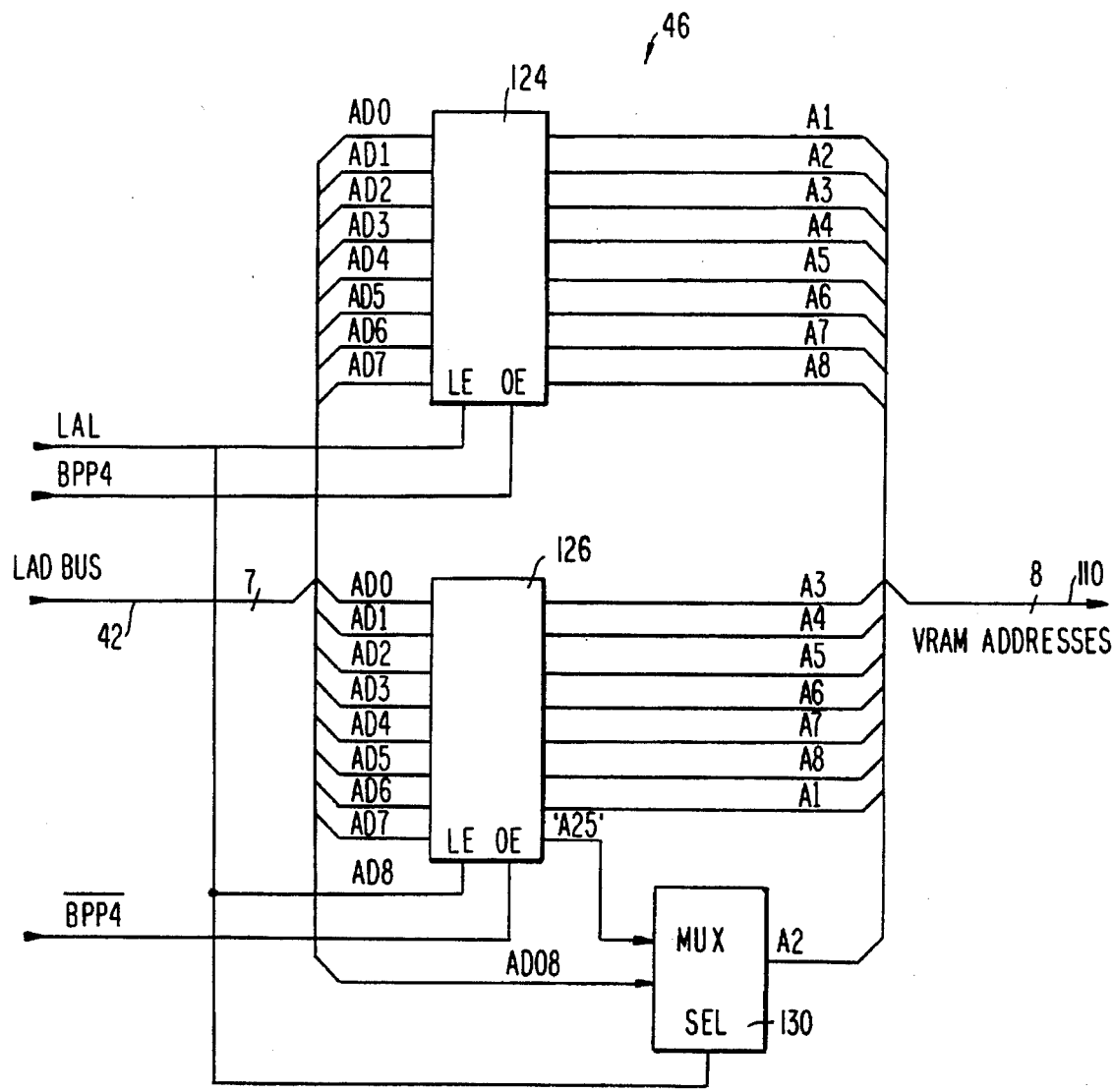
FIG. 12 is a schematic diagram of the video memory address latches and shifter of FIG. 3.
Figure 13:
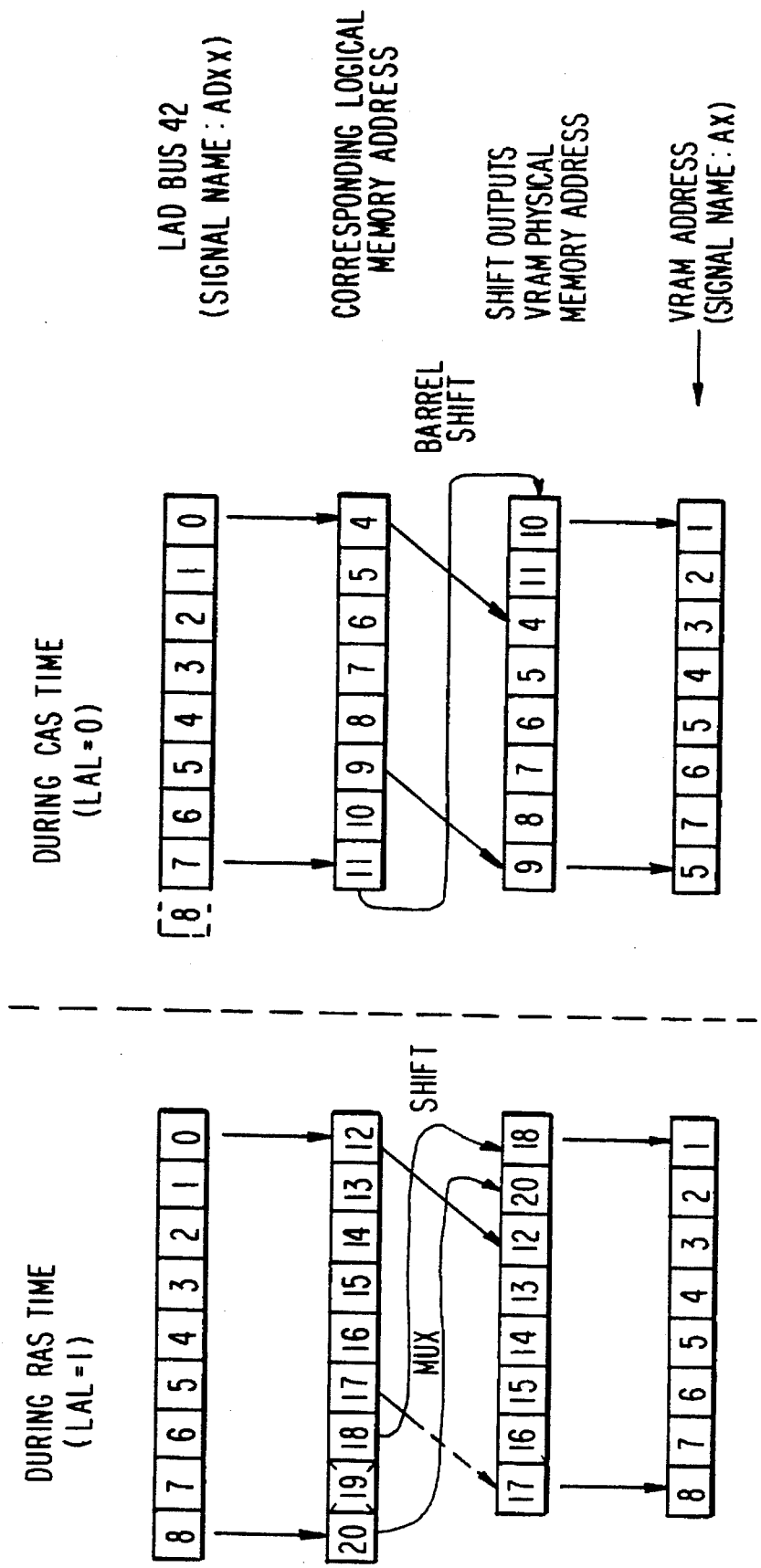
FIG. 13 is a flow chart of the logical operation of the circuit of FIG. 12 operating in the one bit per pixel display mode.

VRAM Address Latches/Shifter 46 is shown in greater detail in FIG. 12. FIG. 13 shows the logical operation of the circuit of FIG. 12 while operating in 1BPP display mode. (Texas Instruments signal nomenclature is used in FIG. 13.) In the 4BPP mode, the RAS/CAS multiplexed address from processor 20 is gated by "straight through" latch 124, which passes latched addresses onto VRAM address bus 110, without alteration. However, in 1BPP mode, latch 124 is disabled, and a second address latch 126 is connected to VRAM address bus 110. The RAS/CAS multiplexed address from processor 20 is "barrel shifted" (see FIG. 12) by connecting latch 126 to LAD bus 42. The two most significant bits of both the row and column addresses become the two least significant bits, with other address bits shifted left by two.

If the display buffer is 1024 bits wide, the "barrel shift" of CAS address (shift register tap point) interleaves video bus words between four successive lines. In other words, data clocked out continuously from the VRAM shifters will consist of 16 pixels of line 1, then 16 pixels of lines 2, 3, and 4, respectively, and then the next 16 pixels of line 1, etc. Video control logic 32 includes a holding register (discussed below) which captures only the video data words corresponding to the current line, thus skipping three out of every four successive video data words in the de-multiplexing process.

The VRAM shifter data will recirculate after the data from the last column are read out of the shift registers. The interleaving of lines causes the wrap-around of any one line to occur at a 1024 pixel-boundary. Thus, the 1024-bit wide 1BPP display buffer is horizontally circular.

The bandwidth of the video data bus at 1BPP ordinarily would be four times less than the bandwidth at 4BPP for the same display resolution. However, because data are clocked out for interleaved lines, the video bus data rate remains constant between display modes, and shift clock timing is identical.

It is important to note that for both 4BPP and 1BPP display modes, horizontal buffer circularity is provided for display refresh purposes only. The display update software of processor 20 must recognize the physical extent of the display buffer memory when writing image data to the buffer. When either the left or right buffer extent is reached (e.g., during incremental update for panning) the software must clip the update at the extent and continue the update at the opposite extent. Only the reconstruction of the toroidal buffer to the display screen is performed as described above.

The address transformation needed to obtain vertical buffer circularity has thus far been ignored. Vertical circularity is provided by "address aliasing." "Aliasing" refers to duplicating the memory blocks in the processor address map by ignoring address bits in the address decoding process.

The addressing conventions of the Texas Instruments TMS34010 processor (which is used herein as microprocessor 20), uses bit address names, rather than byte address nomenclature that is common for microprocessors. Thus, A0 specifies a single bit in memory, A3 specifies a byte, A4 a word, etc.

In the 4BPP mode, the toroidal buffer is a single display buffer of 256K bytes. Under the addressing conventions described above, address bit A20 specifies which of the two 128K byte display buffer banks is active, and bit A21 specifies the upper bound of display memory. By ignoring bit A21 in VRAM select decoder 94 (FIG. 8), an alias or duplicate image of display memory is created above the second bank in the processor address space.

Because the bottom of the buffer (i.e., the alias) begins just after the top of the buffer (i.e., the base), the buffer is continuous around its upper vertical extent (bottom of screen wraps around to top). This provides the vertical component of the toroidal display surface. Display management software can position the display origin anywhere in the buffer base address space. The upper memory extent (bottom of screen) can overlap the buffer boundary and display the aliased data. When the display origin crosses the buffer extent, it must be jumped back to the bottom of the base address space by software. Writes to the display buffer need not be clipped at the upper vertical extent, but typically may be done for the sake of consistency.

Figure 14:
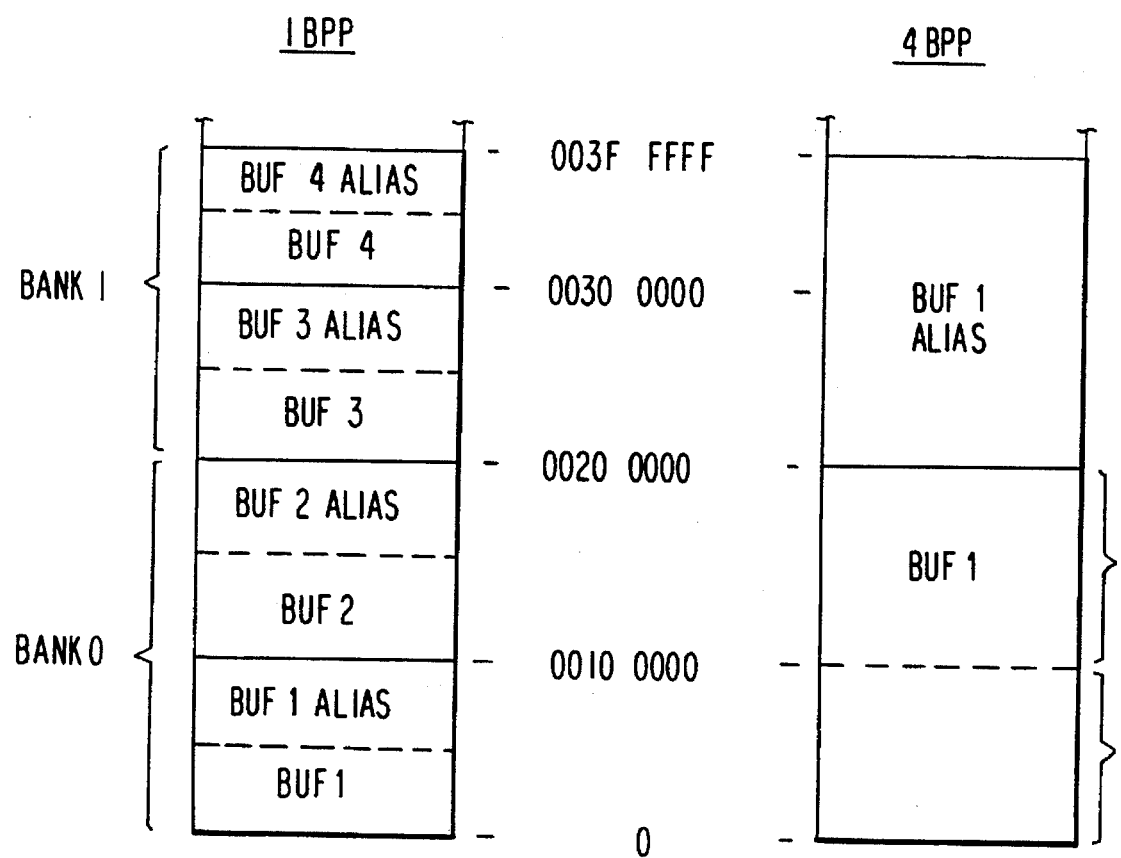
FIG. 14 is a memory map of the display memory showing address aliasing.
Figure 15:
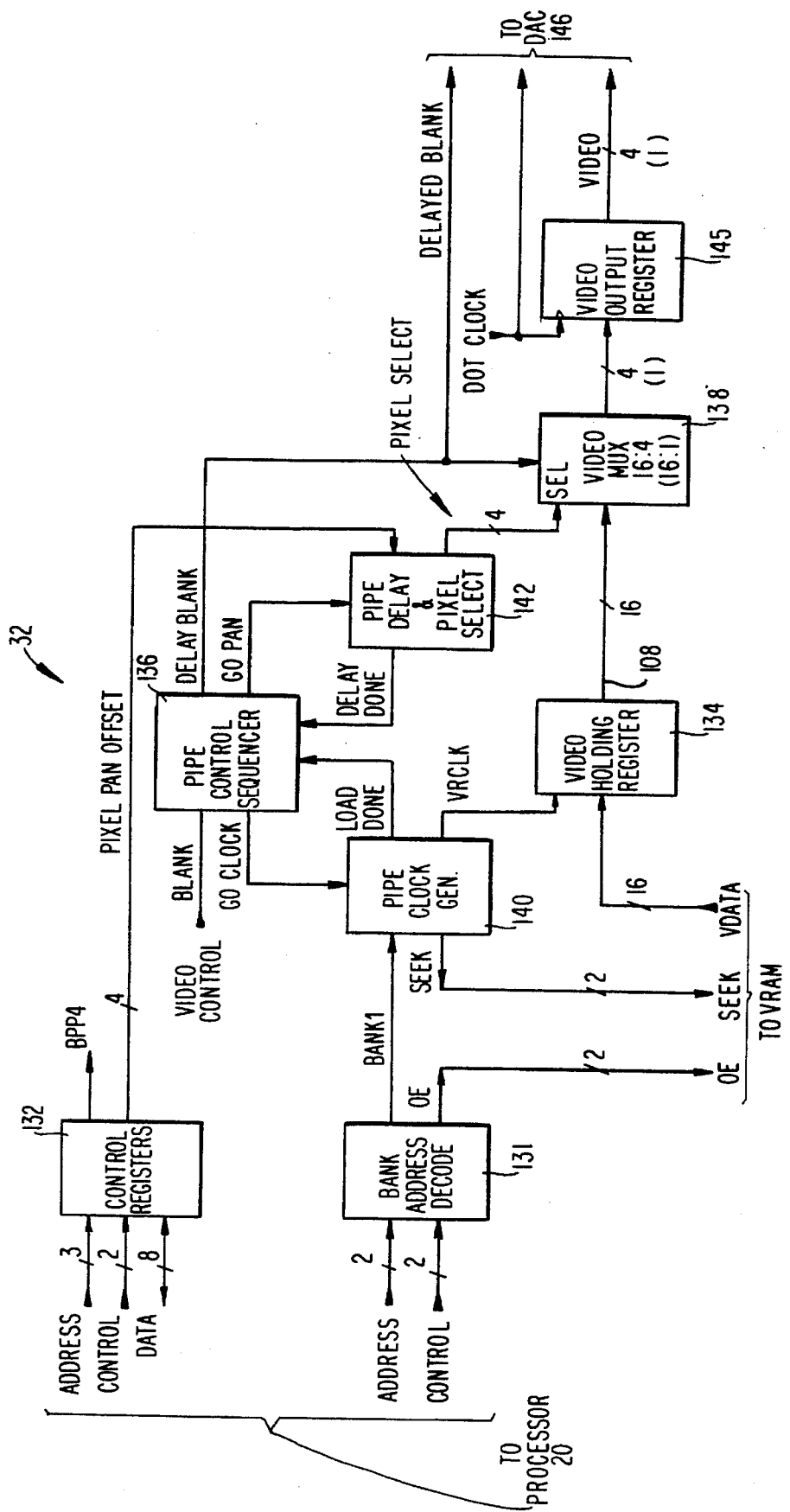
FIG. 15 is a schematic diagram of the video control logic of FIG. 3.

In the 1BPP mode, bit A19 is ignored to alias the 64 Kbyte buffers. Address bit A19 is not decoded by chip select, but rather is the most significant bit of the VRAM row address. Multiplexer 130 (FIG. 12) substitutes bit A20 for bit A19 during RAS time in 1BPP mode, to alias the memory at the correct boundaries. The aliased 1BPP buffers shown in the memory map of FIG. 14 are treated similarly to the single aliased BPP buffer to create the vertical component of the toroidal display surface, for two or four 1BPP toroidal buffers.

One skilled in the art will appreciate that the techniques used for torroidal buffer construction at 1BPP are not limited to the 64K×4 VRAM generation described. For example, 256K×4 VRAMs with the split-line-load feature could be used with the TMS34020 graphics microprocessor to provide eight toroidal 1BPP buffers at 1024×512 using four VRAMs.

Video Control Logic

Referring now to FIGS. 15–18, video control logic 32 is shown in greater detail. Video control logic 32 preferably is implemented by or as part of an application specific integrated circuit.

Video control logic 32 performs several functions. Bank Decode PAL 131 decodes the high VRAM area address bit to provide a "bank select" signal for the two VRAM banks. The control logic generates the required shift clocks for the VRAM shift registers. It provides video data pipeline control to permit image panning with single pixel resolution in both 4BPP and 1BPP modes. Video control logic 32 also provides video data pipeline control, to capture only one of four video data words for 1BPP mode (discussed above).

Figure 16:
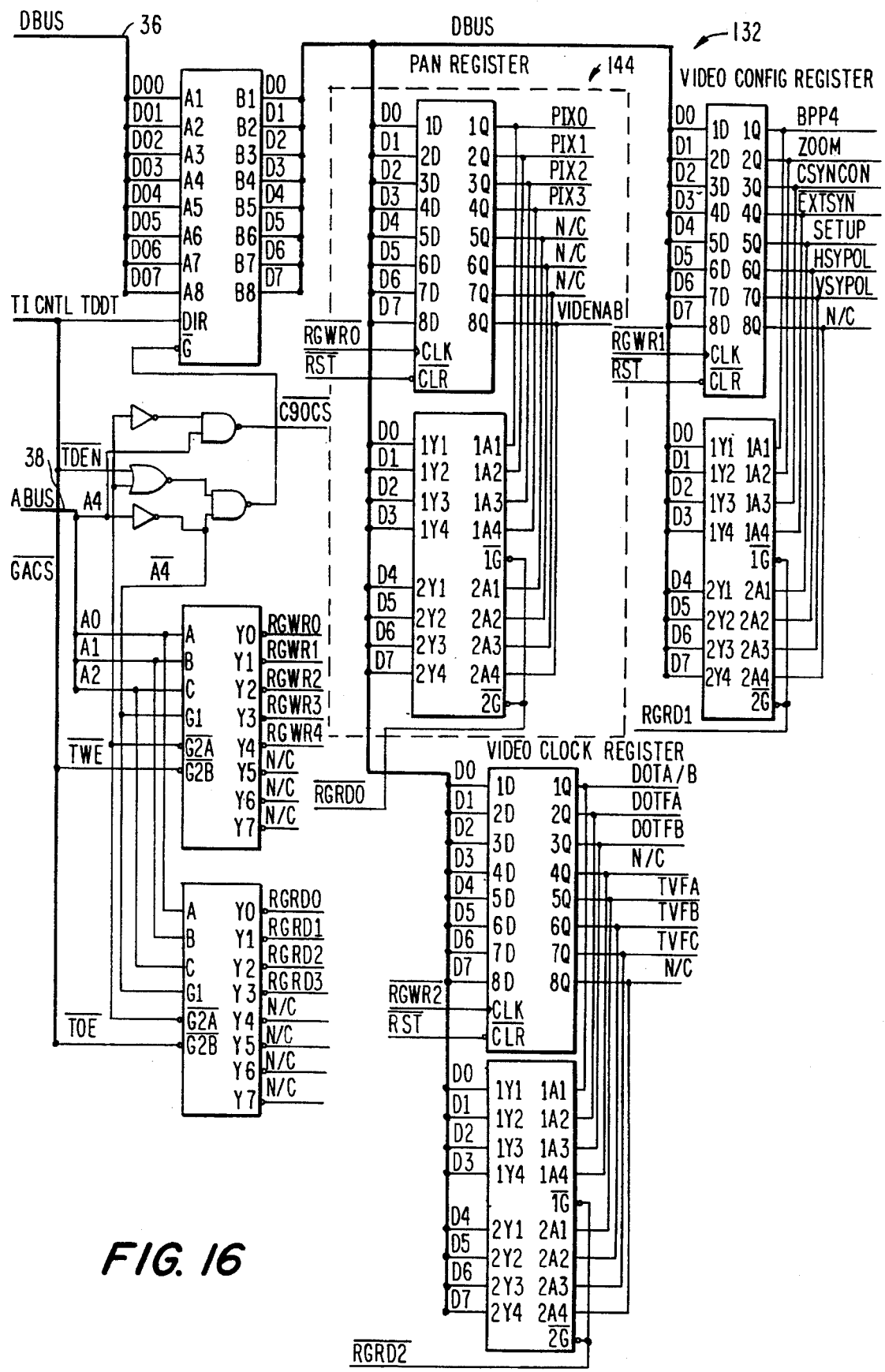
FIG. 16 is a detailed schematic diagram of the control registers of FIG. 15.
Figure 17:
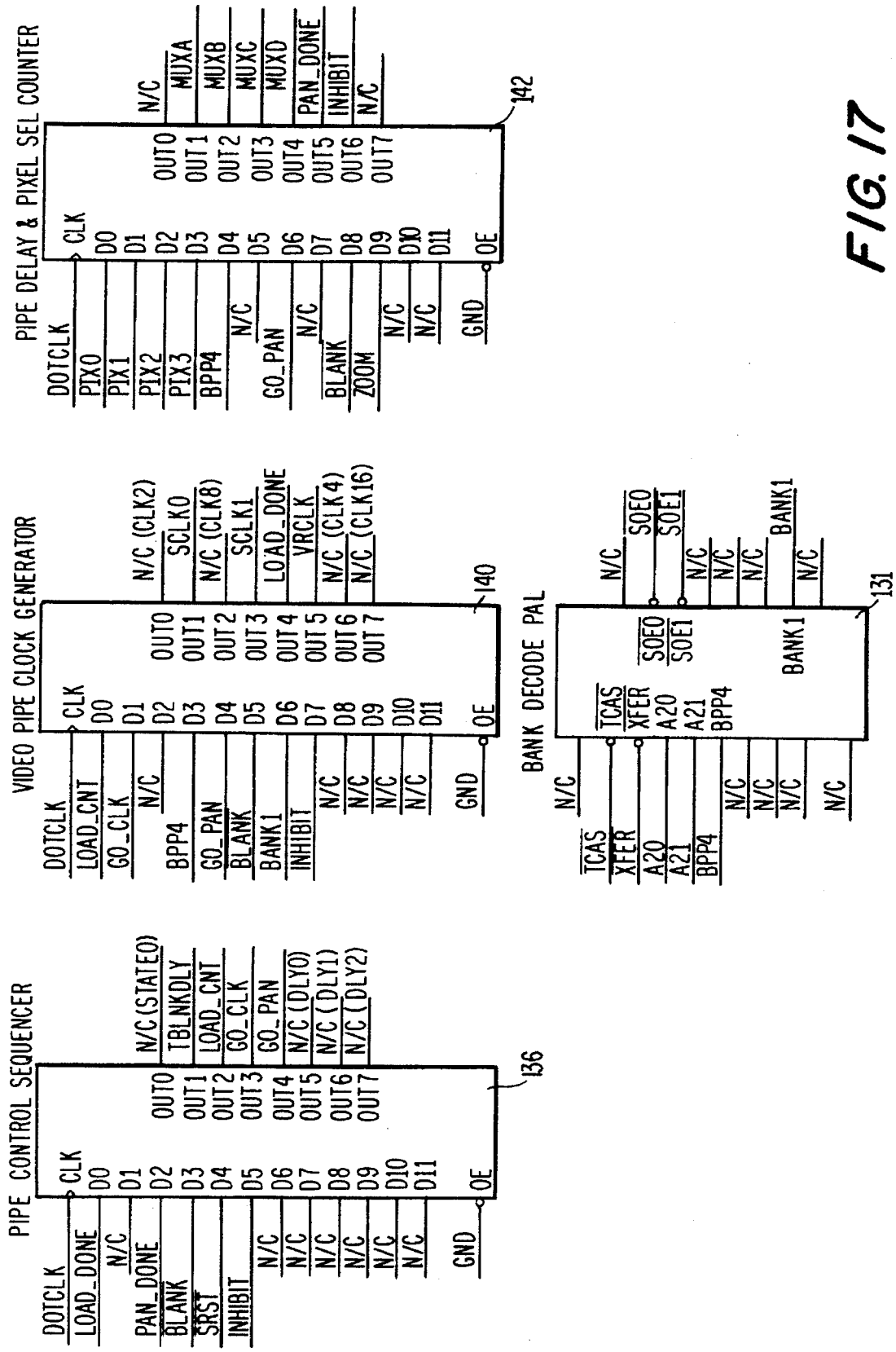
FIG. 17 is a detailed schematic diagram of portions of the circuitry of FIG. 15.
Figure 18:
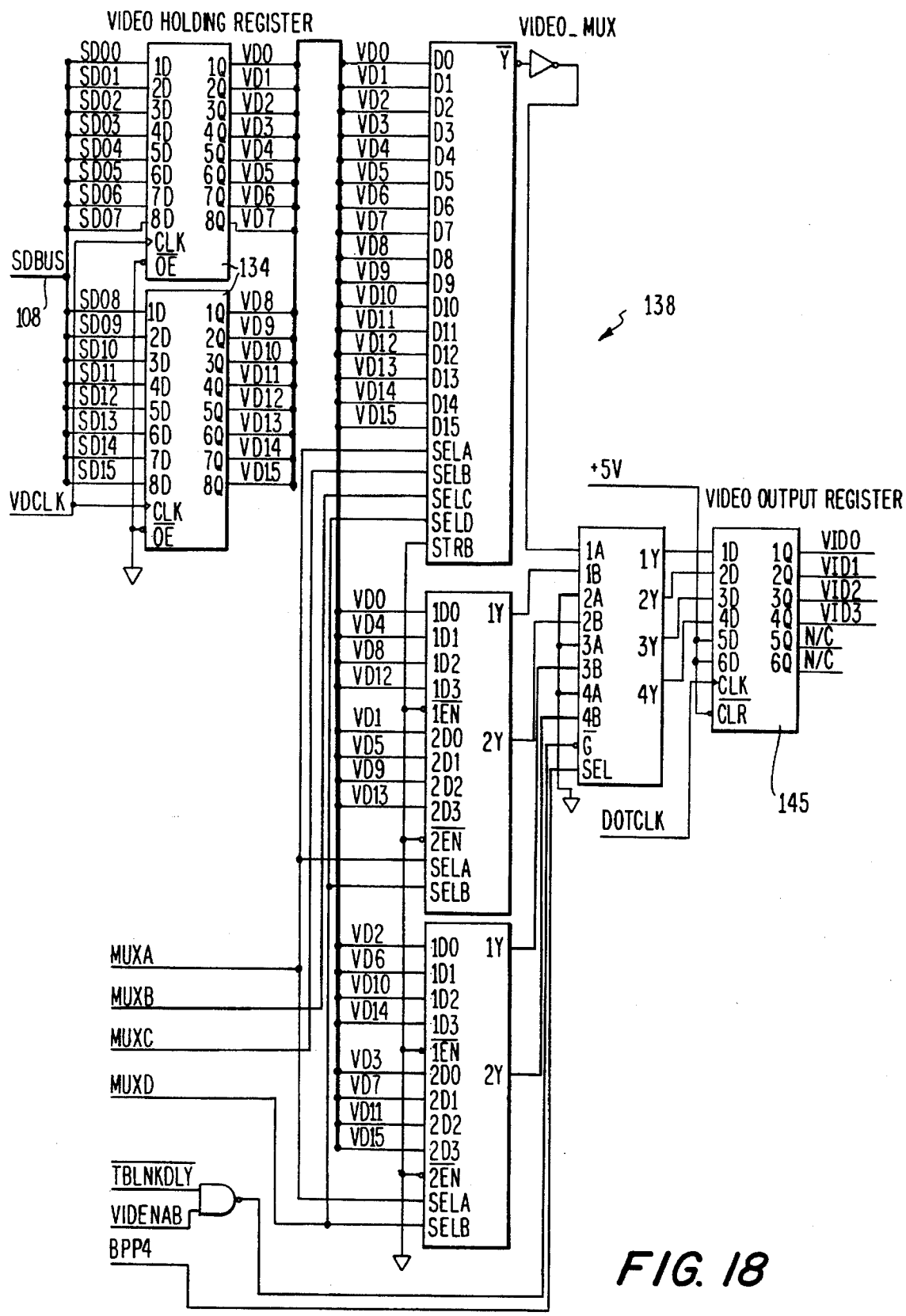
FIG. 18 is a detailed schematic diagram of portions of the circuitry of FIG. 15.

Video control logic 32 includes several control registers, designated generally by reference number 132, and shown in greater detail in FIG. 16. Video control logic 32 also includes a video data pipeline controller and video data pipeline (shown in greater detail in FIGS. 17 and 18, respectively) having a latch 134 for storing video data, a sequencer 136, and a multiplexer 138 for multiplexing the video data bus down to a 4BPP or 1BPP video stream. Bank address decoding and video bus multiplexing are performed in a conventional manner, as will be appreciated by those skilled in the art. The discussion below will focus on aspects of video pipeline control which are unique to this invention.

To achieve a smooth panning motion on display 16, the display origin must be positioned with a resolution of one pixel (in both display modes). Video pipeline control sequencer 136, clock generator 140, and pipe delay/pixel selector 142 position the display origin as required.

The BLANK signal of processor 20 goes false at the start of an active display scan-line, signaling that the cathode ray tube (CRT) beam is to be turned on for writing to the display screen. Most TMS34010-based hardware adds an external delay to the BLANK signal to compensate for pipeline delays in the video multiplexer path. Video control logic 32 delays the BLANK signal for an additional, fixed period of time. Control logic 32 also delays the clocking of video data in the pipeline by a variable period of time. Processor 20 can program the variable video delay ("PAN delay"), via "Pan" register 144 (FIG. 16), in four steps in 4BPP mode, and in sixteen steps in 1BPP mode. The largest video delay positions the first pixel to be clocked out of the video path just after the delayed BLANK signal goes false. Smaller delays cause one or more pixels to be clocked out with the BLANK signal being true, and thus hidden from display. The minimum delay hides three pixels (in 4BPP mode) or fifteen pixels (in 1BPP mode). Thus, the display starting point can be positioned on a single pixel boundary by using Pan register 144 in conjunction with the display start register of processor 20. Maximum delay provides the minimum horizontal display origin offset.

A video clock register provides for software selection of the dotclock source and rate, and for the rate of the clock supplied to the 34010 internal video timing generation logic. This permits the use of the different display monitor technologies previously mentioned, with selection under software control, and according to common practice.

A video configuration register provides software access to control bits to select various modes of operation of the video control logic and output stage (digital to analog converter). Controls include: selection of 1BPP or 4BPP organization of display memory; enable, polarity, and composite generation for monitor synchronizing pulses; DAC output level at blanking (SETUP); hardware two-power ZOOM. The function of the control bits has been previously explained, or will be apparent to one skilled in the art, with the exception of the ZOOM feature.

It is desirable to operate the document magnifier of this invention with conventional television receivers (via a modulator). Such receivers use an interlaced beam scanning technique in which 525 horizontal lines are obtained for each frame by raster scanning two interpenetrating fields of 262.5 lines each. The field rate is approximately 60 Hz, while the frame rate is 30 Hz. Although no appreciable flicker results on normal television images, it is widely recognized that a high level of display flicker results when depicting horizontal lines of one scan-line in width (refreshed during only one field at 30 Hz rate), or when displaying images of high contrast.

Because digitally scanned printed documents often contain lines a single pixel in width, and because it is advantageous that the DDM provide the highest possible contrast levels, the following hardware zoom strategy may be adopted for use with TV receivers.

First, the internal video setup registers of the TMS34010 graphics processor are set up to provide 262 line fields with 240 active display lines of identical data, at a 60 Hz rate. The interlace timing of the television receiver is thus defeated, and a highly stable image 262 lines high results. This has the effect of magnifying the screen image time by two in the vertical direction, over a properly interlaced display with 480 active lines per frame.

Second, the zoom logic controlled by the "ZOOM" bit in the configuration register creates a corresponding magnification in the horizontal direction to present images without aspect ratio distortion. The ZOOM bit enables the generation of a clock inhibit signal, which causes the video pipeline controller and data pipeline to run at half speed. Thus, a new pixel is output to the monitor for every two dotclocks. There are 320 horizontal pixels produced instead of 640, achieving the desired horizontal magnification.

It may thus be seen that the two-power hardware magnification is provided to eliminate flicker on a television receiver used for page display. Hardware magnification is not needed to augment the software zoom techniques described below.

Pipe control sequencer 136 (shown in greater detail in FIG. 17) has four operating states: "Idle," "Load," "Delay" and "Go." The sequencer is in the Idle state while the "BLANK" signal is true. When the BLANK signal is false, the Load state is entered. This causes the first video data word to be clocked out of VRAM 30 and to be captured in holding register 134 of the video pipe. After the first word is loaded (indicated by the "Load Done" signal), sequencer 136 enters the Delay state, stopping the clock generator, and causing pipe delay counter 142 to time-out the PAN delay. When the PAN delay is complete (indicated by the "Delay Done" signal), sequencer 136 enters the Go state, with both pipe clock generator 140 and pixel select counter 142 enabled. Pixel select counter 142 is also used to time the variable delay and provide pixel selects to video multiplexer 138.

In 1BPP mode, pipe clock generator 140 clocks a new video data word from VRAM 30 for every four pixel clocks (referred to in common practice as "DOT" clocks). However, the video holding register is clocked once for every sixteen pixel clocks. Thus, only one of four video data words is captured. Because it takes sixteen pixel clocks to multiplex the 16-bit video bus down to a single pixel, a continuous stream of data is produced. Video words for four lines are interleaved on a single VRAM row (and thus in the shift registers) in 1BPP mode, to create the 1024 pixel, 1BPP horizontally circular buffer.

In 4BPP mode, the pipe clock generator 140 clocks a new video data word from the VRAMs for every four pixel clocks. Video output register 145 is clocked every four pixel clocks as well. Thus, all video data words are captured by video output register 145.

Figure 19:
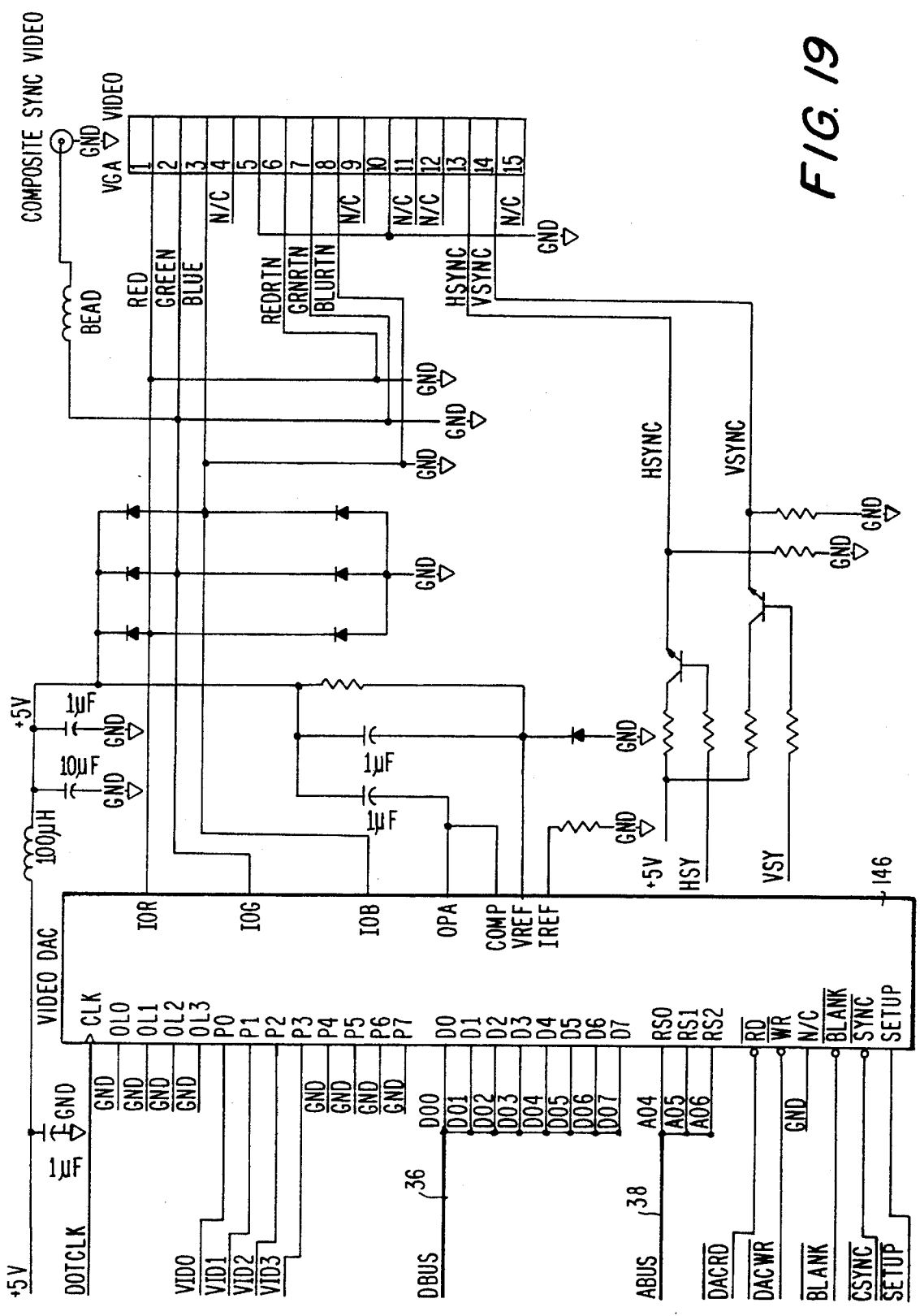
FIG. 19 is a schematic diagram of the digital to analog converter circuitry of FIG. 3.

Referring to FIG. 19, digital to analog converter (DAC) 146 integrates sync and blank insertion economically for monochrome applications, and provides color and greyscale display capability. DAC 146 resides on the processor data bus, so that the "color palette" RAM within the DAC may be initialized. DAC 146 may be implemented using model BT476 or BT471, which are commercially available from Brooktree.

Alternative Embodiment

In an alternative embodiment of this invention, DDM processor 14 is constructed using commercially available components to provide the required graphics processing capability (including construction of the toroidal display surface).

For example, in an alternative embodiment, DDM processor 14 could be constructed using a standard "PC-AT" type personal computer with an add-on graphics card, such as the Pepper SGT graphics card, which is commercially available from Number Nine Computer Corporation. The Pepper SGT card includes two graphics processors: a Texas Instruments TMS34010 processor and an Intel Corp. 82786 chip. The microprocessor of the personal computer (e.g., a model 80286 microprocessor manufactured by Intel) provides a third processor available for processing data. The processor of the personal computer performs I/O processing, including image scanner control and trackball interfacing. This processor also performs computational tasks, including the high level function of document format analysis.

The TMS34010 performs graphics-intensive tasks, such as image rotation for de-skewing of tilted pages, and the software reduction and magnification of page images.

The Intel 82786 processor constructs the toroidal display surface from the display memory available on the Pepper SGT card. Specifically, the Display Processor portion of the 82786 chip contains hardware to implement "display windows." The display windows permit flexible and simultaneous mapping of different regions of display memory to predetermined locations on the display screen. The display windows can be independently updated before mapping to the screen. The display memory must be shared by both the 34010 and 82786 microprocessors.

SOFTWARE IMPLEMENTATION

The following description of software augments reading of the "C" and assembly language code listings made a part of this application in the Appendix filed concurrently herewith.

The present invention can be implemented using software to create user controls and menus, and to perform document presentation. The digital document magnifier requires no manipulation by the user of the document to be viewed, beyond placing the document on the scanner platen during initial data acquisition.

The digital document magnifier preferably is controlled using three buttons, a trackball, and a trackwheel. In the preferred embodiment, all controls have a consistent function for all modes of operation, and only one control need be operated at a time. The resulting system can be operated by the physically handicapped, and is easily learned.

The digital document magnifier of the present invention may be used in several operational modes to accommodate a viewer's visual capacity, dexterity, and preference. The operational modes may be selected using a menu system which is part of the user controls. The menu system is distinct from the "pull down" menus commonly employed in computer systems, in that it can be operated with one control at a time and can be dynamically sized and positioned on the screen. The "look and feel" of the menus is designed specifically for use under high magnification.

Fast Incremental Template Zoom Software

The digital document magnifier of the present invention performs size conversion (zooming) of the page buffer to the display memory via a one-dimensional or two-dimensional smoothed zoom.

The two-dimensional smoothed zoom is integrated with the one-dimensional zoom so that a single calling convention applies. One-dimensional zoom is used below two-times magnification, because no improvement in image quality occurs below this level. Also, a better approximation to the power series is possible with the larger divisors possible for the zoom ratio using the one-dimensional zoom. The one- and two-dimensional zooms work well for scaling both text and graphics.

One-Dimensional Template Zoom

One-dimensional zooming is performed by a table-based, one-dimensional interpolation algorithm in accordance with the present invention. When the user selects a new zoom setting, a table of templates is built using a modified nearest-neighbor interpolation algorithm (as discussed in H. S. Hou, *Digital Document Processing*, New York: Wiley, 1983, pp. 61–66, which is hereby incorporated by reference herein in its entirety). Table building typically is completed in under 100 ms. The display buffer is then updated from the page buffer by: repetitively extracting a source image bit pattern, using this pattern to address a corresponding template, and then copying the corresponding template to the display buffer.

The level of magnification or reduction is specified by an integer ratio. This integer ratio can be selected from a wide range of values, preferably from $1/15$ (reduction) to $31/1$ (magnification). The divisor specifies the number of pixels to be extracted from a line of the source page image. The dividend specifies the number of pixels to be written to the toroidal display buffer.

The TMS34010 graphics microprocessor addresses image memory on the basis of a bit address. The processor can automatically extract a field of bits starting at a predetermined bit address, for field sizes of one to 32 bits. The bit address may be automatically incremented by the field size after a field is retrieved. These capabilities permit implementation of a very efficient zoom algorithm.

When a new zoom (magnification or reduction) ratio is specified, a new zoom table of templates is built as follows. For source values from 0 to 2 to the n power (where n is the source-field-size), a destination field "template" is computed using the nearest-neighbor algorithm. For reductions, the destination field template is built by deleting pixels, by combining pixels using a logical OR operation (for reductions up to $1/2$), or by averaging pixels (for reductions "smaller" than $1/2$) (modified nearest-neighbor). The destination fields are packed into the table according to the first binary power size which can contain the destination field (the "table entry size", which, for example, could be one, two, or four bits, etc.). For magnifications, the table entries are fixed at 32 bits size.

The actual zoom operation is specified by a rectangular region in the source page image buffer and a linear display address. The zoom then proceeds by extracting a source field, multiplying it by the table entry size using a shift operation to form an address, using that address to access the table of templates, and writing a template from the table to the display buffer.

Zoom ratios for magnification or reduction typically are selected for the maximum field sizes possible, consistent with a maximum table size of 16K bytes. This optimizes the speed of the zoom operation against the speed of table construction. For example, a two-times magnification is specified as $24/12$ rather than $2/1$. Although either ratio will work, selecting $24/12$ rather than $2/1$ causes the zoom to execute almost twelve times faster.

Two-dimensional Template Interpolated Zoom

Document images magnified two or more times the base scanned-image resolution (twelve times the optical power for a fourteen inch screen) are smoothed "on the fly" while updating the display buffer. Images are smoothed using a fast, non-linear "two-dimensional template" lookup, which magnifies and smoothes in a single operation. Smoothing eliminates the stair-step appearance of digitally magnified images of all types. Unlike the present invention, computer-based magnifiers must use special "smooth fonts", an approach limited to computer-resident text (not scanned images).

The smoothing interpolator of the present invention extracts a field of source pixels and constructs a "codeword" used to address a template to be written to the display buffer. The smoothing interpolator uses a two-dimensional field of source pixels (3 pixels square) to construct the codeword, in a manner similar to the one-dimensional interpolation algorithm described above.

The source image is sampled in square neighborhoods which overlap along two adjacent edges. Overlap is necessary to handle properly thin line cases. The overlap was chosen to occur at the "right" and "bottom" sampling edges (with top left as the image origin), to simplify the processing of incrementally updating source rectangles as required by the display architecture of the digital display magnifier. Thus, for each n by n bit area sampled, a $(z^* (n-1)) \times (z (n-1))$ area is written to the display buffer (where z is the zoom ratio). For example, with a 3×3 source neighborhood, zoom ratios of $4/2, 5/2, 6/2, \ldots 16/2$ may be obtained.

A 3×3 pixel source neighborhood is preferable to minimize memory requirements. The neighborhood yields a 9-bit codeword when fields from three adjacent lines are assembled. This results in a 512 entry table ($2^9$). To provide for magnification of up to eight times the scanned image resolution (approximately 50 times optical power), the templates in the table must be as large as 16 by 16 pixels ($16/2$ zoom ratio). The resulting table is 16K bytes in size. A larger source neighborhood could be selected (e.g., a 4×4 neighborhood), but would require a significantly larger memory.

The templates constructed by the smoothed interpolator are "pre-smoothed." The templates fit the image contours based on straight-line approximations of 0, 30, 45, 60, and 90 degrees of angle. This is all of the shape information which can be inferred based on a 3×3 pixel source neighborhood. For the amount of magnification required (two to eight times the base scanner resolution), this approximation creates the appearance of smooth contours in the magnified image.

The templates are generated in a two-step process. When the digital document magnifier software is initialized, a "find template" function is run which "discovers" the "rules" for drawing the templates based on geometric principles. Subsequently, a new set of 512 templates are "drawn" into the table, based on the rules previously generated, and sized according to the selected zoom ratio.

The process of "finding templates" may be described as the discovery of irreducible patterns or "fundamental classes" in the 512 possible patterns of 3×3 pixels. The first step in this process is termed "splitting", and attempts to identify two fundamental patterns which can be combined using a logical OR or a logical AND operation to form the pattern in question.

Splitting of "ones" is performed when adjacent zeros are found in the center of a pattern (horizontally, vertically, diagonally, and diagonally across a quadrant). The pattern so found is split by masking the pattern into two fundamental patterns which combine with a logical OR operation to form the pattern. The pattern is marked as an "OR-concatenation" type and linked to the codes of the two constituent fundamentals (using a list of data structures indexed by pattern code). An analogous splitting of "zeros" is performed to find patterns which combine with a logical AND operation, and are marked as "AND-concatenation" types.

The order of splitting is important, as some patterns may be split in more than one way. Specifically, a decision must be made whether to preserve thin (one pixel) diagonal spaces or diagonal lines. This decision is ambiguous (and mutually exclusive), but important. It may be more important to resolve thin segments of characters than to resolve thin regions separating characters on text material. Thus, it is preferable to split diagonal "zeros" prior to splitting diagonal "ones".

The split patterns form a tree structure, in that components of a split may themselves be further split. After all splitting is complete, concatenation types are ordered by tree depth.

For the remaining fundamental codes, rotation and mirroring are performed to further decompose patterns. For the remaining bit patterns, the first occurrence of a pattern is maintained as a "fundamental" class. Subsequent patterns found to match a fundamental type through rotation and/or mirroring are marked with "translate" class, the code of the matching fundamental pattern, and a rotation and mirroring code.

The resulting fourteen fundamental class patterns include: two solid patterns, two straight "edge" patterns, six 45-degree corner patterns, and four 30-degree corner patterns. All other patterns may be generated from these four fundamental types.

Although the paragraphs above use the descriptive term "pattern" liberally, the template-finding software actually processes 9-bit linear codewords exclusively, rather than the two-dimensional neighborhoods represented by the codewords. The decomposition steps are all single-pass in nature. Thus, the entire one-time template finding process runs in well under one second.

Template generation proceeds in the reverse order of template finding. The fourteen fundamental patterns are "drawn" into the template table at positions (table offset) corresponding to their codes. The fourteen fundamental patterns are assigned parameters for drawing based on fixed "drawing rules." Although these drawing rules could be "discovered" by an automated process, it is preferable to assign the rules by coding an appropriate "rules table". The drawing rules are chosen so that all combinations of the fourteen fundamental patterns join smoothly at their boundaries.

The corner-type fundamental class patterns are drawn based on the model of filling a square (the size of the template at the chosen zoom ratio) with "ones" starting at a selected corner and up to a clipping line specified by slope and y-intercept. For each zoom ratio chosen, the y-intercept is re-computed based on an "edge rule" from the rules table. Drawing of edge and solid types is known in the art.

The "translate" class patterns could be generated by rotation and mirroring of drawn fundamental class patterns based on the stored rotation and mirroring codes. However, it is preferable to translate the draw parameters and redraw the 52 "translate" class templates.

The "concatenation" class templates are formed by copying one of the component templates to the new template, and then copying the second component "over" it using a logical combine operation provided by the TMS34010 processor. The templates are combined in reverse order of tree depth (as found in the "template finding" sort described above), so that the two templates required for combination are guaranteed to exist when needed.

Zooming using the two-dimensional smoothed templates is similar in concept to that of one-dimensional templates, but implementation differs. Rather than extracting fields using the MOVE field instruction, overlap of source neighborhoods makes field extraction by shifts more efficient. Image data for an area three lines high and 32 bits wide are retrieved from the page buffer in DRAM and loaded into three of the processor's 32-bit registers, and then shifted and combined to form up to fifteen successive codewords for addressing templates to be copied into the display buffer. To further improve performance, the contents of the three 32-bit registers are tested each time they are loaded. If the test indicates all "ones" or all "zeros", table lookup is bypassed and a single TMS34010 "FILL" instruction is executed to fill the corresponding display buffer area.

Power-Series Zoom Control

The digital document magnifier of the present invention permits the size of the displayed image to be changed in power-series increments (in both one- and two-dimensional zooming). Computer-based magnifiers limit size change (zoom) to integral values which do not appear larger or smaller by equal amounts. Thus, the digital document magnifier of the present invention permits the optimum zoom level to be found with greater ease and precision.

Size (zoom) increments provided closely approximate a power series. A power series has the property that the series of ratios so derived increases or decreases in equal steps. This simulates the operation of an optical zoom. A power series is desirable because the number of steps needed to adjust the image to optimum size is minimized. This is important because each size step requires up to one second to fully overwrite the display buffer. The power series can be expressed as 1.125 to the x power, where x ranges from −12 to +20. Each approximation to this power series is specified as the integer (reduction or magnification) ratio, which can range from $\frac{1}{12}$ to $3\frac{1}{1}$.

Automatic Format Analysis

The automatic page manipulation features of the digital document magnifier are made possible by software analysis of scanned document format. These manipulation features include: virtual single line display mode; column following; automatic visors; automatic margin-stop; automatic overview sizing; automatic de-skewing of tilted pages; automatic segmentation of graphic images. The format analyzer software builds up a description of the page in the form of a hierarchy of data structure in order to subsequently recompose the page image. The data structures define rectangular areas which enclose page features, such as words, text-lines, columns, graphic images, and margins. The resulting page description is then transferred to a more compact array of "page descriptors" in reading order.

Overall Operation

The format analyzer builds up the page description in a multi-step process, whereby certain previous steps are reversed and re-executed based on the accumulation of statistical information about key page features, which include: page skew (tilt); baseline locations of text words and lines; inter-word spacing; height of text lines (to infer text font sizes); spacing of text lines (to recover close-set and touching text lines). Non-statistical information is also acquired as the page analysis progresses, including: location of graphic rulings; location of graphic art; and location of large-font headings.

The flow of control of the format analyzer is first described below generally, followed by more detailed descriptions of the software components of the analyzer. The following convention of nomenclature will be used in the descriptions below. Items in capital letters are references to data objects (i.e., structures). Items in small letters, followed by empty parenthesis "()" are references to subroutine calls (i.e., "C" language functions).

The lowest level, most time-intensive, processing functions of the format analyzer are designed to run in parallel with the scanning process. Performing format analysis on the incoming image data reduces the total time required before a user can begin to view automatically the page image. This improves response time as compared to a system which waits for scanning to complete before beginning the format analysis process.

The first step in the format analysis process, a call to liner(), builds initial TEXT_LINE structures onto the passed line header. To do so, the liner() calls the worder() to build TEXT_WORD structures onto the constituent TEXT_LINE. In analogous fashion, the thread of control descends through worder(), filter(), box(), and runenc() functions down to the level of the buffered bitmap page image (page buffer was described previously). The path of function call descent in this process parallels the hierarchically-linked (tree) data structures so created: TEXT_LINEs, TEXT_WORDs, BOXes, and RUNs. These structures are built incrementally (in batches), so that this phase of processing may be performed concurrently with the acquisition of image data in the page buffer.

Each of the above-mentioned data structures contains the coordinates of a RECTANGLE enclosing the corresponding page feature (the "defining rectangle"), and contains NEXT and PREVIOUS link fields (pointers) for use in constructing linked lists of structures of the same type. Each data structure also contains HEAD and TAIL link fields for use in constructing linked lists of structures at the next lower level, and may include fields for storing statistical information pertinent at the level of the structure in particular.

To reduce the amount of memory required to contain the tree of data structures, certain of the lower level structures are deallocated (discarded) after they are used to build the next higher level constituent structure. This occurs when the y coordinate of image data acquisition has progressed appreciably beyond the bottom coordinate of the defining rectangle for the higher level constituent structure. At this time, the higher level structure is released for use by the next higher level function. Specifically, the RUNs are discarded after release of BOXes to the worder(), and BOXes discarded upon the release of TEXT_WORDS to the liner().

The above-mentioned filter() function discards BOXes qualifying as page "noise" prior to wording. The filter() also links BOXes identified as "graphics" onto a separate GRAPHIC_BOX_HEADER for subsequent processing. Such BOXes are not passed to the worder(), and are therefore not discarded by it.

Before TEXT_WORDS are released to the liner() and BOXes discarded, the worder() uses BOXes to find baselines for TEXT_WORDS. The TEXT_WORD baselines are used to estimate page tilt, and are also essential to the subsequent statistical filtering of the page description. Two baselines, upper and lower, are found for each TEXT_WORD.

At the conclusion of page scanning, all parts of the page buffer have been processed to produce a list of TEXT_LINEs with attached TEXT_WORDs, and a separate list of graphic BOXes. The baselines of the first and last TEXT_WORDs of TEXT_LINES are used to find an average tilt value for the page image. When appreciable tilt is found, the page description is de-skewed by rotating the coordinates of the defining rectangles of the structures built thus far. The BOXes which have been tagged as graphic elements are processed next. Such graphics BOXes are used to filter out extraneous TEXT_LINEs. Certain graphic elements (e.g., rulings) are also tagged at this time since these are useful in the later sorting of page columns.

Statistical filtering of TEXT_LINEs is performed next. This operation uses correlation of baselines to correct for the merging of multiple lines of text into a single TEXT_LINE, due to the presence of vertically touching characters on the original printed page.

The TEXT_LINEs constructed thus far are susceptible to fragmentation on proportionally typeset documents. The next processing step overcomes this problem while locating text columns on the page. The TEXT_LINEs are stripped of TEXT_WORDs and discarded. The TEXT_LINEs are then reconstructed and COLUMNs found using a word-overlap algorithm. The sorted list of COLUMNs is then subjected to a final set of statistical and heuristic filters.

The resulting list of COLUMN structures is then sorted into reading order by the zoner(), which finds headlines by font size and overlap, and then stacks COLUMNs in y and then x order under the headlines. The sorted COLUMNs are attached to a MARGIN structure with a defining rectangle enclosing the outermost COLUMN rectangles.

When format analysis has been completed, the hierarchy of data structures are used to create a final page description, in the form of a compact array of "page descriptors" consisting of the defining rectangles for the above-mentioned page features sorted into correct reading order for the page. The tree of linked data structures is then de-allocated.

Run Encoder, Boxer, Filter

The lowest levels of the format analyzer consist of the boxer() and run_encoder(). The boxer() finds the page coordinates of rectangles which enclose each and every contiguous black "blob" (usually characters) on the scanned page image. The boxer() does so using a modified run-length encoded form of the page image and chains of two types of data structure, the RUN and the BOX.

For each scan line in the page image, the boxer() passes an array of RUN structures to the run_encoder(). The run_encoder() finds the first black pixel and last black pixel of successive "runs" of black in the scan line, packing the pixel number of the first black pixel into the RUN START field and the pixel number of the last black pixel into the RUN END field of successive RUN structures on the array. The run_encoder() returns the address of the last RUN so packed for the scan line.

The boxer() then compares the RUNs so found (the "incoming RUN list") to the RUNs found on the previous scan line (the "active RUN list"). The boxer() considers one incoming RUN or one active RUN per loop. The boxer() consumes incoming RUNs by allocating BOX structures and linking the RUN to the BOX and the BOX to the RUN until it finds overlap between an incoming RUN and an active RUN (already attached to a BOX). When this occurs, the boxer() finds the BOX using the link in RUN, enlarges the BOX's rectangle coordinates to include the START and END of the new RUN, discards the active RUN, and cross-links to the incoming RUN.

Having found the first overlapping RUNs, the boxer() has achieved synchronization between the active and incoming RUN lists. The boxer() maintains this synchronization throughout the scan line by alternately considering active and incoming RUNs. By this method, no RUNs need be considered twice for inclusion into BOXes. When an active RUN is considered which does not overlap an incoming RUN, a BOX is finished. The finished BOX is linked to a "complete list".

When overlapping RUNs are found with the incoming RUN already linked to a BOX, convergent BOXes have been found. The BOXes are merged by merging the RUN lists and coordinates of the BOX.

The resulting "complete" BOX chain contains the x and y coordinates for the top left and bottom right corners of a rectangle which fully encloses a contiguous "blob" of black on the white page background. Blobs nested within blobs and not touching (such as text characters enclosed by a graphic box) are separately and correctly described by BOXes. The BOX also includes a DENSITY field containing the number of black pixels included in the BOX (but not other BOXes, regardless of overlap or enclosure of defining rectangles).

The boxer() does not return until 100 BOXes have accumulated, or the bottom of the document is reached (end of scan).

The chain of resulting BOX structures are then passed to the filter() to eliminate page "noise" by discarding very small BOXes which enclose very few pixels. This eliminates "speckle noise" created in the scanning process on dirty or poorly printed documents. Also, the BOX DENSITY field is compared to the BOX area (computed from the rectangle coordinates). Boxes with very high DENSITY to area ratios and high x to y aspect ratios can be rejected as rulings, while large BOXes with very low DENSITY are rejected as graphic features (such as enclosing graphic boxes).

Worder

The next level of the format analyzer, the worder(), groups batches of incoming BOXes into TEXT_WORDs by searching for groups of BOXes meeting certain criteria of horizontal and vertical adjacency. Because the incoming BOXes may arrive in any order, and the adjacency searches need to be constrained to a small area for efficiency, two MESH arrays are employed for sorting.

Each MESH is a two-dimensional array of pointers to TEXT_WORDs. The x and y index on a MESH array corresponds to the page buffer coordinate divided by 64. Thus, a MESH has a cell (pointer) for every 64 pixels in both the x and y directions on the page image. Each cell (pointer) on a MESH is the head of a singly-linked list of those TEXT_WORDs with a coordinate falling within the cell. The TEXT_WORD coordinate used is the top left coordinate of the outermost BOX attached to the left end or bottom right coordinate of the outermost BOX attached to the right end of a TEXT_WORD. Thus, two MESHes, left and right, are maintained to search separately for adjacent BOXes at each end of TEXT_WORDS. Thus, each TEXT_WORD contains two link fields, one for each MESH list.

As TEXT_WORDs are built, they are attached to the MESH arrays to permit fast searches of local regions to test for the adjacency of BOXes at each end of the TEXT_WORDs. The adjacency tests are local in nature and test for the effects on format analysis of tilt (which may result, for example, from improperly aligning a document during scanning). The process is incremental to allow as much processing to be performed as possible during scanning, to reduce post-scanning delay, and permit de-allocation of BOXes as they are worded. This also reduces calling overhead, and improves 34010 instruction cacheing.

To process an incoming batch of BOXes, each BOX is compared to the BOXes at the ends of TEXT_WORDs on the MESH cells corresponding to the left and right coordinates of the BOX. If no TEXT_WORD is found with an attached BOX within the threshold inter-character (x) distance and (y) overlapping, the incoming BOX is used to create a new TEXT_WORD. If one TEXT_WORD is found with an attached BOX adjacent, the incoming BOX is linked to the TEXT_WORD's list of BOXes, and the TEXT_WORD's defining rectangle is enlarged. If TEXT_WORDs are found with attached BOXes adjacent to the incoming BOX on both left and right MESHES, the TEXT_WORDS are merged by combining rectangles and BOX lists, and discarding one TEXT_WORD. For all of the above operations of new word creation, word growth, and word merge, the MESH arrays must be properly maintained.

All of the TEXT_WORDs on the proper cell of both MESHes must be searched for each BOX, even when adjacency to a TEXT_WORD has been found on that cell. This is because punctuation marks (and the dot over the small "i" character) can cause the local adjacency tests to fail. Although a "global" adjacency test of incoming BOX to TEXT_WORD rectangle (in contrast to BOX to BOX as described above) does not require extensive searches, such a procedure is very sensitive to page tilt.

When incoming BOXes are encountered which correspond to MESH y coordinates eight cells below those filled when worder() was first called, TEXT_WORDs are removed from the first two rows of MESH cells so filled. Before returning these "released" TEXT_WORDs to the caller, baselines are calculated for the TEXT_WORDs and constituent BOXes are deallocated.

The top and bottom TEXT_WORD baselines are intended to "cut through" ascenders/descenders. The algorithm for finding such baselines finds an average centerline for the BOXes in the TEXT_WORD, based on BOX top and bottom x coordinates. BOX bottoms and tops are then compared to each other to find the x coordinates closest to, and above and below the centerline. The minimum BOX bottom below center is the BOTTOM baseline, and the minimum BOX top above center is the TOP baseline.

The procedure above works well on most TEXT_WORDs, but fails to find accurate baselines for TEXT_WORDs of all capital letters, of small letters all having ascenders or descenders, or with hyphens. Later statistical processing of TEXT_LINEs overcomes these problems.

Liner

The liner() combines batches of TEXT_WORDs into TEXT_LINEs using local adjacency criteria in a process directly analogous to that described above for the worder(). The principle differences between the liner() and worder() are described below.

The liner uses two one-dimensional arrays of pointers to TEXT_LINEs, called GRIDs. Each "slot" on a GRID contains a pointer to a list of TEXT_LINEs, with the end-most TEXT_WORD falling on the GRID's index, corresponding to page buffer y coordinate divided by 64. One GRID is maintained corresponding to the left end of TEXT_LINEs, and another for the right end.

The liner() grids are directly analogous to the worder() meshes, except that no sorting by the x coordinate is needed. This is because TEXT_LINEs have long and narrow defining rectangles, and no speed improvement would result from x-sorting these structures.

The liner() y-adjacency criteria utilize TEXT_WORD baselines instead of defining rectangles, as in the worder().

The liner() is passed a pointer to a TEXT_WORD header containing a linked-list of TEXT_WORDS to be "lined". When the header pointer is zero, the liner() gets TEXT_WORDs by calling the worder(). Thus, the liner() can be used to re-process TEXT_WORDs which were previously "lined." The liner() does not incrementally release TEXT_LINEs, but instead runs until all available TEXT_WORDs are processed.

Untilt

The TEXT_LINEs produced by the liner() are used to estimate the page tilt which results from skew in the placement of the original document on the scanner platen.

The tilt value equals the ratio of the sum of the x displacement of the first and last TEXT_WORD rectangle of all TEXT_LINEs over the sum of the y displacements of the first and last TEXT_WORD rectangles of all TEXT_LINEs.

Tilt is specified as x displacement per number y pixels (rise over run). Thus, small tilt values indicate a large amount of page skew. If very large tilt value (little tilt) is found, tilt is set to zero (undefined rise over run) to flag that no subsequent de-skewing operation is required.

At this time, the page description consists of TEXT_LINEs and a separate list of BOXes tagged as graphics by the filter() function. The BOXes are simply rotated, whereas TEXT_LINEs are stripped of TEXT_WORDs to build a list. The TEXT_WORDs then are rotated, and TEXT_LINEs are rebuilt by passing the TEXT_WORD list to the liner(). Because the liner() is susceptible to errors when processing images with a high degree of skew, this step ensures that accurate TEXT_LINEs are obtained.

Line Statistics

Baselines are constructed for TEXT_LINEs by correlating TEXT_WORD baselines using the following procedure. First, a weighted sum is computed for both baselines of all TEXT_WORDs in the TEXT_LINE. Each TEXT_WORD baseline is weighted by the number of BOXes used to construct that baseline (this number is retained during BOX releasing). The sums are divided by the total weight of each baseline, giving the mean of weighted TEXT_WORD baselines. Next, the square of the standard deviation (variance) of word baselines from the two means is found. Next, new mean baselines are computed using only word baselines within one standard deviation of the old mean baselines. Next new squares of standard deviation of word baselines from the new means are found. The sum of the new standard deviation is taken as a variance. The new mean baselines are used as the TEXT_LINE baselines with variance as a correlation measure.

Resulting TEXT_LINE baselines showing poor TEXT_WORD baseline correlation, or poor correlation with the TEXT_LINE defining rectangle, are flagged. TEXT_LINEs with more than one constituent TEXT_WORD and showing the above problems usually result from vertically touching characters on the original printed page.

The smoothed derivative of a histogram of TEXT_WORD heights is used to recover splitting points (y coordinates) for such suspect TEXT_LINEs. Because the local worder() and liner() keep vertically touching characters from spreading too far by fragmenting TEXT_WORDs and TEXT_LINEs, all neighbors of the bad TEXT_LINE are analyzed with full y enclosure and some x overlap to get a good sample. The histogram collects top and bottom TEXT_WORD rectangle coordinates, starting at the top of the bad TEXT_LINE, and with a resolution of INTERVAL pixels for filtering purposes. Line boundaries are detected as local maxima of the histogram, using a smoothed first derivative found by convolution. The maxima show up as positive to negative zero crossings of the derivative, which are compared to a threshold value to determine splitting points.

Constituent TEXT_WORDs with poor correlation to the TEXT_LINE baselines are divided into multiple new TEXT_WORDs using the splitting points so found. The TEXT_WORDs are passed back to the liner() to reconstruct correct TEXT_LINEs.

Graphics Filtering

Most line art and halftone images contain mostly-connected lines which generate large BOXes in the initial boxing. These are filtered based on size alone in the initial filter() function (described above). Graphical BOXes (four rulings) are distinguished from other graphics at this stage by a high area/density ratio and labeled as a ruling. Detection of single rulings is held for after de-tilt.

After detilting of the graphics and ruling boxes, overlapping or nested graphic BOXes are combined. This eliminates unconnected line segments in line art images (which would otherwise be labeled rulings) and joins large disconnected graphic areas. TEXT_LINEs enclosed by graphic BOXes (which are usually more unconnected bits of graphic images) are then absorbed. Rulings are then segregated into a separate list of BOXes by testing the BOXes for extremes of aspect ratio. BOXes with large defining rectangles and low density are segregated as possible joined rulings. Such BOXes are decomposed into constituent rulings or discarded based on histogram processing of the original bitmap along the four boundaries of the defining rectangle of the BOX.

Columns

The now well-correlated TEXT_LINE baselines are applied to the constituent TEXT_WORDs. TEXT_WORDs are then stripped from TEXT_LINEs and the TEXT_LINEs are discarded. TEXT_LINEs are then rebuilt and COLUMNs found by using TEXT_WORD overlap of adjacent lines, rather than a set TEXT_WORD spacing, as the signal for inclusion of words into TEXT_LINEs. This "word-overlap algorithm" is insensitive to proportional spacing of text.

The methods by which the COLUMN structures are started, enlarged, and merged resemble those already described for the building of TEXT_WORDs and TEXT_LINEs, with the following exceptions. No MESH or GRID structures are needed to speed operation, because there are relatively few COLUMNs on a page, and because the incoming TEXT_WORDs are now ordered by the top y coordinate of the defining rectangles (the COLUMNs enlarge top-down in an orderly fashion). For each incoming TEXT_WORD, a search is performed to determine whether there is a COLUMN which overlaps the TEXT_WORD. If no such COLUMN is found, a new one is started. If two COLUMNs are found, they are merged.

TEXT_LINEs are built "in-column", in that a TEXT_WORD is first included in a COLUMN, and then the TEXT_LINE search operation is performed using the y-sorted list of TEXT_LINEs in that COLUMN only. The "new", "add", and "merge" operations are performed to process the TEXT_WORD into a TEXT_LINE as previously described.

As they are built from the top of the page downward, the COLUMNs are completed, and new COLUMNs started, when large changes in font (TEXT_LINE baseline height) or inter-TEXT_LINE spacing are encountered. This isolates the headlines and column breaks encountered in complex page layouts of periodicals and newspapers.

Because headlines and captions have few lines, the "breaking" of COLUMNs on format changes (font, spacing) creates fragmented COLUMNs and TEXT_LINEs due to insufficient x-overlap of y-successive TEXT_WORDs in the COLUMN. The COLUMN fragments created by insufficient overlap are collected, and COLUMNs with poor correlation of constituent TEXT_LINE baselines are filtered out.

First nested columns are merged. Nested columns occur on short paragraphs due to aggressive breaking of COLUMNs based on spacing. The algorithm typically involves merging the large COLUMN into the nested COLUMN, as merging toward the back of the list results in a one-pass procedure. Y-sort order is assumed.

Next, COLUMNs with few lines (usually a header) are flagged. Such COLUMNs are subject to fragmentation by the overlap liner, so if a neighboring close COLUMN with few lines and good baseline correlation is found, the COLUMNs are merged.

Finally the COLUMN list is filtered. COLUMNs discarded include: tiny COLUMNs; multi-line COLUMNs with large variance in baseline height, or with a tiny average baseline height; and single line COLUMNs in which the baselines are off-center or too close.

Column Sorting

The zoner() sequences COLUMNs in reading order for complex document formats. The preferred embodiment of the zoner() uses only headings to sequence COLUMNs. Alternatively, the use of rulings, and rules for table discrimination, may be implemented.

The basic COLUMN sequencing process performed by the zoner() is performed in a multi-pass process as follows.

COLUMNs which are text headings are tagged. Such text headings have been broken out into separate COLUMNs by the column() function's font break mechanism. The tagging process constructs a histogram of TEXT_LINE font (baseline height) vs. number of TEXT_LINEs over all COLUMNs. The global maximum (most common font) for the page is found and used to determine a font threshold for heading discrimination. Heading COLUMNs are tagged when the COLUMN font exceeds the threshold.

"Running" headings are tagged next. Such COLUMNs are previously tagged heading COLUMNs which overlap at least two text COLUMNs which themselves do not overlap (i.e., any heading which straddles COLUMNs immediately above or below it).

A new COLUMN list is constructed containing only running heading COLUMNs, if any such COLUMNs were tagged.

Text COLUMNs then are "stack-sorted" between the running header COLUMNs (if any) on the new COLUMN list. The "stack-sort" searches for the first x-overlapping COLUMN above the COLUMN being sorted onto the new list, and inserts the COLUMN afterwards (y-order), searching up to the next running heading COLUMN found. If no overlapping COLUMN is found, the COLUMN being sorted is inserted in x-order and before the next running header COLUMN. This forms x-ordered vertical (y-ordered) stacks of COLUMNs (including single-column headings) between any running headings.

Document Presentation Modes, Overview

An innovation central to the operation of the DDM is the use of the page description obtained through document image format analysis for the automatic presentation of documents to the visually impaired user. The key document presentation features are described, followed by a description of the novel aspects of the display management software sub-system which implements them.

Page Overview Mode

A visually-impaired user operating the DDM at a magnification suitable for reading will be able to see only a very small portion of the scanned document at any one time. Thus, the reading context is limited, and confusion may occur regarding the user's position in the document at any given time. This is generally referred to as the "page navigation problem" in low-vision aids. Thus, it is desirable to present the visually-impaired user with a page navigation aid. The user control device, such as a trackball or joystick, typically may include a button reserved for such a navigation aid, referred to as the Overview presentation mode.

In Overview mode, the page image magnification is adjusted so that the shorter page image axis just fills the screen. This is referred to as Automatic Page Sizing. The page image is thus reduced in magnification, such that individual words will not be readable by the visually-impaired user, but larger page features, such as columns or figures may be discerned. Additionally, a large block cursor appears on the screen. The user may move this cursor over the page image using the control device.

Two cursor modes may be implemented. First, a reverse-video (see-through) cursor may be provided which changes in size with the magnification control. In reverse-video mode, the contents of the cursor fill the screen when the user presses the dedicated View presentation mode (reading mode) button on the control device (and the cursor disappears).

Alternatively, a large "magnifying-glass" effect cursor shows an enlarged image for the page area covered by the cursor, with image enlargement in the cursor controlled by the magnification control.

The image at the center of the magnifying glass cursor is centered on the screen on the transition to View presentation mode, with magnification of the View mode screen set to the magnification seen inside the cursor prior to the switch.

In all cases, moving the Overview cursor to the edge of the screen smoothly reveals portions of the document which may be off-screen at that time. Also, when making the transition from View to Overview mode, the cursor is automatically positioned on the overview screen to cover exactly the page area previously presented on the magnified View display. For users with severe visual loss, the relative position of the large cursor at this time provides important page navigation cues, even if individual page features may not clearly be discerned.

The Overview mode thus requires the implementation of certain software functions detailed below: A "CURSOR PAIR" which represents the user's position on both screen ("DISPLAY CURSOR") and page ("PAGE CURSOR"); "EXPLICIT" (visible) and "IMPLICIT" (invisible, position maintained by system) DISPLAY CURSORS; various cursor display effects for EXPLICIT CURSORS; automatic page image sizing; and smooth pan and scroll of page image with hidden dynamic update of display buffer.

The implementation of these software functions is unique and difficult due to the DDM's display environment: a toroidal display buffer with dynamic page scaling from page buffer to display buffer using scaling ratios which may not be integers. Thus, implementation is described in detail in the sections below.

Manual View Presentation Mode

In the Manual View Presentation mode, the user manipulates the user control device to move through the enlarged page image smoothly, at the desired magnification level. The magnification level may be changed at any time using the magnification control. The Manual mode is most helpful for "skimming" or "browsing" document content, or for viewing page areas for which the automatic reading features do not pertain (i.e., graphic areas, tables, maps, etc.). The Manual mode may also be used as an additional page navigation aid.

The user may select and save as default values his preferred automatic viewing modes using the menu. The user may then push the View button on the user control multiple times to move from Manual mode through the selected automatic modes. Thus, the user can find a desired reading position on the document and then enter the automatic viewing mode of choice at exactly the point of interest on the page.

The provision of these features on the DDM again entails the solution of difficult problems in accurate page/display coordinate conversion across scaling ratios which may not be integer values. Also, an image registration problem (referred to as "image stitching") must be solved. Solution of these problems is provided by the "gridding" of coordinates, described below.

Automatic View Modes: Continuous Single Line Presentation

Simplified reading of scanned documents is obtained using the continuous single-line Auto View presentation mode. In this mode, the layout of the scanned document is transformed to a single continuous line of text. A page presented in the Auto View mode appears truly continuous: successive columns of text are correctly sequenced, paragraph indents removed, graphic images are skipped, etc. This mode eliminates the user's line tracking task, which is a major cause of distraction and user fatigue in conventional CCTV systems. The user simply moves the line of text across the screen using the control device, and need not "return" to the left edge of the text column at the end of the text line.

If the DDM has the "SPEED" mode enabled, the single line of text will automatically move across the screen continuously and smoothly at a speed easily set and changed using the control device. Thus, hands-free reading may be accomplished.

The Single Line presentation mode includes an automatic "visor" capability, which masks out all portions of the page image except for the text line portions currently filling the screen end-to-end. Thus, unwanted material, such as adjacent lines, graphic rulings, and stray marks, is hidden from view. Implementation of this mode of operation requires re-mapping the page image to the screen using the page description found by the automatic format analyzer. The mapping is performed dynamically and continuously as the user moves through the document. Difficult implementation problems must be solved in the areas of coordinate translation and scaling to place image areas on the screen with one pixel accuracy, given non-integer scaling ratios and toroidal display buffer offset. Page coordinate ZONEs are used to implement the mapping, as described below.

The automatic visor implementation must mask out polygonal areas of the page image, and must do so consistently regardless of the prior state of the display. Accurate initialization of the display in this mode is generally a complex issue. For example, where the continuous line mode is entered and the page image is positioned near a line end, multiple text lines must then be initially presented accurately "stitched" together end-to-end to form a single line, with excluded areas properly masked. These issues are addressed in the design of the display sub-system FILLER code, so that artifact-free and precisely registered displays are produced.

Continuous Single Column Scrolling Mode

Reading of documents with columnar format at moderate magnification levels, and skimming of documents such as dictionaries or indexes, is facilitated by the Continuous Single Column Scrolling mode. In this mode, documents are presented as a single continuous column. Document images occurring on either side of the continuous column are hidden by vertical visors.

Automatic transition to the Continuous Single Line mode occurs when the user pans either column edge past the center of the screen. Thus, the user may, for example, scroll through a dictionary page until finding the entry of interest, and then initiate automatic panning to read the entry in detail. The provision of this feature again requires a specific mapping of regions on the document image to the display screen, and the implementation of polygonal visors.

Many other reading modes may be constructed using the page description and mapping functions of the DDM. These reading modes are menu selectable and are tailored to different types of visual impairment. The provision of these modes demonstrates the need for a flexible image-mapping facility, as implemented by the display sub-system.

Menu Effects

The DDM Menu mode provides means for the user to select specific functions, features and settings. The operation of the Menu requires a set of effects, such as icon cursors and image overlays, which are difficult to manage in the DDM's display environment.

The DDM display sub-system permits new features to be drawn on source bitmaps (such as menu images), with selective updating of the display screen from the source bitmap occurring only for the modified region. In order to achieve this result, the DDM software tracks the location of portions of the source image in the transient toroidal display buffer with accuracy sufficient to produce the image update (overlay effect), with no misalignment. This facility is provided by the gridding, clipping and cursor management functions of the display sub-system.

Display Management Sub-System

The DDM display management software sub-system provides a unique solution to the problem of scaling coordinates between a source image bitmap buffer and a toroidal display buffer using non-integer scaling ratios, without accumulation of coordinate errors, and while dynamically re-mapping page geometry to obtain continuous line and continuous column effects.

Key concepts in the implementation of the display management are: gridding (exact coordinate conversion using truncation); clipping (obtaining precise registration, or "stitching", of template zoom operations while obtaining single pixel edge positioning); zone mapping (maintaining a representation of the document as presented to the user in terms of the offsets of zones in the source page image bitmap to the screen origin); rolling (toroidal buffer management); cursor pair (display cursor and page cursor representing same point in screen space and in page space); and explicit and implicit cursor types.

Figure 20:
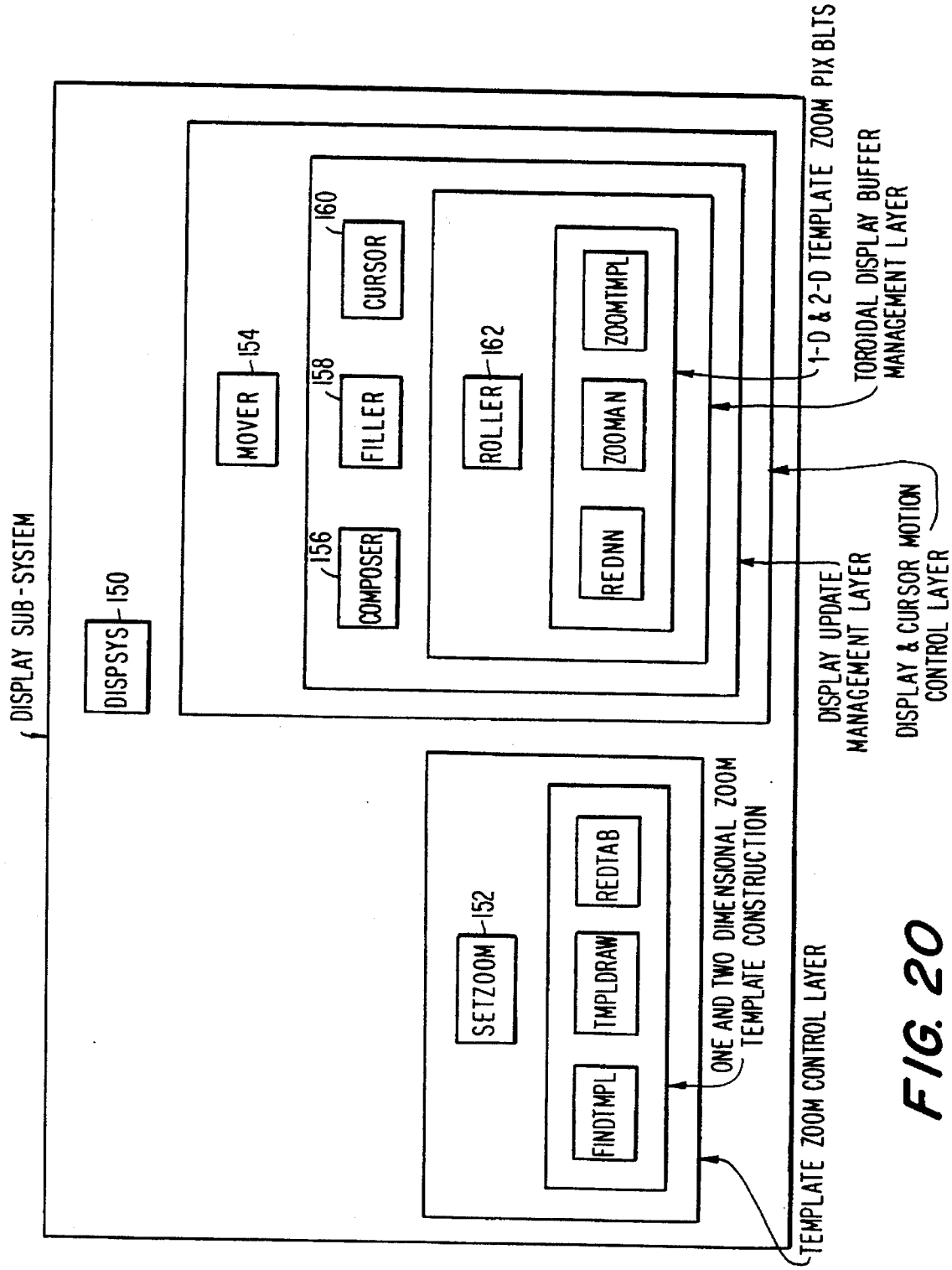
FIG. 20 is a block diagram of the display management software of the present invention.

FIG. 20 shows the hierarchical relationship of the software modules which comprise the display management software sub-system. The software design uses techniques of layering and encapsulation to reduce interdependencies between modules, by abstracting (hiding) successive levels of detail. The description which follows is keyed to FIG. 20, and proceeds in a top-down fashion to describe the software design.

Display Sub-system Layer

The outermost layer of the display sub-system is implemented in the DISPSYS code module 150. This layer provides the interface between the display sub-system and "user interface code" through a set of function calls and data structures. The "user interface code" is divided into "modes", such as the Overview, View, and Menu mode. The modes configure the display environment as needed by "opening" the display system with a specific set of parameters, and "closing" it when making a transition to a new mode (such as after a user presses a button).

The OpenDisplay() and CloseDisplay() functions provide the means for modes to create a new display environment and terminate it. The DISPLAY data structure is passed to each of these functions: on "open", the structure configures the display; on "close", the structure is updated to save the state of the display, so that the display screen may be later recreated exactly as shown at "close".

The DISPLAY structure contains pointers to cursor location (CUR_LOC) and cursor attribute (CUR_ATR) structures. CUR_LOC contains the coordinate of a display cursor (DISP_CUR) and of a page cursor (PAGE_CUR), and a pointer to a PAGE structure. In turn, the PAGE structure contains a pointer to a source image bitmap (src_bm); a pointer to a page description (list of PAGE DESCRIPTOR structures) built by the format analyzer; and pointers linking this PAGE to other stored PAGEs which comprise the BOOK (a header to the list of PAGE structures).

The DISP_CUR coordinate is in "display space": it specifies a point on the display screen, where (0,0) is the screen upper left-hand corner, and the maximum coordinate is determined by the screen resolution of the display monitor used. The screen resolution is passed in the screen_size field of the DISPLAY structure.

The PAGE_CUR coordinate is in "page spaces". It specifies a point on the page image bitmap (src_bm field in PAGE). Since a variable scaling ratio (ZOOM) is applied when copying page images to the screen, the two cursor coordinates are related by this scaling ratio. Additionally, since the page image is reconstructed to the display screen with a different geometry than found on the original page, a coordinate translation also applies between the two cursor "spaces." This translation varies with the presentation mode employed: continuous text-lines, continuous text-columns, etc.

The DISP_CUR and PAGE_CUR together contain all of the positional information needed to relate a reading location in a set of document images (PAGEs) to a location on the display screen. The two cursors are together termed the "cursor pair", and are of central importance in the external control of the display sub-system. The cursor pair maps a point on the display screen to the page image. Since all operations on the display sub-system are specified in terms of the cursor pair, the display sub-system may be described as "cursor driven".

The design of the display sub-system provides accurate and consistent scaling and translation of cursor coordinates between the two cursor "spaces". This process is described in detail below.

The CUR_ATR structure contains information about the display cursor (DISP_CUR) type. If the display cursor has IMPLICIT type, the display cursor is not visible to the user. Rather, the display cursor is merely a reference point which may be the center of the screen (CENTER_REF) or the upper left corner of the screen (CORNER_REF). EXPLICIT type display cursors are visible to the user, and may be produced with exclusive OR block, magnifying glass, or icon effects. The size of the EXPLICIT display cursor, as well as the pattern bitmap (if icon type), are also set up via fields in the CUR_ATR structure.

The DISPLAY structure also contains pointers to two ZOOM structures containing the scaling (magnification/reduction) ratio for the page, and for the EXPLICIT display cursor, if one is enabled. The display cursor ZOOM is provided specifically for use with "magnifying glass" effect cursors.

To modify the size of displayed text, a mode function closes the display, modifies the page_zoom pointer, and re-opens the display.

The DISPLAY structure also includes a pointer to a "composer" function. The composer functions encapsulate the mode-dependent aspects of page presentation. Use of the word "compose" here is used as in typesetting (printing). By specifying a particular composer function in the DISPLAY structure upon OpenDisplay(), the calling mode sets up screen update as a single line, single column, wrap-around right and left margin, etc. Thus, the composer (in effect) re-typesets the page based on the page description (a decomposed page), and for a particular set of effects.

The MoveCursor() function is the means by which user modes create all motion effects on the display screen. MoverCursor() accepts a "delta" pair, (x,y), representing the signed displacement for the display cursor motion desired. If the display cursor is touching the edge of the screen, or if the display cursor is of IMPLICIT type, the entire page display is smoothly panned or scrolled. For EXPLICIT cursor types where the cursor does not touch the screen edge, only the visible cursor moves on the screen.

The user mode cannot move the source cursor directly. All motion of the source cursor is a result of motion of the display cursor. The source cursor may not move linearly with display cursor motion, due to the re-mapping of page features according to the page description and the composer function used in the OpenDisplay() call.

The GetCursor() function accepts a pointer to a CUR_LOC structure, and returns an updated page cursor, display cursor, and page pointer. The page cursor will be returned as a (−1,−1) coordinate if the display cursor is not positioned over a portion of the actual page image. This is not an error, but signifies that the cursor coordinate transformation is undefined at that point in display space. The pointer to page is included to permit the construction of a multiple-page reading mode. The previously-mentioned BOOK structure can contain the images of multiple pages, with accompanying page descriptions.

Page images may be stored in compressed (CCITT group 3) format, and can be decompressed when needed as the user reads through the previously scanned multi-page document. Thus, the page pointer may be changed by the composer function during reading, and the cursor information properly reflects this.

GetCursor() is the means by which modes may use the display cursor as a pointer into a page image. This is essential for the Menu mode, where the user positions the visible cursor over the menu "page" image to select control items. Also, GetCursor() is called by CloseDisplay to update properly the CUR_LOC information in the passed DISPLAY structure.

The ModifyCursor() function is used to change the cursor type, size or icon dynamically, without closing the display. For example, the display cursor may be hidden by changing an EXPLICIT type to an IMPLICIT type.

The UpdateDisplay() function permits overlay graphics effects to be produced in the toroidal display buffer. Overlay displays are common graphics functions, used, for example, in the creation of multiple display "windows" on a computer console. The DDM's display architecture requires a unique solution to overlay management, which is described below.

All overlay effects are created by drawing or copying images onto a source bitmap, not directly to the display buffer bitmap. The display buffer is then updated by a call to UpdateDisplay(), which receives as parameters the coordinates of a rectangular area on the source bitmap to update to the screen. UpdateDisplay() performs the proper scaling and translation of coordinates from source to display space, including any multiple geometrical transformations as required. UpdateDisplay() ensures that the toroidal buffer is properly updated. Details of this process are described below.

Template Zoom Control Layer

The SETZOOM module 152 consists of the SetZoom() function, and encapsulates all of the lower level functions used to build one- and two-dimensional templates for the template-based scaling functions previously described.

Each call to SetZoom() with a pointer to a ZOOM structure (ratio) builds a ZOOMSETTING structure containing: a copy of the ZOOM ratio; a pointer to the template table for the one-dimensional nearest neighbor reduction or magnification, or two-dimensional template magnification; and other control information needed by the reduce/magnify functions themselves.

SETZOOM functions are only used to build tables and control information. The actual zoom routines are encapsulated elsewhere and are passed to the ZOOMSETTING structure to control their operation. The specific algorithms for table building have been discussed in detail above.

Display and Cursor Motion Control Layer

The MOVER module 154 implements all motion effects seen on the display screen including EXPLICIT-type cursor motion and page motion (panning and scrolling). In doing so, MOVER module 154: controls the geometrical transformation of page images to screen displays for various reading modes; performs motion clamping to stop motion, change modes, and switch pages at certain page boundaries; causes the update of page images on the screen by filling portions of the display buffer to be revealed by screen motion from page images; and maintains the display system software environment (data structures) which permits the accurate scaling and translation between page and display coordinates.

MOVER module 154 calls the COMPOSER module 156, FILLER module 158, and CURSOR module 160 functions, thus "hiding" this level of detail from DISPSYS module 150.

MOVER module 154 operates on a set of data structures which are designed to provide a flexible mapping of coordinates between page and display space, and which conserve coordinate scaling accuracy across non-integer ZOOM ratios. These structures are the ROLLBUF, the GRID, and the ZONE.

As discussed above, a display buffer is a physical display memory buffer allocated from VRAM on the DDM board. The x extent and pitch of each display buffer is fixed at 1024 pixels; y extent is fixed at 512 lines. Two or four of these buffers are available, depending on DDM board configuration.

The display bitmap (disp_bm) appears as a logically toroidal buffer for screen refresh, but not for processor (software) access. The processor sees a memory map image of each buffer located above that buffer in memory. This creates a vertically circular buffer which can wrap around once in the y direction (at screen bottom). The fully toroidal logical buffer is created for processor access by software means in ROLLER module 162, described in detail below.

The ROLLBUF structure contains control information for the software management of the logically toroidal buffer. Specifically, the ROLLBUF structure display_origin field points into the display bitmap at the screen refresh origin point, and thus corresponds to the screen origin (upper left corner). The ROLLBUF structure screen_extent field contains the screen size, while the disp_bm field contains a pointer to the actual VRAM allocation for this display buffer. A ROLLBUF is initialized each time an OpenDisplay() call is performed.

Alternate disp_bm allocations are used for alternate OpenDisplay() calls in order to create a "ping-pong buffer" arrangement to "hide" screen initialization upon display mode switching.

The previously-mentioned display space or display coordinate is actually a virtual screen coordinate created in the ROLLBUF. Display coordinates are translated by the ROLLBUF display_origin for access into the physical display bitmap. This translation includes x and y axis wrap-around at display bitmap extents for toroidal buffer creation.

As already noted, a source bitmap (src_bm) is a unit of DRAM storage for page images or drawn images. The previously-mentioned page coordinates are relative to the starting address of the DRAM allocation for the source bitmap specified in the PAGE structure. Also, the ZOOM structure contains the ratio of two integers which define an image size transformation (scaling) when copying an image from a src_bm to a disp_bm using one of the zoom_blt() functions. The ZOOM (magnification/reduction) ratio is specified as the fraction dest_cnt/src_cnt. The zoom_bit() functions extract exactly src_cnt pixels from the src_bm and write up to dest_cnt pixels to the ROLLBUF. Fewer than dest_cnt pixels are written if part of the image falls outside of a clip rectangle specified in the zoom_blt() call (see below). This clip rectangle is defined in display space.

Although the ZOOM ratio is expressed as the ratio of two integers, the ratio itself may not be an integer. For example, the ratio 20/7 specifies that for every seven pixels extracted from the page image, 20 pixels will be written to the display, creating a scaling ratio (magnification) of 2.85714286 . . . . It may therefore be seen that coordinate conversions between the page and display will only be exact if the source ordinates are exact src_cnt multiples (i.e., multiples of seven in this example), or the display ordinates are exact dest_cnt multiples (multiples of 20 in this example). Floating point representation of coordinates does not solve this problem; errors will merely accumulate more slowly.

Coordinate conversion errors create serious image quality problems on the display of the DDM. In particular, the toroidal display buffer is continuously updated from the page buffer to create smooth panning or scrolling motions. If errors occur in scaling between page and display coordinates, discontinuities are seen in the displayed image. As the motion continues, and particularly as the mapping from page to screen dynamically changes to create, for example, single line effects, accumulating errors can cause the display to literally "go to pieces." These artifacts are termed "stitching errors."

The problem is compounded because there is no fixed reference point possible in the toroidal display buffer. As the name implies, the toroidal buffer has a continuous surface. Because the buffer is updated continuously as its surface moves over the display, the logically toroidal buffer effectively has infinite extents. Thus, any attempt to provide a fixed arbitrary reference point will eventually suffer from numeric overflow of the variables representing the reference ordinates.

The concept of an infinite mesh is used to overcome these problems. The mesh exists in both display bitmap space and in "source" coordinate space, where mesh size equals dest_cnt in disp_bm space, and src_cnt in source space. Mesh intersections define the points where scaling between display and source coordinates may be performed without error.

The GRID structure embodies the concept of an infinite mesh. The GRID establishes the reference or "anchor" point in the display buffer from which exact src_cnt or dest_cnt multiples may be calculated. This is a "floating" reference: the GRID's anchor point follows the ROLLBUF's origin in the disp_bm, but is constrained to move in only dest_cnt increments. The GRID anchor point thus "wraps around" at the disp_bm extent. The GRID anchor (the grid_org field in the GRID structure) is initialized to be coincident with the ROLLBUF display_origin, but thereafter "floats" as the ROLLBUF is "rolled" (i.e., the pointer to disp_bm is wrapped-around at the extent of disp_bm). The GRID's grid_org field always points into the display buffer at a point within one dest_cnt of the ROLLBUF disp_org. The GRID structure represents a conceptual mesh only: it is not a two-dimensional array as the name may imply.

The GRID structure also has an extent (the grid_ext field of the GRID structure), which is sized to be the first dest_cnt multiple larger than the screen resolution in each dimension. This provision permits more efficient updates of the display bitmap, as will be described. When the GRID is considered along with its extent, it may also be viewed as a "window" into the display, implementing particular alignment constraints for scaling.

A GRID is allocated for each ZOOM currently installed on the system. Multiple grids are allocated when multiple ZOOMs are needed, for example to provide magnifying-glass cursor effects. Also, the ROLLBUF may be viewed as a "unity grid", always present, with a ZOOM installed with scaling ratio of one (src_cnt=dest_cnt=one). The allocation of fields in the ROLLBUF matches that of a GRID, so that a "C" language "cast" may be employed to use the analogy between ROLLBUF and GRID to ensure consistency in the manner in which all display buffer updates are performed.

The above-mentioned "source" coordinates are not source bitmap or page coordinates. Rather, these are display coordinates scaled to source dimensions. The mapping of page coordinates to the screen is done via the grid, using ZONE structures linked to the GRID.

ZONE structures specify a page bitmap (src_bm), a rectangle in page space (on the src_bm) called the "source rectangle," and an offset from the source rectangle to the grid origin (the grid offset). The grid_offset field maps a rectangular area in the page bitmap to the grid origin, and thus to the screen origin.

ZONE structures are built by COMPOSER module 156 at the request of MOVER module 154. ZONEs are maintained for all regions on a page bitmap currently falling within the extent of the ZONE's GRID. Coordinate transforms between source bitmaps and the screen are defined only for the ZONEs on a particular grid.

The ZONEs are attached to the GRID in a doubly linked list, with the first_zone and last_zone fields of the GRID pointing to the ends of the chain. The GRID also contains pointers to ZONEs corresponding to the top, bottom, left, and right edges of the display screen. Although this implies a two-dimensional mapping, the ZONEs are linked only in a linear chain.

The ZONE pointers on the GRID are maintained in two dimensions to enable the motion clamping function of Mover() to be mode-independent. If desired, a two-dimensional "web" of ZONE pointers may be constructed; however, a one-dimensional list is sufficient to achieve the desired display effects.

Figure 21:
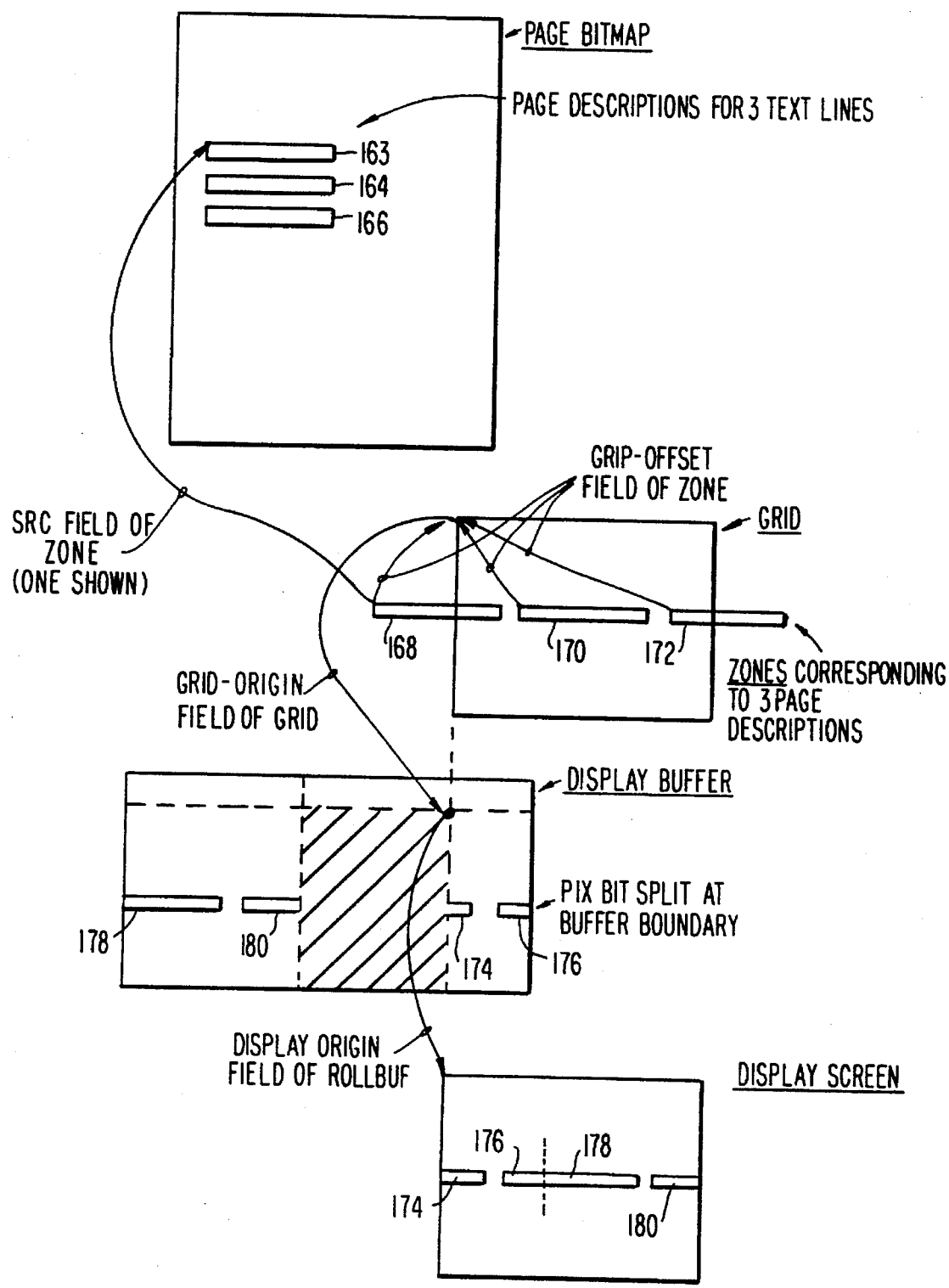
FIG. 21 is a schematic diagram of the memory mapping of the display using zones of a grid.

FIG. 21 provides an example of the mapping function of ZONEs on a GRID: a continuous single-line mode display, showing (at a particular time) three text lines in a paragraph strung end-to-end. Only the rightmost portion of the left hand line is seen on the screen, all of the center line is displayed, and only the leftmost portion of the right hand line is showing.

The three lines 163, 164, and 166 actually occur in vertical sequence on the original page.

The display is created from three corresponding ZONEs 168, 170, and 172, respectively, each with a source rectangle enclosing a text line on the page image and built from the corresponding PAGE DESCRIPTOR found by the format analyzer. Each ZONE has a grid_offset field with a value corresponding to the translation of the source rectangle origin to the grid origin (screen upper left corner), and placing that ZONE in the correct sequence on the screen.

In order to move the single line leftward across the screen, the display buffer must be updated from the ZONE overlapping the right edge of the GRID (the right_zone on the GRID). To maintain the mapping of grid to the screen, the grid_offset fields of all three ZONEs on the GRID must be adjusted by the increment of motion. Thus, GRIDs may be thought of as "moving through" their attached zones as the roll buffer rotates. A GRID is therefore analogous to a "display window" with the property that only certain defined points within it can map to the display coordinate space without error.

A coordinate is said to be "gridded" if it is specified in relation to a grid_origin on a GRID. Such a coordinate need not fall on a grid boundary, that is, on a src_cnt multiple. A gridded coordinate is said to be "grid aligned" if it falls on a src_cnt multiple.

Page bitmaps (src_bm) are not gridded. The source rectangles (src_rects) of ZONEs are gridded when translated by the ZONE's grid_offset onto the grid. A src_rect is grid-aligned when its origin is adjusted to fall on a src_cnt multiple boundary (a grid intersection).

FILLER module 158 of the display sub-system adjusts src_rect boundaries so that they are grid-aligned. The Zoom pixel block transfers ("BLTs") 174, 176, 178, and 180 which are subsequently generated are thereby constrained to begin and end on grid intersections. This ensures registration of display images pieced together from source images. Zoom BLTs may be clipped in display space, so that boundaries for the actual BLTs may be located off-grid. Boundary location accuracy is plus or minus one-half pixel. Perfect image registration, and therefore "stitching" of images, is ensured by coordinate gridding. Only the boundary location uncertainty for clipping off-grid remains. The use of GRIDs and ZONEs in this gridding and clipping process is discussed in greater detail below.

The GetCursor() function of DISPSYS module 150 may now be described in terms of the use of GRIDs and ZONEs.

First, the display cursor is converted to source grid space by correcting it for the "buffer offset" between the GRID's grid_origin and the ROLLBUF display_origin, and then scaling it to source coordinates. Scaling with rounding creates a plus or minus one-half pixel error in source space.

All of the ZONEs attached to the GRID are then searched for a gridded source rectangle enclosing the gridded source cursor. The gridded source rectangle is the source rectangle on the page translated by the ZONE's grid_offset. If no enclosing rectangle is found, the display cursor is undefined in page space (overlays no displayed page feature). If an enclosing rectangle is found, the gridded source cursor is translated to page space using the grid_offset field for the ZONE containing the enclosing rectangle. This is the page cursor.

The described half-pixel rounding error could be reduced by returning a remainder along with the whole-number scaled and translated display cursor value. However, precision is more than adequate without the additional complexity. The accuracy of the display cursor to page cursor conversion, and the accuracy of the reverse conversion, permits the user to change image size (zoom level) on the screen, and to change presentation modes, with no apparent shift in the position of the image seen at the center of the screen.

The important details of the Mover() function may now be described in terms of ROLLBUFs, GRIDs and ZONEs. The MoveCursor() function at DISPSYS module 150 calls the Mover() function at MOVER module 154 to perform its function. The Mover() in turn calls a series of functions local to MOVER module 154 to process the passed motion delta (i.e., the incremental change of motion).

First, a PositionCursor() call is made if an EXPLICIT cursor is displayed. This function consumes the delta unless the cursor is positioned at the edge of the screen. It also performs cursor position (redraw) management. If any of the passed delta remains, the Mover() next calls the ClampMotion() function. ClampMotion() proactively examines the end ZONES (left, right, top, and bottom ZONEs) to determine whether the delta will bring an end-ZONE src_rect edge past the display cursor center. If so, the delta is clamped to prevent motion beyond the display cursor center.

The action of ClampMotion() depends on the arrangement of ZONEs built onto the GRID by the COMPOSER function. For example, in the Manual View display mode, there is a single ZONE corresponding to the margins of the page image, and an IMPLICIT screen-center cursor. In this case, ClampMotion() will prevent the edges of the page image from being panned or scrolled past screen center.

In the case of Auto Pan Lines mode, multiple ZONEs are attached to the page GRID corresponding to text lines strung together horizontally, and an IMPLICIT center-referenced cursor type is used. Because new ZONEs are always constructed when end ZONEs enter the GRID, ClampMotion() will only stop display panning when the last line of the page reaches the center of the screen (or first line for reverse panning motion). Scrolling motion is clamped when the bottom or top of the center end ZONEs reach screen center.

Mover() returns a clamp code to the calling mode function. In the example immediately above, a returned clamp code indicating TOP or BOTTOM clamping can be used to perform an automatic transition to Auto Column mode, by closing and then re-opening the display with the AutoColumn() COMPOSER function pointer in the DISPLAY structure.

In the case of an EXPLICIT type cursor, ClampMotion() will prevent any ZONE from moving beyond the display cursor center. Because the cursor must be positioned against the screen edge to produce panning or scrolling motion, the cursor is effectively kept over the page image at all times, permitting the page edge to move on-screen just enough to allow the user to point to all valid areas on-page.

If any delta remains after cursor-clamping, Mover() then calls the RollBuffer() function. RollBuffer() in turn advances the ROLLBUF display_origin by the delta, checking for display bitmap wrap-around at any of the four display buffer edges. If the display_origin does extend past a buffer edge, it is adjusted by the display buffer extent to "wrap". This maintains the logically toroidal characteristic of the ROLLBUF.

RollBuffer() next traverses the GRIDs attached to the ROLLBUF, advancing the GRIDs's grid_org in the display bitmap only if the received delta will move the grid_org by a dest_cnt multiple when added to previously accumulated deltas. If so, the grid_org is advanced by the dest_cnt multiple, with the remaining portion of the delta conserved in the GRID's accumulator. The grid_org for each GRID is tested for display bitmap wrap-around at any of the four display buffer edges and adjusted as described for the ROLLBUF. If the grid_org is advanced, the "incr" (increment) field is set to contain the number of dest_cnts for the incremental motion. This field is used later to detect the need for display updates to the ROLLBUF.

Also, for each GRID, the offset is found between the grid_org and ROLLBUF buffer_org in the display buffer. This value is needed for translating display cursor coordinates into grid-space, and is stored, rather than being calculated as needed, because a calculation is involved. Specifically, the buffer offset calculation requires testing for the cases where one origin has wrapped at a buffer edge and the other has not. The correct offset value will always be less than one dest_cnt, because it reflects a distance in a logically toroidal buffer, not in the physical display bitmap.

If the "incr" field of a GRID was set by the Rollbuffer() function, further processing is needed to update the ZONEs on the GRID, and to update the display buffer. First, the CheckZones() function is called.

CheckZones() examines the end ZONES on the GRID to see whether the increment of motion will bring any ZONE edges onto the GRID. If so, the COMPOSER function passed on OpenDisplay() is used to get ZONEs until the GRID is again fully tiled with ZONES. CheckZones() also checks to see if any ZONEs will completely leave the GRID. If so, the ZONE is directly unlinked and deallocated.

The MoveZones() function is then called. MoveZones() adjusts the grid_offset fields of all ZONEs on the GRID by the GRID's increment. This process maintains the correct mapping of page source regions to the screen as the GRID "moves" through the ZONEs.

Finally, UpdateForRoll() is called. This function builds an update rectangle which specifies a region on the GRID in gridded source space for update to the display buffer by the FILLER module. For example, for a positive x increment of two, an update rectangle is built specifying an area on the grid with bottom x ordinate at the grid x extent and top x ordinate at the grid x extent minus 2 * src_cnt. The top and bottom y ordinates span the GRID's height. This is the area which will be revealed at the ROLLBUF's edge by the pending delta, and subsequent deltas up to the next increment. UpdateForRoll() then calls the Filler() function with the update rectangle to perform the actual buffer update (see sections below).

After the ROLLBUF and GRID have been updated, the TrackCenter() function is called to ensure that a "center zone" with a rectangle enclosing the screen in grid-space center is maintained. This "center zone" is really the two pointers to the same ZONE kept on the GRID's end-ZONE pointers orthogonal to the major axis of motion for the mode. Although the ZONE list is strictly one-dimensional, the fiction of two-dimensional mapping of ZONEs (four ends) must be maintained to make motion clamping mode-independent. Finally, a call is made to the low-level VidSetOrigin() function, which moves the display refresh point in the display buffer by the delta used to update the ROLLBUF. This call takes effect at the next display vertical blanking interval, producing the actual screen motion on the display, which is made toroidal for display refresh by previously described hardware means.

Display Update Management Layer

Display Update Management Layer of the DDM display sub-system includes three code modules: the FILLER 158, the COMPOSER 156, and the CURSOR 160. The FILLER module is first described.

As discussed above, the FILLER conceals the process of gridding and clipping of rectangles in page space to produce display buffer updates using the template zoom PIXBLTs with perfect image registration. Two main functions are provided by the FILLER module: Filler() and UpdatePage(). The Filler() function produces display buffer updates based on a passed update rectangle in grid space. UpdatePage() is similar to Filler(), but takes an update rectangle in page space. Both FILLER functions pass pointers to the ROLLBUF and to the GRID for update.

The Filler() function traverses all ZONEs linked onto the passed grid. For each such ZONE, the ZONE's source rectangle is translated onto the GRID (i.e., the source rectangle is "gridded") using the ZONE's grid_offset. The gridded source rectangle is then compared to the passed update rectangle, which lies on the GRID (i.e., is specified in grid space). If the gridded source rectangle is found to intersect the update rectangle, a rectangle is found which includes all intersecting points (called the "grid source update rectangle").

For each such grid source update rectangle found, a BLT_DESCRIPTOR structure is created, which will be passed to ROLLER module 162. BLT_DESCRIPTOR structure specifies a display buffer update in terms of: a clipping window, "win", which is a rectangle in display space; a starting point for the update destination, "dest," which is a point in display space; a pointer to the source bitmap for the page, "src_bm"; a source rectangle in page space, "src" ; and a "type" field to indicate the type of PIXBLT to be used for update.

An array of BLT_DESCRIPTORS is built for all grid source rectangles found. This array is passed onto the ROLLER module, rather than calling the ROLLER for each individual update. This is done to permit the computation of black "masking" fills, to be described below.

The gridding and clipping process which permits accurate PIXBLT stitching is carried out as each grid source rectangle is used to build a BLT_DESCRIPTOR. First, the grid source rectangle is scaled into display space using the ZOOM ratio attached to the GRID. This scaled rectangle is the clipping window "win" of the BLT_DESCRIPTOR. The scaling is performed using rounding, so that a plus or minus one-half pixel error may result. This error affects only the edge position of page feature boundaries seen on the screen. Absolute positioning (and thus image stitching) is maintained with perfect accuracy.

Next, the actual source rectangle on the page (in the source bitmap) is determined. To do this, the boundaries of the grid source rectangle are grid-aligned by truncation. The truncation is performed on the origin of the grid source update rectangle ("gsu_rect") according to the equation:

gridded_gsu_rect_top(x,y) equals the product of src_cnt and the integer portion of (gsu_rect_top(x,y)/src_cnt). This moves the origin of the grid source update rectangle back to the nearest grid intersection.

The bottom grid source update coordinate is grid-aligned by a similar truncation: gridded_gsu_rect_top(x,y) equals the product of src_cnt and the integer portion of ((gsu_rect_top(x,y)+src_cnt)/src_cnt). The addition of src_cnt to the truncation equation causes the bottom grid source update rectangle coordinate to be aligned forward to the next grid intersection.

The source rectangle specified in the BLT_DESCRIPTOR is the gridded gsu rectangle translated back to page space using the ZONE's grid_offset. A destination point as specified in the BLT is a starting point found by scaling the top coordinate of the gridded gsu rectangle to display space. This operation is performed without error, because the coordinate has been grid-aligned.

The use of the clipping window in the template Zoom BLT operations will now be explained. Both the one-dimensional nearest neighbor and two-dimensional smoothed template Zoom BLTs operate by extracting src_cnt pixels from the page image, computing a table index from the source field extracted, and then copying the dest_cnt sized template found using the index into the display bitmap. Stitching of images so copied can only be assured if the source regions extracted lie with edges of exact src_cnt multiple distances. Thus, the edges of BLTs may not be arbitrarily placed, and some other mechanism must be provided for edge placement finer than one src_cnt.

Precise edge placement is accomplished using clipping. The clipping window is a rectangle with coordinates in display space. The one- and two-dimensional template Zoom BLTS use this window (after translation into display buffer coordinates) to prevent the writing of any pixel falling outside the window. In other words, the writing of pixels to the display buffer is confined to the region inside of the clipping window. Source pixels are retrieved by the BLT regardless of where they will fall with respect to the window, and may thus be maintained with particular alignment.

The effect of the gridding and clipping operations may now be appreciated. Because the BLT DESCRIPTOR source rectangle and destination point have been grid-aligned, successive Zoom BLTS will always fall with precise src_cnt multiple and dest_cnt multiple alignments. Thus, template alignment is always repeatable over a region of the document image, regardless of the order of buffer motions. Edge resolution of less than a dest_cnt is provided by the clipping window. The rounding error which occurs in the scaling of source coordinates to display coordinates in the calculation of the window also is repeatable. Thus, for regions within a ZONE, clipping will never create gaps in the displayed image, regardless of the location of the initial update rectangle's edges.

It was noted above that the GRID extent is always sized to be a dest_cnt multiple. Because of this, the update rectangles passed by the Mover() to the Filler() will be grid-aligned. The Filler() will operate properly with update rectangles which do not meet this alignment criterion. However, the updates produced by the grid-aligned update rectangle are particularly efficient. If the update rectangle were not grid aligned, the boundary edge between two updates would produce a region where a src_cnt-sized area would be retrieved twice from the page image (once for each update), with the precise boundary location produced by clipping. With an aligned update rectangle, no clipping is needed for the boundary, and each pixel in the page image is retrieved only once.

The sizing of grid extents and the operation of the Mover() produce hidden updates. For positive deltas, the display buffer updates are produced at the grid extent, which is larger than the screen extent. The updates are thus hidden until the video refresh origin is moved by VidSetOrigin() to reveal the new region. For negative deltas, the GRID's grid_origin leads (is less positive than) the ROLLBUF's display_origin. Updates are performed at the GRID origin for negative deltas, and are thus hidden.

After building BLT_DESCRIPTORS for all ZONEs that overlap the update rectangle in grid space, the Filler() function calls the Mask() function to compute further BLT_DESCRIPTORS, specifying black pixel fill rectangles for the areas of the update rectangle not covered by ZONEs. The Mask() function computes the black masking fills using a linked list of fill rectangles (FRECTs) to simplify dynamic sorting. The FRECT list is initialized with a single FRECT specifying a black fill covering the entire area of the update rectangle initially passed to the Filler(). For each BLT_DESCRIPTOR on the array created by Filler(), the list of FRECTS is checked for a fill rectangle intersecting the clip window of the BLT_DESCRIPTOR. If an intersection is found, the FRECT is deleted from the list and replaced by zero to four FRECTs needed to fill the area around the BLT_DESCRIPTOR's clip window, up to the boundaries of the old FRECT.

This "divide-and-conquer" algorithm for finding black fill rectangles creates fill rectangles which precisely cover any gaps between the BLT windows with a minimum number of fills. After all BLT DESCRIPTORS have been checked, the list of FRECTs is converted to BLT_DESCRIPTORs, specifying the fill area in the win field, and with type set to FILL_TYPE. The BLT_DESCRIPTORS so built are appended to the list built by the Filler().

The creation of black masking fills for the areas between ZONEs on the GRID provides a simple means of obtaining essential display effects.

Display VISORS are created automatically. It is desirable to hide regions of the page image above and below the text_lines being serially displayed in the Auto Single Line Panning mode. This effect is obtained simply by building ZONEs the height of the text lines, as found by the format analyzer. The VISORS so implemented are polygons, and can properly adjust to text line height even when text lines of different height are on-screen simultaneously.

Also, by properly setting the ZONE's grid_offset fields, the ends of adjacent text lines are strung together with a consistent inter-word distance. The black masking fills which are generated between spaced ZONEs will hide any graphic rulings or stray marks which are horizontally adjacent to text lines which are so spaced. The ZONEs created in the Auto Single Column Scrolling mode are vertically visored by the same mechanism.

It is desirable to permit the user to pan or scroll the edges of the page image onto the screen in manual mode. This becomes a simple case of a ZONE edge moved onto the grid with no next ZONE available. No BLTs will be generated by the Filler() for the area beyond the page edge. The area beyond the page edge will consequently be updated with black masking fills, giving the desired black background for the off-page regions.

After calling the Mask() function, Filler() calls the Rollbit() function, with the array of BLT_DESCRIPTORs created in the filling and masking process. Rollbit() conceals the operations required to convert the logical display space in the ROLLBUF to the physical memory space in the display bitmap for the BLTs. The operator of Rollbit() is described in detail below.

The other function implemented in the FILLER module is UpdatePage(). This function implements the UpdateDisplay() function in the DISPSYS module. UpdatePage() accepts an update rectangle in page space, rather than in grid space as in Filler(). All ZONEs on the passed GRID are searched for a source rectangle in page space intersecting the update rectangle. If an intersection is found, a rectangle defining intersecting areas is found and translated into grid space using the ZONE's grid offset field. If this rectangle lies on the GRID, and therefore on the display screen, the rectangle is grid-aligned and clipped in a process identical to that described for the Filler() above. The BLT_DESCRIPTORs which are thus built are passed directly to the Roller(), as no masking fills are desired for this function.

The effect of UpdatePage() is to update on the screen any portion of the source bitmap which may have been changed since the screen was initially built using Filler() calls. For example, the source bitmap may contain the image of a Menu screen. If the user selects an item from the menu, a highlight effect, slider control, or other graphic effect is drawn to the source bitmap. The screen image is then updated to reflect the modified page image via the UpdatePage() call. The gridding and clipping of BLTs, described above, ensures that the updated image area stitches seamlessly to the image already present in the display buffer.

COMPOSER Module

The COMPOSER module 156 is in the Display Update Management layer, and includes of a group of functions which build ZONEs onto GRIDs to obtain the page presentation effects needed to implement different user modes. As mentioned above, the COMPOSER function needed to implement a particular display mode is passed as a function pointer on the OpenDisplay() call.

Each COMPOSER function is passed a pointer to the GRID, a pointer to CUR_LOC (cursor location), and a direction flag. The direction flag indicates whether the new ZONEs are to be added to the TOP, LEFT, RIGHT, or BOTTOM GRID edge, or to the CENTER. The CENTER flag indicates that a new GRID is being initialized, and ZONEs are to be constructed starting at the display cursor point, out to all GRID edges according to the logic of the particular display mode implemented by that COMPOSER function.

The GRID initialization case (CENTER flag) is of particular interest, because care must be taken to initialize accurately the new screen for proper alignment. The FindFirstZone() module-local function is used by all of the main CURSOR module functions to start the initialization process.

FindFirstZone() first calls the FindBox() function. FindBox() is passed the head of the page description (array of PAGE_DESCRIPTORs), and the level of PAGE_DESCRIPTOR being sought (text line, text column, etc.), and the page cursor. FindBox then finds the PAGE_DESCRIPTOR of specified level with box closest to the cursor point.

FindBox() locates the closest box to a point by testing for enclosure of the point by a box. The point may be enclosed by four, two, or no sides of the box. Based on the direction of non-enclosure found for each box, a closest scalar square-of-distance between the point and box is calculated as follows:

1) no enclosure: square of diagonal line to the closest corner;

2) enclosed by two sides: square of orthogonal line to closest side; and 3) enclosed by four sides: zero distance.

Findbox() will search until it finds an enclosing box, or will search all boxes of the specified level for the minimum distance. A pointer to the PAGE_DESCRIPTOR containing the closest box is returned.

FindFirstZone() then allocates memory for the initial ZONE and fills out the various fields of the ZONE from the PAGE_DESCRIPTOR. This is a straightforward process, except that the grid_offset field of the initial ZONE is found using both the display cursor and page cursor coordinates. If the closest PAGE_DESCRIPTOR box found does not enclose the page cursor, the resulting grid_offset will not position the ZONE at the center of the screen. A separate CheckFirstZone() function is provided to correct for this condition. If the condition is detected, CheckFirstZone() will adjust the grid_offset of the ZONE to pull it onto the center of the screen by finding the vector distance of the closest side of the ZONE's source rectangle to the screen center, and subtracting this vector distance from the grid_offset.

Certain fields in the ZONE structure have mode-specific usage. These fields are not set by the mode-independent FindFirstZone() code. These fields are assigned by the calling COMPOSER function. For example, the "align" field is set to the bottom baseline found for textlines when in AutoPanLines mode, but not when in AutoScrollColumns mode. The baseline is used to set the grid_offset field of successive text line ZONEs so that the text is aligned by baseline, rather than by box bottom, because box bottom position depends on whether the text line contains characters having descenders or not.

After calling FindFirstZone() and assigning mode-dependent fields, the COMPOSER function completes GRID initialization by calling mode specific functions which build ZONEs from the center ZONE out to the GRID edges. For example, the AutoPanLines() COMPOSER function calls GetTLZonesRight(), and then GetTLZonesLeft(), to fill the GRID with ZONEs.

Now that GRID initialization has been described, the sequence of events which takes place when a new display mode is initialized can be traced.

The OpenDisplay() function in the DISPSYS module first allocates and initializes the ROLLBUF, and then calls the module-local NewGrid() function to allocate and initialize a GRID. This includes the building of a new ZOOMSETTING, and the calculation of the GRID extent. OpenDisplay() then calls the passed COMPOSER function with the CENTER flag. This builds the initial set of ZONEs onto the GRID, as described above. Finally, OpenDisplay() calls the NewScreen() function in the MOVER module. NewScreen() sets an update rectangle to cover the entire GRID. NewScreen() then calls the Filler(), which fills out an array of BLT_DESCRIPTORS based on the passed GRID's ZONEs, and calls the Roller() which calls the Zoom BLTS, thus updating the new display buffer. NewScreen() then calls VidSetOrigin() to switch display refresh to the new display buffer, and the initialized screen appears to the user.

The page display thus presented looks exactly as it would had the user reached that page position by panning and scrolling in the particular mode, rather than, for example, positioning the Overview mode cursor over the particular page position and then switching modes. This precise initialization is only possible by building a state-independent mapping of page features to the display (implemented via the ZONEs), and through precise coordinate conversion and stitching (implemented through the gridding and clipping process).

Once a display mode has been initialized, ZONE building by the COMPOSER is straight-forward and mechanical. To build ZONES, the next PAGE_DESCRIPTOR of the appropriate level is found (these are sorted in reading order by the format analyzer), and the appropriate fields are assigned. A new ZONE's grid offset is found using the adjacent ZONE's grid offset and align fields, and mode-specific positioning rules.

CURSOR Module

The CURSOR module 160 in the Display Update Management layer implements the necessary functions for presenting EXPLICIT-type (i.e., visible) cursors to the user. Such functions include ShowCursor(), HideCursor(), PositionCursor(), and UpdateCursor(). Implementation of these functions is straight-forward, with the exception of the provision of a very large reverse-video block cursor which may be moved without flicker. The method for producing this cursor-type is described below.

The digital document magnifier preferably provides a large, reverse-video block cursor for various screens of the display (e.g., for the OVERVIEW and MENU screens). The size of the cursor is unusually large by graphics standards, to ensure clear visibility by sight-impaired viewers. The cursor is of the "exclusive OR" type (i.e., the display behind the cursor "shows-through" in reverse video so that the large size does not obscure screen content). Although the exclusive OR cursor is inherently fast (because the screen contents need not be saved to be restored), the large cursor size necessitates using special techniques for moving the cursor without flicker. The common practice is to completely remove the cursor and redraw it for each frame during cursor movement. However, using the TMS34010 processor of the preferred embodiment, the large cursor cannot be removed and restored in one frame.

The digital document magnifier of the present invention uses a more efficient cursor movement technique to ensure flicker-free cursor motion. The cursor is defined by a rectangle in the display buffer coordinate system, which requires that cursor updates contend with the double-circularity of the display buffer. Cursor motion is defined to include motion at both the origin and extents (i.e., size changes) of this rectangle.

Each time the cursor is moved, the new cursor position (a first rectangle) is compared to the previous cursor position (a second rectangle). Only non-overlapping areas of the two rectangles are updated in a given frame. Areas vacated (covered by the old cursor only) are restored, while areas covered by the new cursor position are reversed. Because frames occur at 16.6 ms intervals (60 Hz rate), even rapid motion of the cursor across the screen requires only small areas to be updated for each frame. Thus, the processing requirement for moving a very large (60×40 pixels) cursor becomes comparable to that required for moving small cursors (12×8 pixels) using conventional means.

ROLLER Module

ROLLER module 162 of the DDM display sub-system includes the RollBit() function in ROLLER module 162. Rollbit() conceals the operations required to convert the logical display space in the ROLLBUF to the physical memory space in the display bitmap for BLTs, black masking fills, cursor fills, etc.

The Rollbit() function is passed the array of BLT_DESCRIPTOR structures built at the FILLER level, a pointer to the ROLLBUF, and a pointer to the GRID to be updated. Rollbit() processes the BLT_DESCRIPTORs into zoomblt parameter blocks (ZBLT_PARAMS) which are passed to the appropriate template Zoom BLT assembly language functions.

Rollbit() is used to access the display bitmap for all operations which write to the display bitmap. These operations include the one-dimensional nearest-neighbor template reduction and magnification functions (Rednn(), Zoomnn()), the two-dimensional smoothed template magnification (Zoomtmpl()), all fill operations using the TMS34010 FILL instructions (via the Fillrect() function), and un-zoomed PIXBLT operations using the PIXBLT instruction of the TMS 34010 processor (via the Bltrect() function).

Any of the above operations may specified by a BLT_DESCRIPTOR, via the type field. Not all BLT_DESCRIPTOR fields are used by all types. For those types which operate without scaling (the 34010 FILL and PIXBLT operations), the GRID pointer passed to Rollbit() is a pointer to the ROLLBUF cast to the GRID data type. This automatically causes such operations to be performed on the "unity grid", where the scaling factor is one, and the grid_origin is the buffer_origin.

For each BLT_DESCRIPTOR in the passed array, Rollbit() first translates the clipping window (win) rectangle to display buffer coordinates using the GRID's grid_org field. Because the win coordinates were computed in display space by the Filler() (i.e, as coordinates relative to the screen origin), translation by the grid_origin places the window coordinates relative to the origin of the display bitmap. Also, as noted above, the screen origin moves with respect to the display bitmap origin as the logically toroidal display buffer is "rolled" past the screen.

The translated win rectangle coordinates are placed in the clip fields of a ZBLT_PARAM block. These coordinates are then tested to determine whether the requested PIXBLT or fill will wrap around an edge of the physical display bitmap as a consequence of the use of this memory to construct a toroidal buffer. Only the x ordinate of the clip coordinates must be tested. The y component of buffer wrap-around is provided by display bitmap address aliasing, described above. Also, the clip rectangle is tested rather than the source rectangle, because any portion of the PIXBLT which is clipped will not be written to the display bitmap.

If the clip rectangle is found to intersect a buffer edge, the BLT is split into two pieces, displaced by the display bitmap extent. A buffer edge may intersect a BLT at any point, because alignment can only be guaranteed if the display bitmap extent is a dest_cnt multiple (i.e., lies on a grid intersection). Because the DDM's display bitmap extent is fixed at 1024 pixels, most ZOOM settings result in a non-aligned bitmap extent.

Clipping is used in the case of a split BLT to ensure that the two resulting PIXBLTs have edges which are precisely aligned with the display bitmap edges. This is done simply by obtaining the distance from the top of the original BLT_DESCRIPTOR window to the display bitmap edge, and generating two ZBLT_PARAM blocks with clip fields set accordingly.

The above processing is sufficient for splitting of FILL type operations. BLTs require information in addition to the window field, including the destination point and source rectangle. The source rectangle of the BLT_DESCRIPTOR must also be split into two pieces corresponding to the BLT portions which are and are not wrapped around the display bitmap edge. If clipping is needed to define the split sides of the two BLTs (in the case of non-aligned display bitmap edges), the source rectangles must overlap by one src_cnt to maintain proper grid alignment. Grid alignment of source regions must be maintained to ensure proper stitching of images across the display bitmap edge.

The calculations needed to split the source rectangle are performed without translating the source rectangle back to grid space, as this requires finding the ZONE corresponding with the source rectangle to get the ZONE's grid_offset. Instead, the display point is converted to source space, because this point corresponds exactly to the source rectangle origin in grid space.

Also, the distance between the top and bottom corner of the source rectangle plus one, the source rectangle extent, requires no translation. Using these coordinate conversions, the ZBLT_PARAM block source_start and source_extent fields are computed for the two (split) PIXBLTs, such that the resulting source regions are kept grid-aligned in grid space.

After the buffer edge computations are performed, and splitting is performed as needed, Rollbit() tests the BLT_DESCRIPTOR type field and calls the appropriate PIXBLT or FILL function accordingly. The one- and two-dimensional template zoom functions accept two parameters, the ZBLT_PARAM block pointer, and a pointer to the ZOOM_SETTING that is attached to the GRID being updated. The ZOOM_SETTING provides a pointer to the zoom look-up table and other required control information. The non-zoomed operations are passed the parameter block pointer, plus a pixel processing operation parameter (PPOP), which is used to set up the graphics environment for the TMS 34010-implemented BLTs and FILLs.

Automatic Page Sizer

The OVERVIEW display mode screen is filled by the actual width of the scanned page image. This is accomplished by using the MARGIN information returned by the format analyzer. The size of the MARGIN rectangle is compared to the size of the display screen to obtain a zoom ratio which will reduce the page image so that it just fits on the OVERVIEW display screen. The incremental zoom function is then used to reduce the page image to the display buffer.

Thus, a digital document magnifier which scans and digitizes printed information, processes the information, and outputs the processed information to a display screen, is provided. One skilled in the art will appreciate that the present invention can be practiced by other than the described embodiments, which are presented here for purposes of illustration and not of limitation, and the present invention is limited only by the claims that follow.

What is claimed is:

1. A method for varying the size of an image on a display means, comprising the steps of:

creating digitized image data that is representative of a printed image containing at least some text;

storing the image data in a first storage means;

analyzing the image data to determine the format of the printed image so as to identify lines of text;

extracting a source image bit pattern from said first storage means, said source image bit pattern corresponding to said lines of text;

addressing a predetermined template corresponding to a predetermined magnification or reduction of the extracted source image, said template smoothing said source image bit pattern;

storing the template in a toroidal display buffer in a displayable storage means; and displaying the contents of said toroidal display buffer on the display means.

2. The method of claim 1, wherein said toroidal display buffer stores more information than can be displayed on said display means.

3. The method of claim 2, further comprising the steps of:

extracting from said first storage means a second source image corresponding to the image beyond an edge of said display means;

addressing a predetermined second template corresponding to said predetermined magnification or reduction; and storing the second template in said toroidal display buffer dust beyond said edge of said display means.

4. A digital magnifying system with which a low-vision user can magnify a printed image containing a plurality of lines of text arranged in a plurality of columns so that each of the plurality of lines of text from each of the plurality of columns is automatically displayed in a continuously panning line, each line of text having a beginning and an end, the digital magnifying system comprising:

means for receiving a digitized signal that is representative of the printed image containing the plurality of lines of text;

line format analyzer means for analyzing the digitized signal to define line areas within the printed image, each of the line areas enclosing one of the plurality of lines of text by extending from the beginning of that line to the end of that line;

column format analyzer means for analyzing the digitized signal to define column areas within the printed image, each of the column areas enclosing one of the plurality of columns of text by extending from the top of that column to the bottom of that column;

a display;

means for magnifying the plurality of lines of text to provide a magnified version of the lines of text on the display; and means for automatically panning the magnified version of the lines of text in a substantially continuous single line, such that the beginning of each line of text is displayed immediately adjacent to the end of a previously disproved line of text, the single line of the magnified version of the lines of text being maintained on the display at a substantially constant vertical position by the means for automatically panning.

5. The digital magnifying system of claim 4 further comprising:

means for continuously panning the magnified version of the lines of text from preceding and succeeding columns of text without interruption.

6. The digital magnifying system of claim 4 further comprising controls that can be operated by a user for controlling the rate at which the magnified version of the lines of text is panned by the means for automatically panning.

7. The digital magnifying system of claim 4 further comprising:
   means for varying the magnification of the magnified version of the lines of text.

8. The digital magnifying system of claim 4 further comprising:
   deskewing means for removing skew in the lines of text before the means for magnifying the lines of text displays the magnified version of the lines of text on the display.

9. The digital magnifying system of claim 4 further comprising:
   means for scrolling the magnified version of the lines of text.

10. The digital magnifying system of claim 7 wherein the magnification control means allows the user to select the magnification of the magnified version of the lines of text from a predetermined set of zoom values, the zoom values approximating a set of power series magnifications.

11. A digital magnifying system comprising:
    means for receiving a digitized signal that is representative of a printed image containing a plurality of lines of text;
    format analyzer means for analyzing the digitized signal to define areas within the printed image which enclose the plurality of lines of text;
    a display;
    means for magnifying the plurality of lines of text to provide a magnified version of the lines of text on the display;
    means for panning the magnified version of the lines of text continuously and displaying the magnified version of the lines of text in a substantially continuous single line, the single line of the magnified version of the lines of text being maintained on the display at a substantially constant vertical position by the means for panning; and
    means for automatically creating polygonal display visors that can adjust to accommodate various text heights during the panning of the magnified version of the lines of text, so that the visors mask out all portions of the printed image except for the magnified version of the text that is on the display.

12. A digital magnifying system comprising:
    means for receiving a digitized signal that is representative of a printed image containing a plurality of lines of text;
    format analyzer means for analyzing the digitized signal to define areas within the printed image which enclose the plurality of lines of text;
    a display;
    means for magnifying the plurality of lines of text to provide a magnified version of the lines of text on the display;
    means for panning the magnified version of the lines of text continuously and displaying the magnified version of the lines of text in a substantially continuous single line, the single line of the magnified version of the lines of text being maintained on the display at a substantially constant vertical position by the means for panning;
    a toroidal display memory buffer; and
    template means for providing digital data representative of a smoothed magnified version of the lines of text to the toroidal memory buffer.

13. A digital magnifying system with which a low-vision user can magnify a printed image containing a plurality of lines of text arranged in a plurality of columns so that each of the plurality of lines of text from each of the plurality of columns is automatically displayed in a continuously scrolling column of text, each column of text having a top and a bottom, the digital magnifying system comprising:
    means for receiving a digitized signal that is representative of the printed image containing the plurality of columns of text;
    column format analyzer means for analyzing the digitized signal to define a plurality of column areas within the printed image, each of the column areas enclosing one of the plurality of columns of text by extending from the top of that column to the bottom of that column;
    means for magnifying the text to provide a magnified version of the plurality of columns of text; and
    means for scrolling the magnified version of the plurality of columns of text and displaying the magnified version of the plurality of columns of text at a substantially constant horizontal position, such that the top of each column of text is displayed immediately adjacent to the bottom of a previously displayed column of text.

14. A method for magnifying a printed image containing a plurality of lines of text arranged in a plurality of columns so that each of the plurality of lines of text from each of the plurality of columns is automatically displayed in a continuously panning line, each line of text having a beginning and an end, the method comprising the steps of:
    receiving a digitized signal that is representative of the printed image containing the plurality of lines of text;
    analyzing the digitized signal to define line areas within the printed image, each line area enclosing one of the plurality of lines of text by extending from the beginning of that line to the end of that line;
    analyzing the digitized signal to define column areas within the printed image, each column area enclosing one of the plurality of columns of text by extending from the top of that column to the bottom of that column;
    displaying a magnified version of the lines of text on the display; and
    automatically panning the magnified version of the lines of text in a substantially continuous single line at a substantially constant vertical position on the display, such that the beginning of each line of text is displayed immediately adjacent to the end of a previously displayed line of text.

15. The method of claim 14 wherein the step of panning the magnified version of the lines of text comprises the step of continuously panning the magnified version of the lines of text from preceding and succeeding columns of text without interruption.

16. The method of claim 14 further comprising the step of allowing a user to control the rate at which the magnified version of the lines of text is panned.

17. The method of claim 14 further comprising the step of allowing a user to select the magnification of the magnified version of the lines of text.

18. The method of claim 14 further comprising the step of removing skew in the lines of text.

19. The method of claim 14 further comprising the step of scrolling the magnified version of the lines of text.

20. The method of claim 14 wherein the step of displaying the magnified version of the lines of text comprises the step of smoothing the magnified version of the lines of text using templates.

21. The method of claim 14 further comprising the step of allowing a user to select the magnification of the magnified version of the lines of text from a predetermined set of zoom values that approximate a set of power series magnifications.

22. A method for displaying a magnified version of a printed image on a display, comprising the steps of:

receiving a digitized signal that is representative of a printed image containing a plurality of lines of text;

analyzing the digitized signal to define areas within the printed image which enclose the plurality of lines of text;

displaying a magnified version of the lines of text on the display;

panning the magnified version of the lines of text continuously at a substantially constant vertical position on the display; and automatically creating polygonal display visors that adjust to accommodate various text heights during the panning of the magnified version of the lines of text, so that the visors mask out all portions of the printed image except for the magnified version of the lines of text that is on the display.

23. A method for magnifying a printed image containing a plurality of lines of text arranged in a plurality of columns so that each of the plurality of lines of text from each of the plurality of columns is automatically displayed in a continuously scrolling column of text, each column of text having a top and a bottom, the method comprising the steps of:

receiving a digitized signal that is representative of a printed image containing a plurality of columns of text;

analyzing the digitized signal to define column areas within the printed image, each column area enclosing one of the plurality of columns of text by extending from the top of that column to the bottom of that column;

displaying a magnified version of the columns of text on the display; and scrolling the magnified version of the columns of text continuously at a substantially constant horizontal position on the display, such that the top of each column of text is dismayed immediately adjacent to the bottom of a previously displayed column of text.

* * * * *